United States Patent
Biro et al.

(10) Patent No.: US 10,458,237 B2
(45) Date of Patent: Oct. 29, 2019

(54) SEALING SLEEVE FOR GEARED SHAFT OF GEARMOTOR ASSEMBLY

(71) Applicant: Nidec Motor Corporation, St. Louis, MO (US)

(72) Inventors: Joshua M. Biro, Collinsville, IL (US); William D. Moore, Florissant, MO (US); Philip S. Johnson, Granite City, IL (US); Jeffrey M. Hutsler, Troy, MO (US); Paul G. Michaels, St. Louis, MO (US); Daniel E. Hilton, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 329 days.

(21) Appl. No.: 15/331,560

(22) Filed: Oct. 21, 2016

(65) Prior Publication Data

US 2017/0114640 A1   Apr. 27, 2017

Related U.S. Application Data

(60) Provisional application No. 62/300,032, filed on Feb. 25, 2016, provisional application No. 62/245,181, filed on Oct. 22, 2015.

(51) Int. Cl.
*F16H 1/06* (2006.01)
*F16H 1/20* (2006.01)
(Continued)

(52) U.S. Cl.
CPC ............ *F01C 1/084* (2013.01); *F01C 19/025* (2013.01); *F16C 35/067* (2013.01);
(Continued)

(58) Field of Classification Search
CPC ........... F16H 2057/0213; F16H 57/021; F16H 57/029; F16H 57/039; F16H 57/022; F16H 2057/02034
See application file for complete search history.

(56) References Cited

U.S. PATENT DOCUMENTS 3,138,069 A * 6/1964 Bishop .................. B62D 5/083
464/89
3,602,255 A * 8/1971 Bishop .................. B62D 5/083
137/560
(Continued)

FOREIGN PATENT DOCUMENTS

JP   H0288450    7/1990
JP   2008168742  7/2008
(Continued)

OTHER PUBLICATIONS

PCT International Search Report and Written Opinion from PCT Application No. PCT/US2016/058248 entitled Electric Motor (dated Jul. 11, 2017).
(Continued)

*Primary Examiner* — Jake Cook
(74) *Attorney, Agent, or Firm* — Hovey Williams LLP

(57) ABSTRACT

A motor includes a shaft rotatable about an axis, an engaged component engaged by the shaft, a sleeve fixed to the shaft to rotate therewith, and a seal at least partly circumscribing the shaft. The shaft includes an engagement region presenting a substantially variable outer shaft surface that at least in part engages the engaged component. The sleeve includes a first section that at least partly circumscribes and engages the engagement region of the shaft. The first section of the sleeve presents an outer seal-engaging surface and an outer bearing-engaging surface. The seal and the bearing each at least partly circumscribe the engagement region of the shaft
(Continued)

and the first section of the sleeve to engage the seal-engaging surface and the bearing-engaging surfaces, respectively, of the sleeve.

22 Claims, 54 Drawing Sheets

(51) Int. Cl.
    *F01C 1/08*     (2006.01)
    *F01C 19/02*     (2006.01)
    *F16C 35/067*     (2006.01)
    *F16H 57/021*     (2012.01)
    *F16H 57/029*     (2012.01)
    *H02K 5/173*     (2006.01)
    *H02K 7/116*     (2006.01)
    *F16H 57/04*     (2010.01)
    *F16H 57/02*     (2012.01)
    *H02K 7/00*     (2006.01)
    *H02K 7/14*     (2006.01)

(52) U.S. Cl.
    CPC ......... *F16H 57/021* (2013.01); *F16H 57/029* (2013.01); *H02K 5/1732* (2013.01); *H02K 7/116* (2013.01); *F16C 2361/61* (2013.01); *F16H 57/04* (2013.01); *F16H 2057/02034* (2013.01); *H02K 7/003* (2013.01); *H02K 7/14* (2013.01)

(56) References Cited

U.S. PATENT DOCUMENTS

| | | | |
|---|---|---|---|
| 4,514,109 A | | 4/1985 | McKenna |
| 4,832,659 A | * | 5/1989 | Nelson .................. F16D 3/10 403/26 |
| 5,053,661 A | | 10/1991 | Kitamura et al. |
| 5,094,542 A | * | 3/1992 | Engels .............. B01F 15/00928 366/282 |
| 5,307,901 A | * | 5/1994 | Stromberg .............. B60B 27/02 184/105.1 |
| 6,168,163 B1 | | 1/2001 | Thorson et al. |
| 2002/0045509 A1 | | 4/2002 | Grauby et al. |
| 2002/0145108 A1 | | 10/2002 | Rodi |
| 2005/0100258 A1 | * | 5/2005 | Brossier .................. F01D 25/16 384/477 |
| 2005/0209038 A1 | | 9/2005 | Kempf et al. |
| 2007/0295557 A1 | | 12/2007 | Aldridge |
| 2008/0087123 A1 | * | 4/2008 | Li .............................. F16H 1/16 74/425 |
| 2008/0163712 A1 | * | 7/2008 | Oberle .................. F16H 57/021 74/424 |
| 2008/0238267 A1 | | 10/2008 | Scharrer et al. |
| 2010/0259014 A1 | * | 10/2010 | Nakagawa ........... F16J 15/3264 277/559 |
| 2010/0275708 A1 | * | 11/2010 | Daniel .................. F16H 57/022 74/405 |
| 2014/0033862 A1 | | 2/2014 | Tryens et al. |
| 2014/0126976 A1 | | 5/2014 | Schmid et al. |
| 2014/0217839 A1 | | 8/2014 | Marioni |
| 2014/0298937 A1 | * | 10/2014 | Kessler ................. F16H 57/022 74/396 |

FOREIGN PATENT DOCUMENTS

| | | |
|---|---|---|
| JP | 2009247087 | 10/2009 |
| WO | 2015151052 | 10/2015 |

OTHER PUBLICATIONS

PCT International Search Report and Written Opinion from PCT Application No. PCT/US2015/064092 entitled Electric Motor (dated Apr. 12, 2016).

European Search Report from European Application No. 16871232.1 entitled Electric Motor (May 21, 2019).

* cited by examiner

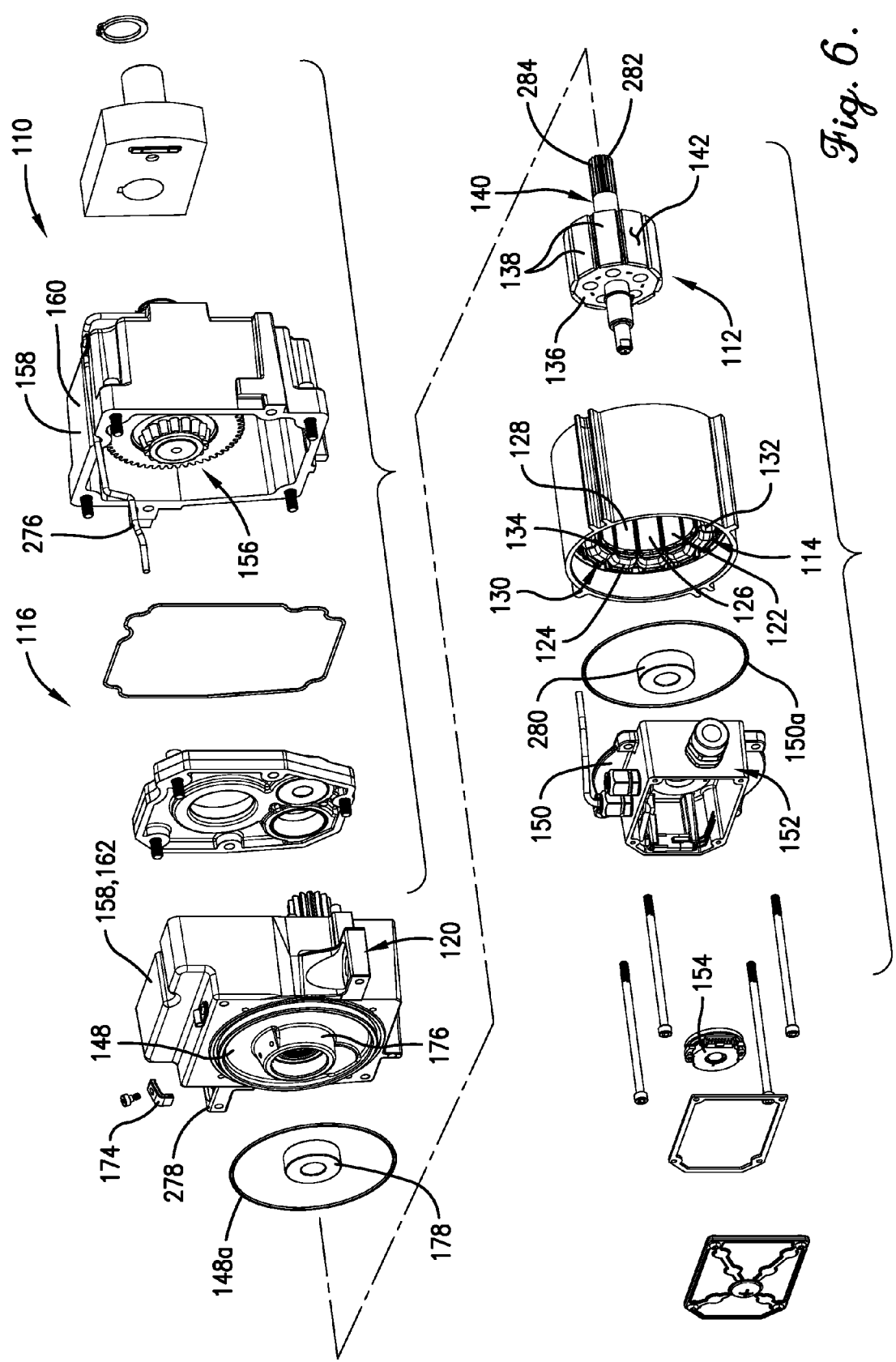

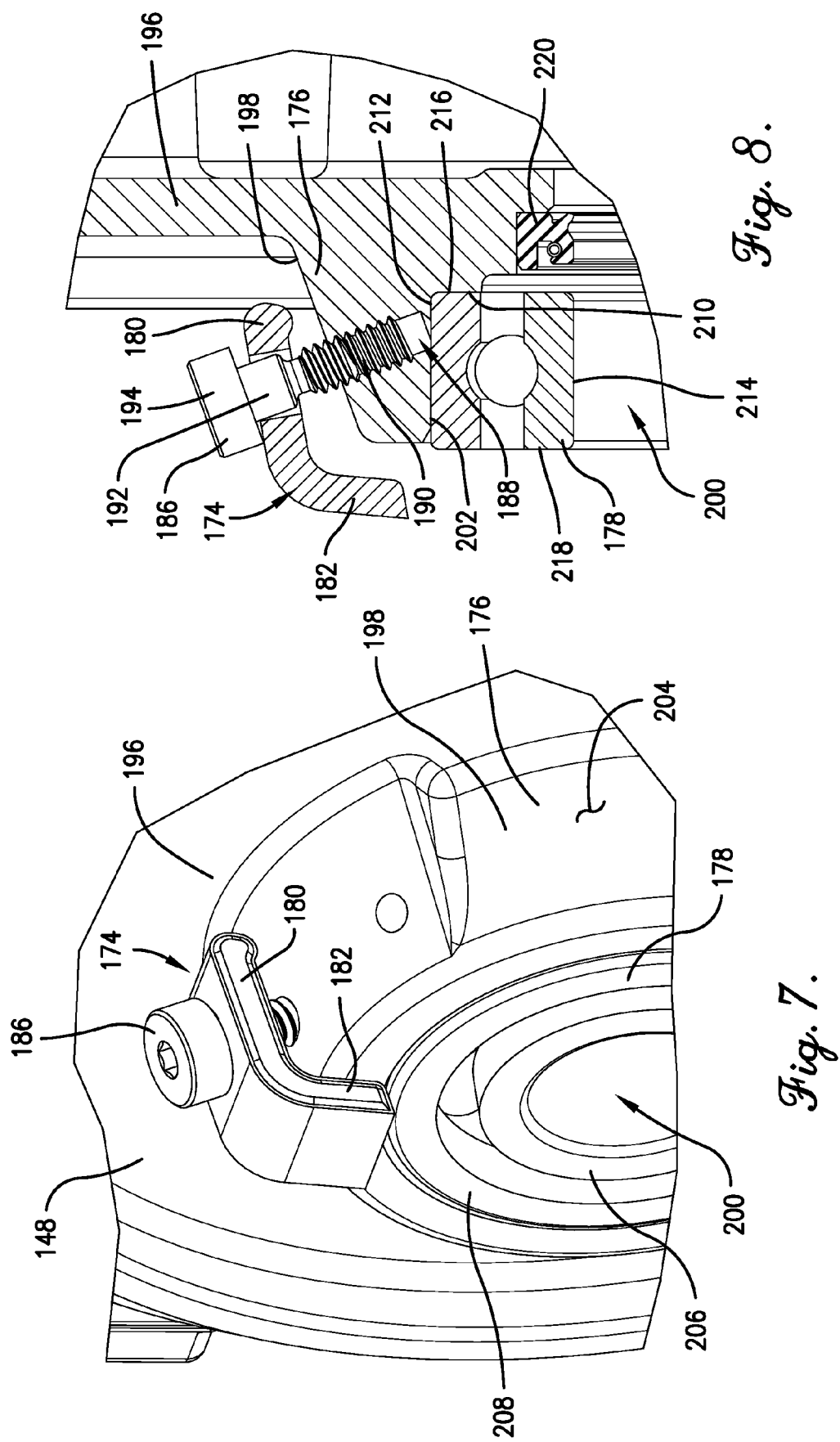

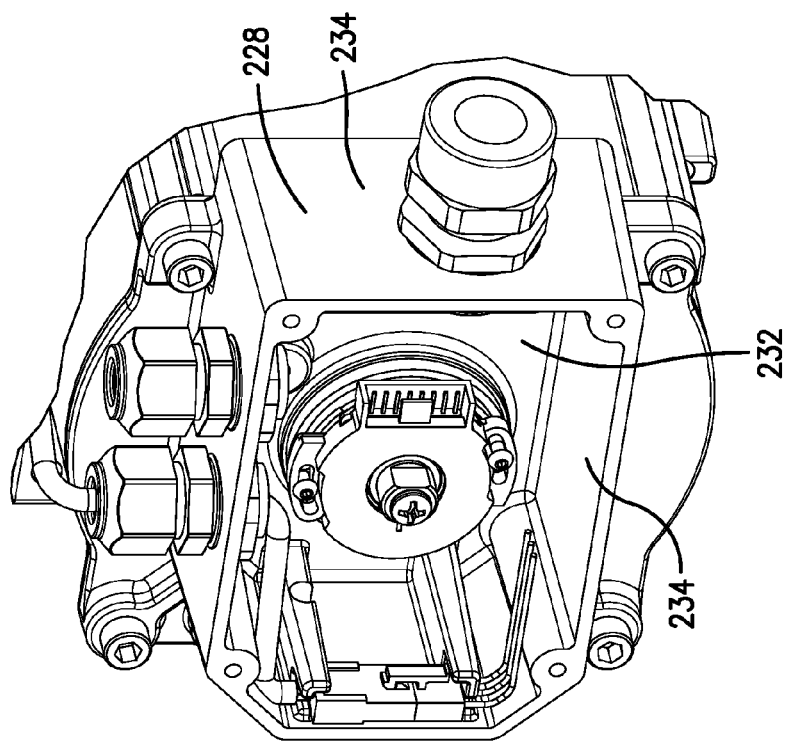
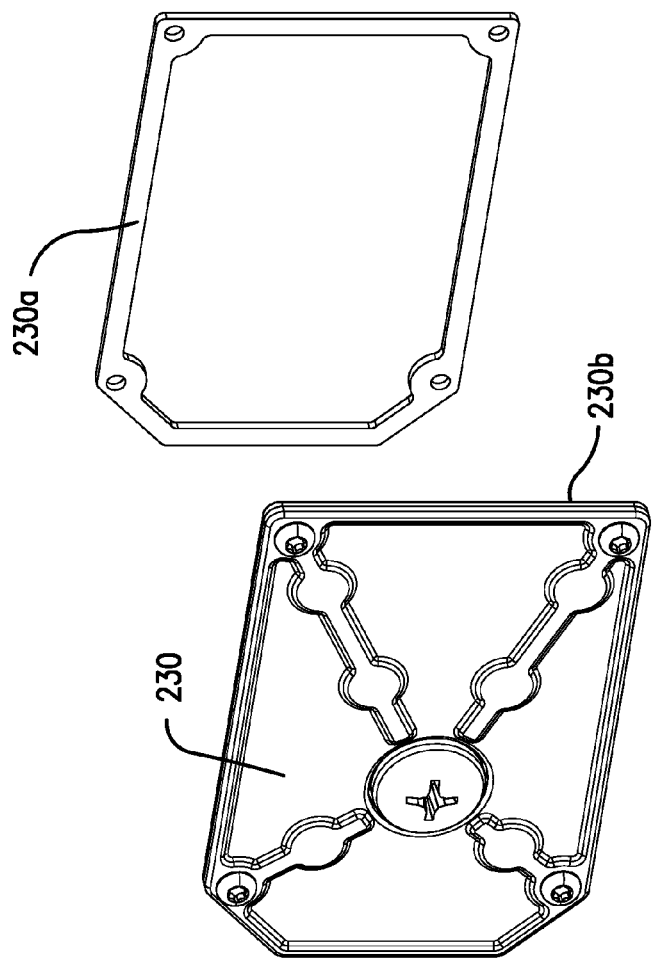
Fig. 15.

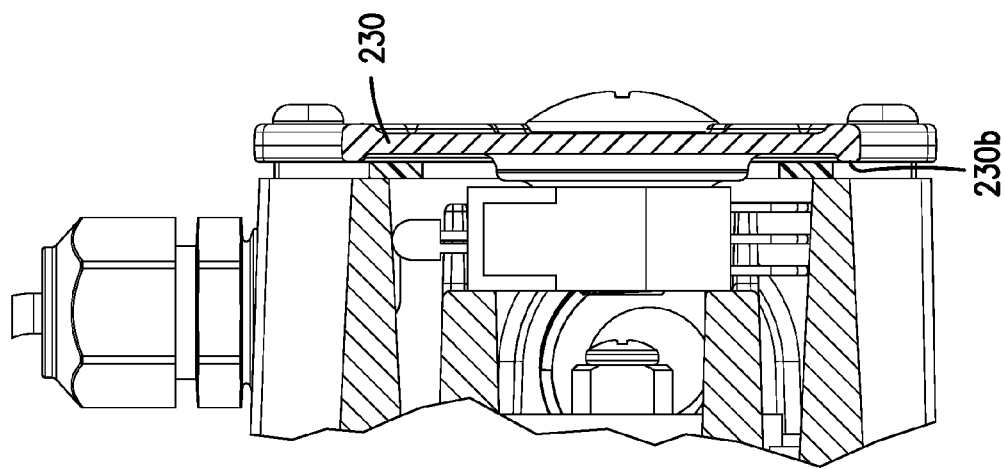
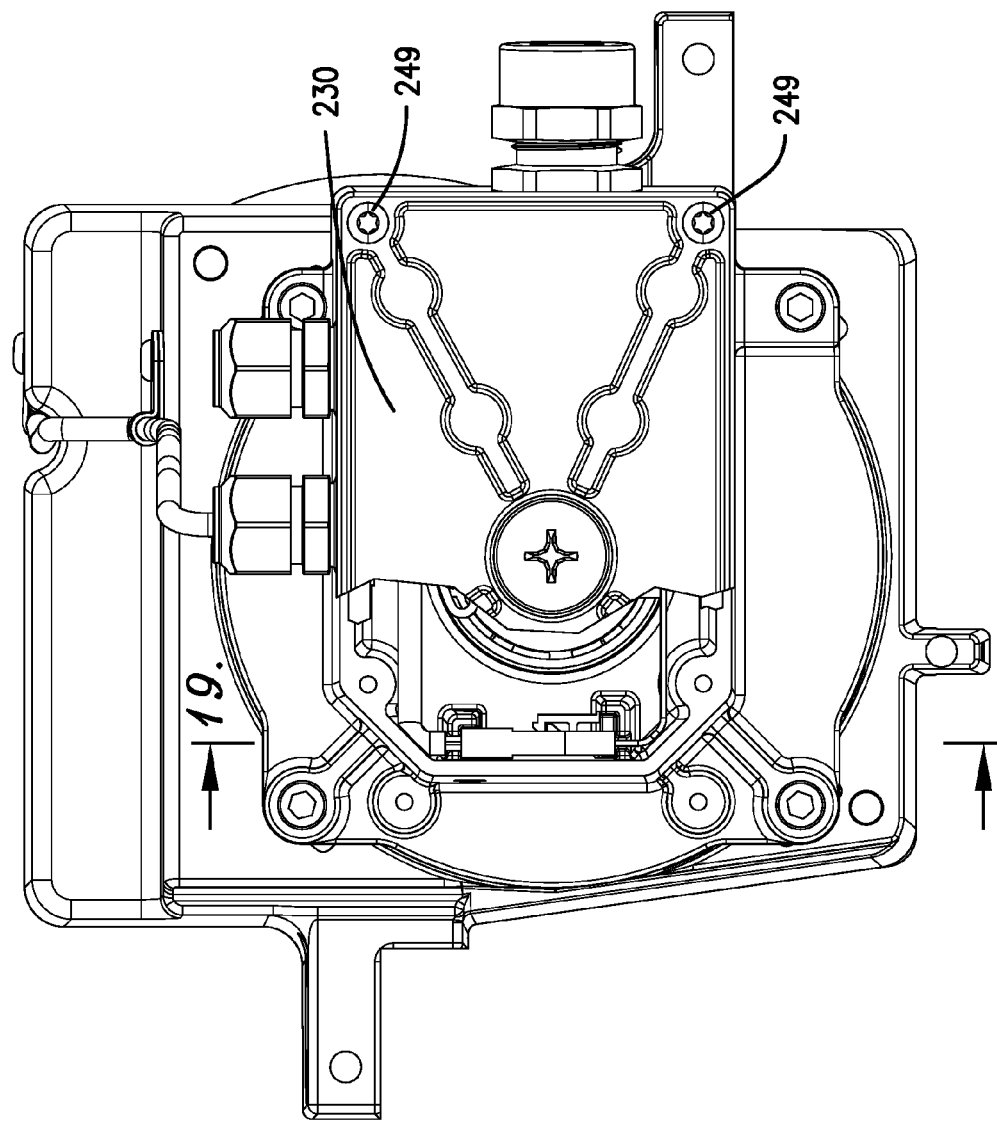

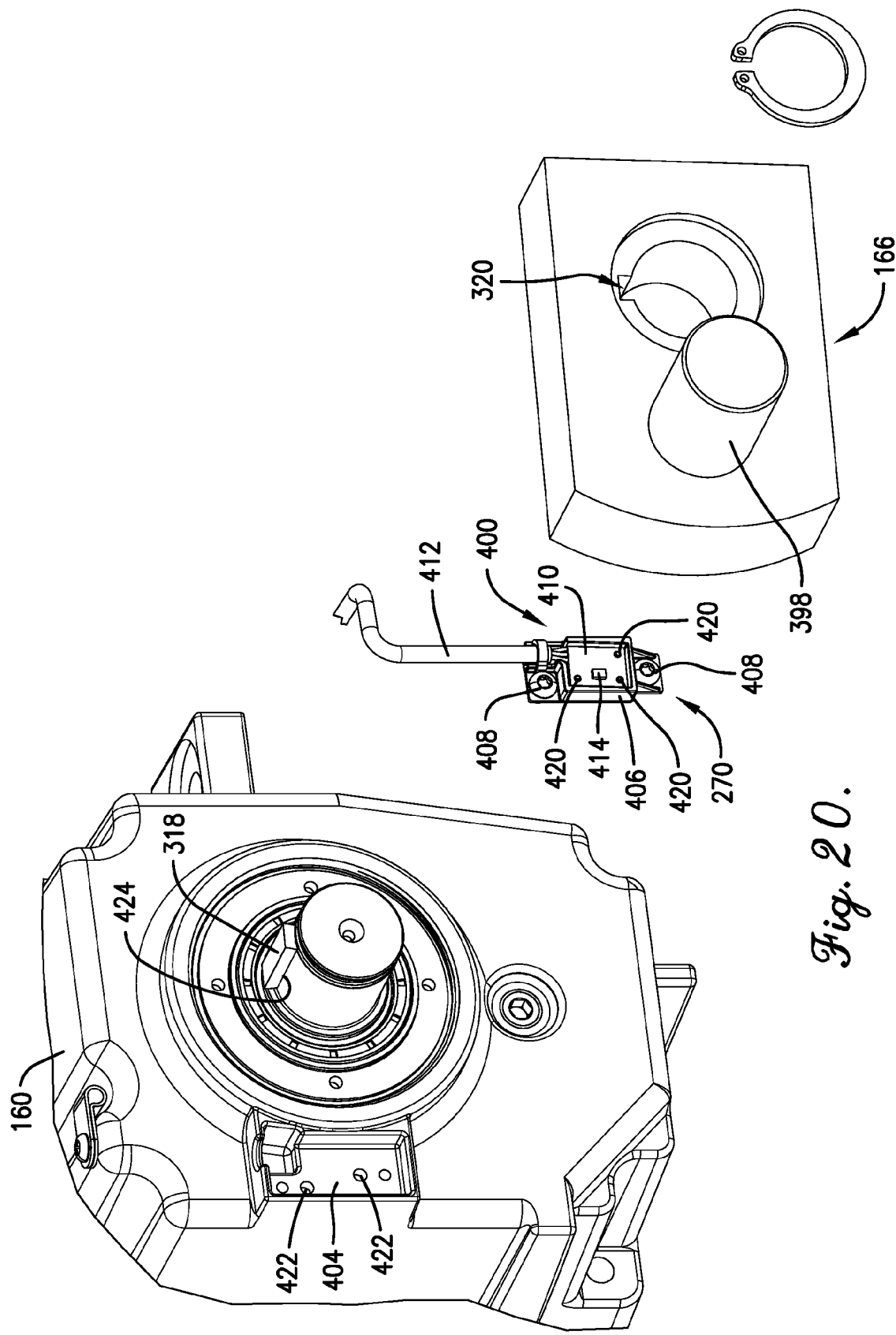

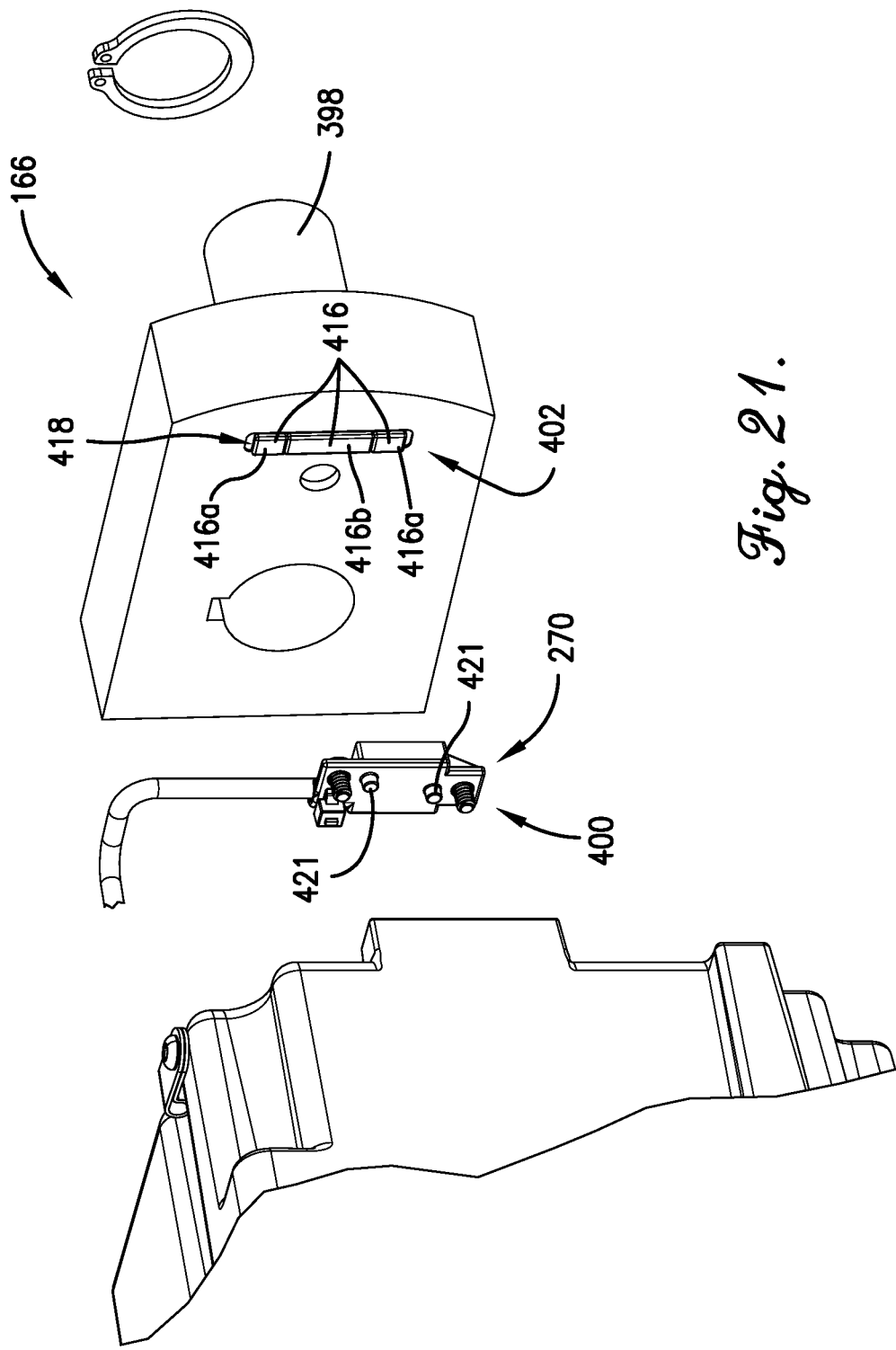

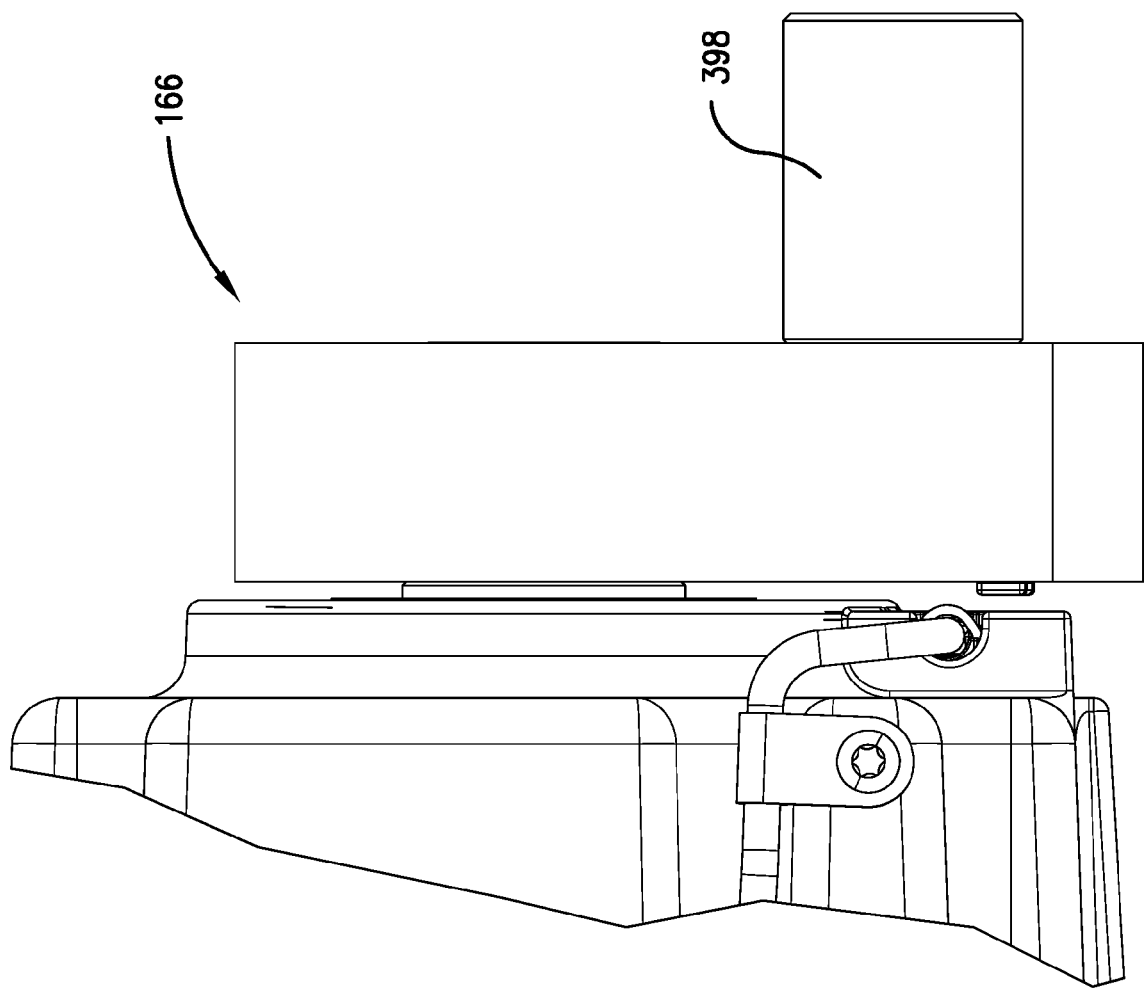

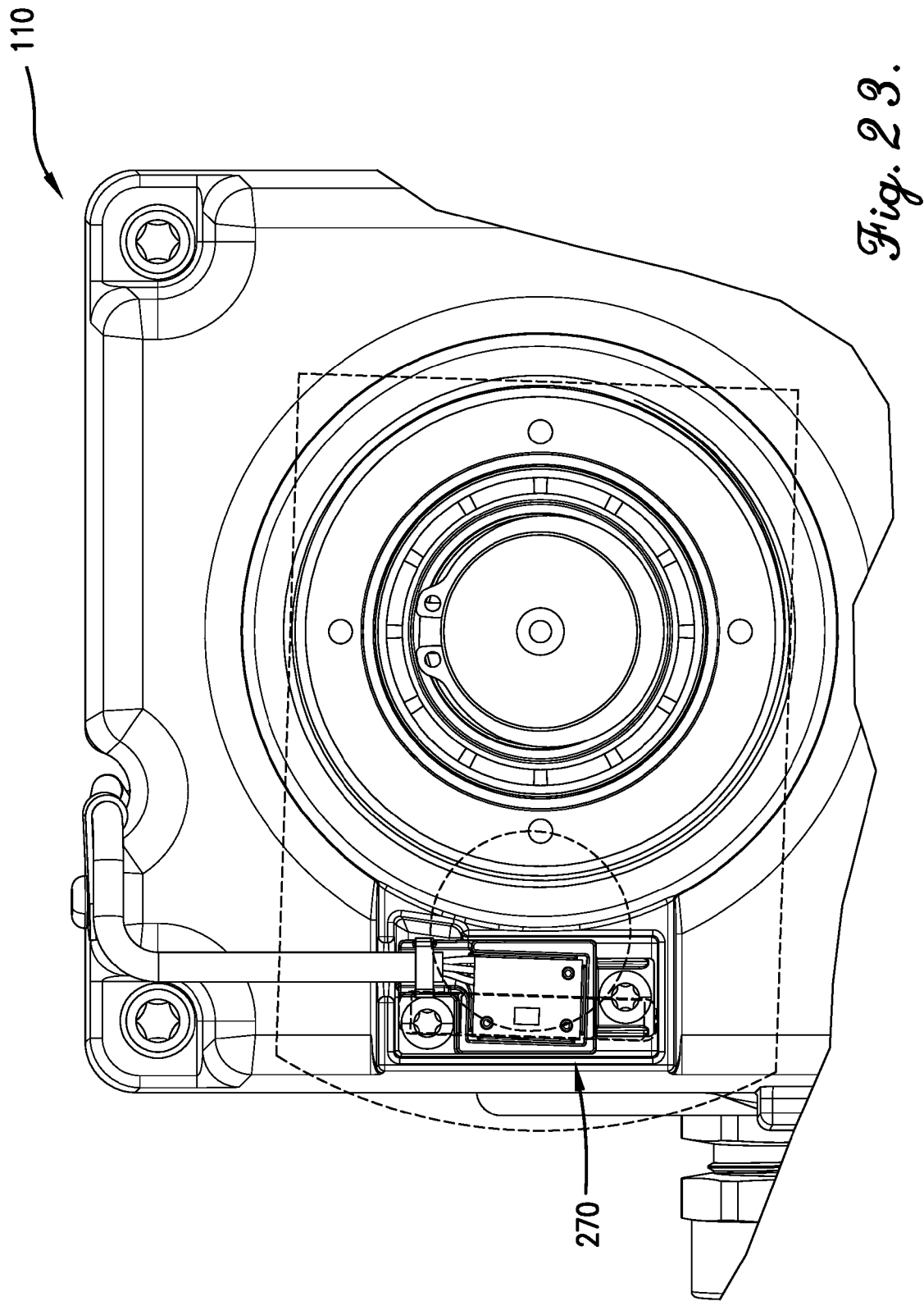

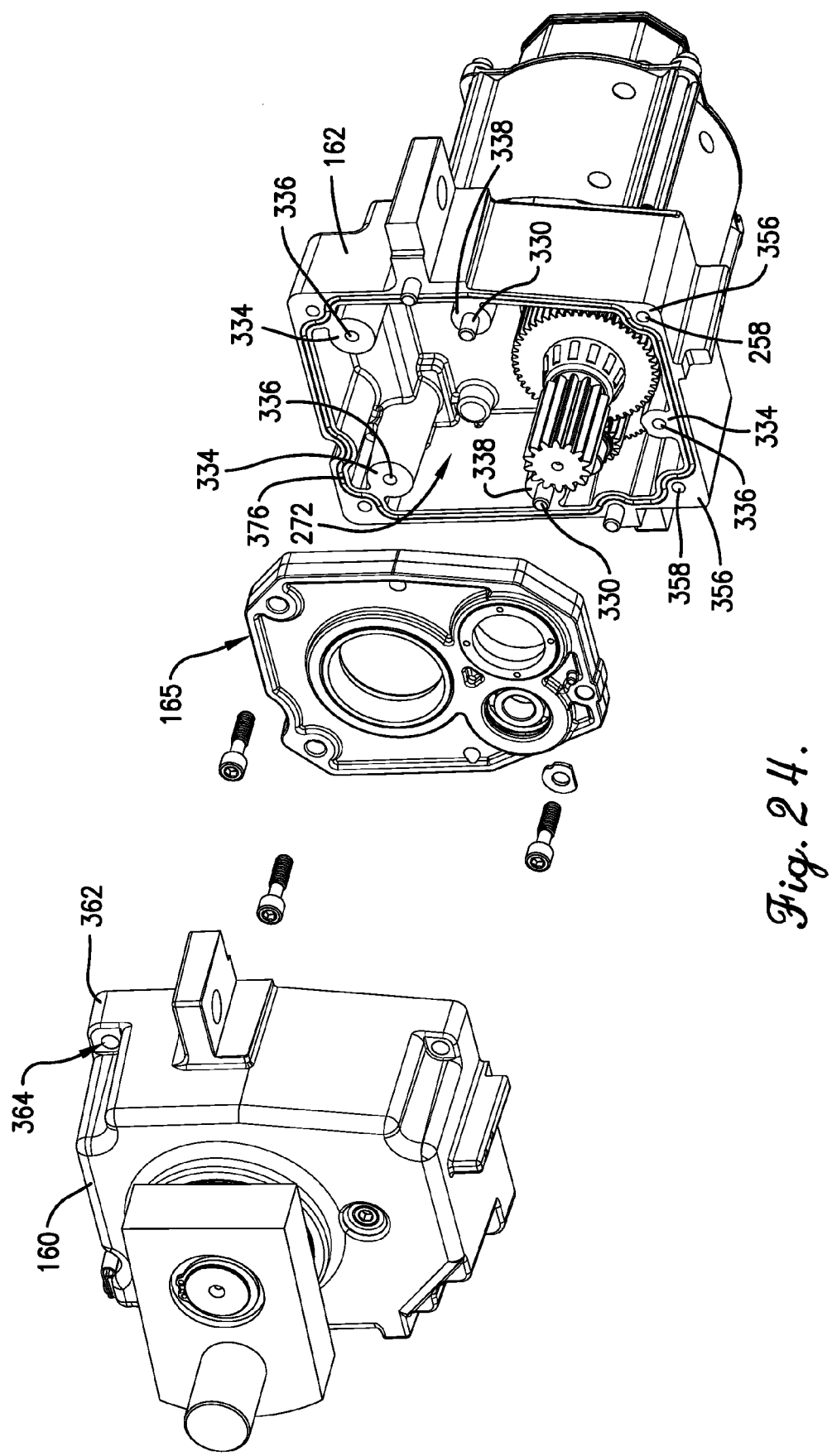

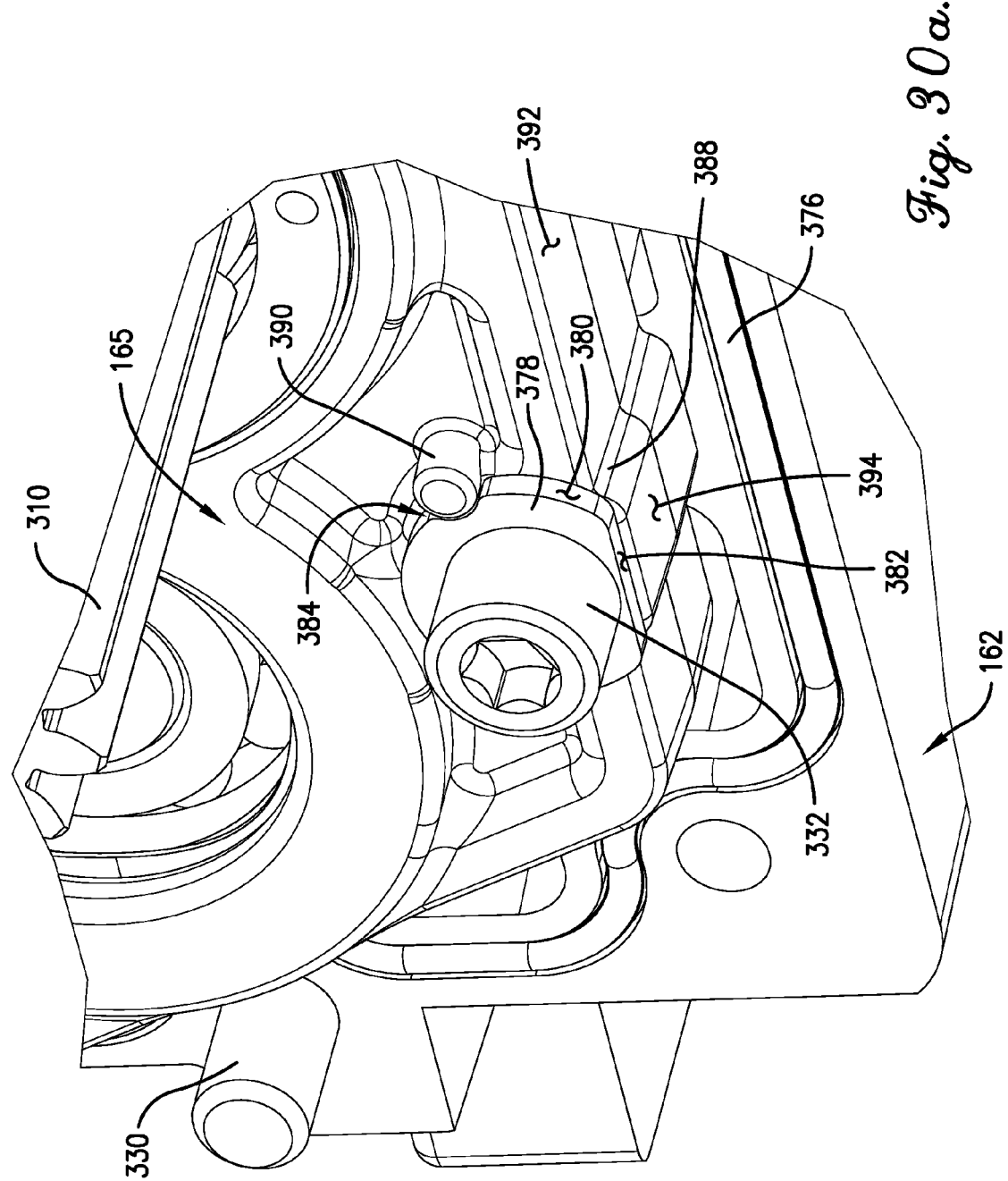

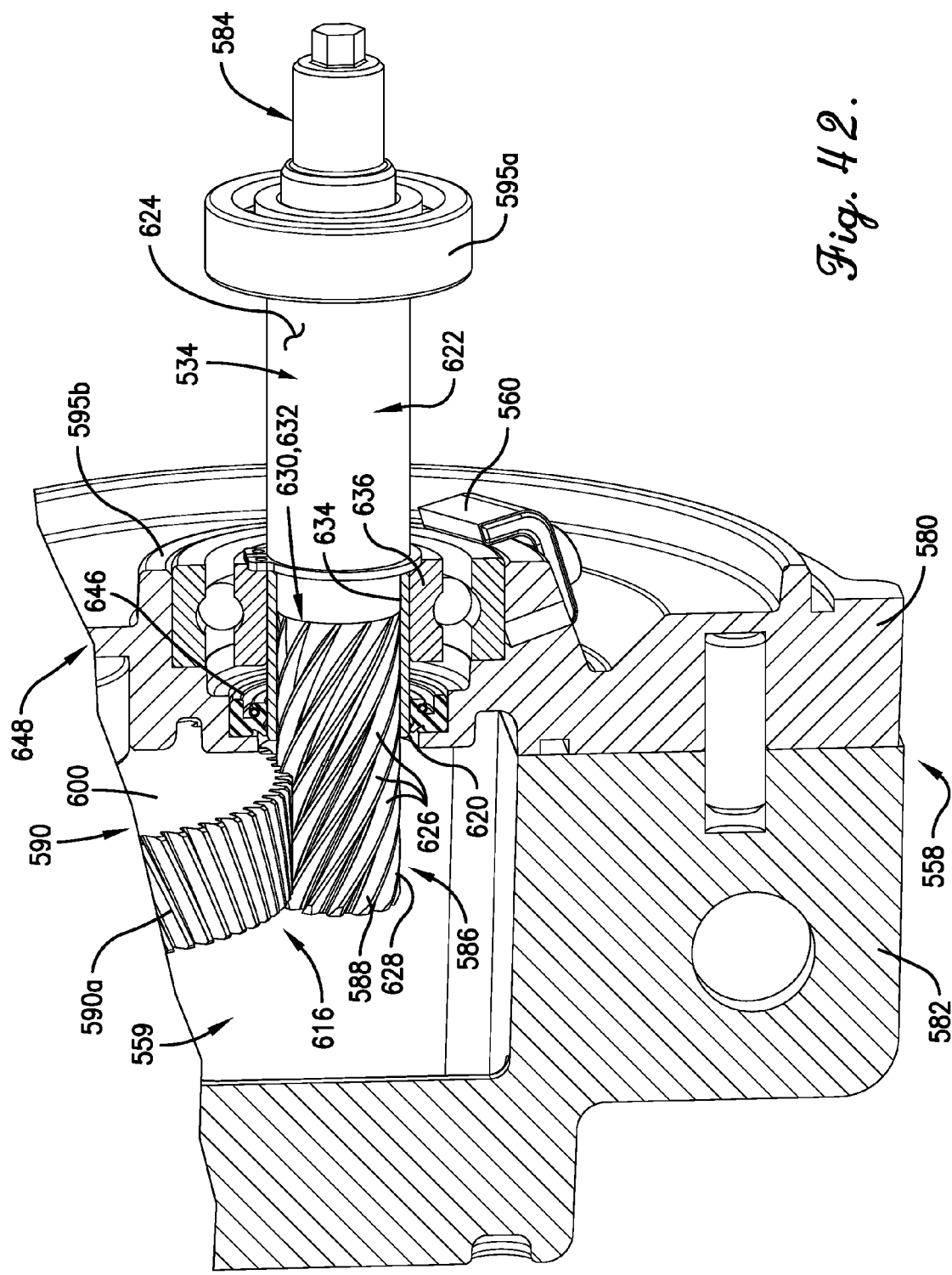

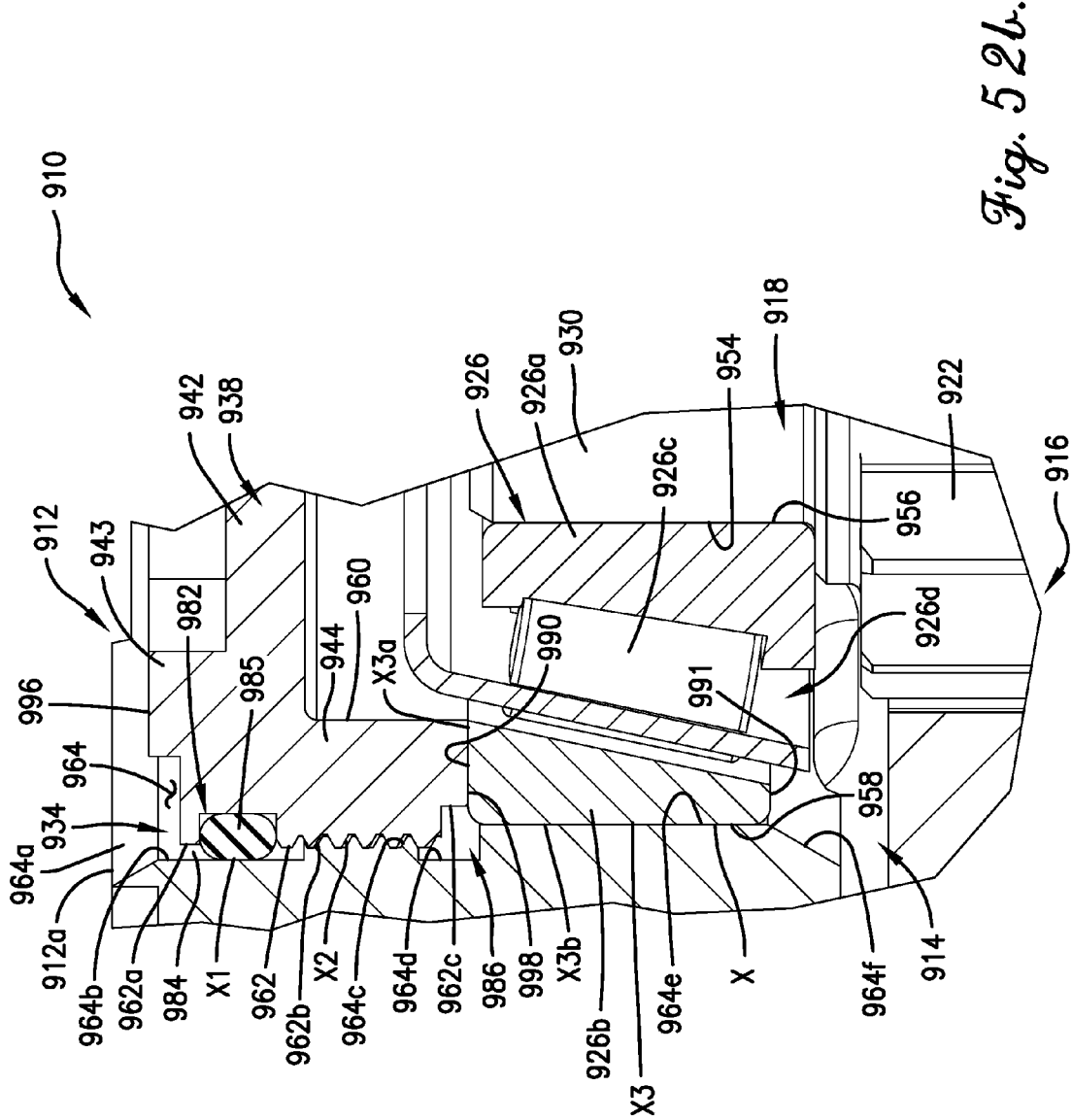

SEALING SLEEVE FOR GEARED SHAFT OF GEARMOTOR ASSEMBLY

CROSS-REFERENCE TO RELATED APPLICATIONS

1. Priority Applications

The present application claims priority from U.S. Provisional Patent Application No. 62/245,181, filed Oct. 22, 2015, and entitled ELECTRIC MOTOR, and U.S. Provisional Patent Application No. 62/300,032, filed Feb. 25, 2016, and entitled MECHANICAL SEAL FOR GEARMOTOR ASSEMBLY HAVING THREADED BEARING RETAINER, the entire disclosure of each of which is hereby incorporated by reference herein

2. Contemporaneously Filed Applications

The present application is filed contemporaneously with U.S. patent application Ser. No. 15/331,567, entitled INTERNAL BEARING PLATE FOR GEARMOTOR ASSEMBLY, filed Oct. 21, 2016; and U.S. patent application Ser. No. 15/331,569, entitled MECHANICAL SEAL FOR GEARMOTOR ASSEMBLY HAVING THREADED BEARING RETAINER, filed Oct. 21, 2016. The entire disclosure of each of the aforementioned contemporaneously filed applications is hereby incorporated by reference herein.

BACKGROUND OF THE INVENTION

1. Field of the Invention

The present invention relates generally to electric motors. More particularly, a preferred embodiment of the present invention concerns electric lift, locomotion, and turntable motors. The motors are preferably for use in a robot for use in a warehousing system, although any one or more of a variety of motor uses (which may vary between the aforementioned motors) are suitable.

2. Discussion of the Prior Art

Those of ordinary skill in the art will appreciate that a variety of considerations are integral to electric motor design and ensuing performance. Such considerations may be directed at features including but not limited to operational efficiency, power, noise, sealing, ease of assembly, cost, motor envelope, and manufacturing techniques.

SUMMARY

According to one aspect of the present invention, a motor is provided. The motor comprises a shaft rotatable about an axis, an engaged component engaged by the shaft, a sleeve fixed to the shaft to rotate therewith, and a seal at least partly circumscribing the shaft. The shaft includes an engagement region presenting a substantially variable outer shaft surface that at least in part engages the engaged component. The sleeve includes a first section that at least partly circumscribes and engages the engagement region of the shaft. The first section of the sleeve presents an outer seal-engaging surface. The seal at least partly circumscribes the engagement region of the shaft and the first section of the sleeve to sealingly engage the seal-engaging surface of the sleeve.

According to another aspect of the present invention, a motor is provided. The motor comprises a shaft rotatable about an axis, an engaged component engaged by the shaft, a sleeve fixed to the shaft to rotate therewith, and a bearing rotatably supporting the shaft. The shaft includes an engagement region presenting a substantially variable outer shaft surface that at least in part engages the engaged component. The sleeve includes a first section that at least partly circumscribes and engages the engagement region of the shaft. The first section of the sleeve presents an outer bearing-engaging surface. The bearing at least partly circumscribes the engagement region of the shaft and the first section of the sleeve to engage the bearing-engaging surface of the sleeve.

BRIEF DESCRIPTION OF THE DRAWING FIGURES

Preferred embodiments of the invention are described in detail below with regard to the attached drawing figures, wherein:

FIG. 6 is an exploded rear perspective view of the lift motor of FIGS. 2-5;

FIG. 7 is an enlarged perspective view of a portion of the lift motor of FIG. 2-6, particularly illustrating the bearing lock in an open position;

FIG. 8 is a partially cross-sectioned side view particularly illustrating the bearing lock of FIG. 7 in the open position;

FIG. 15 is a partially exploded rear perspective view of the conduit box of the lift motor of FIGS. 2-6;

FIG. 18 is a rear view of the conduit box of FIGS. 15-17, particularly illustrating the wire connector and wire connector seat;

FIG. 19 is a cross-sectional side view of a portion of the conduit box of FIGS. 15-18, particularly illustrating the wire connector and the wire connector seat;

FIG. 20 is a partially exploded front perspective view of a portion the lift motor of FIGS. 2-6, particularly illustrating the lift arm and the lift arm position sensor;

FIG. 21 is a partially exploded rear perspective view of the portion of the lift motor of FIG. 20, particularly illustrating the lift arm and the lift arm position sensor;

FIG. 22 is a side view of the portion of the lift motor of FIGS. 20 and 21, particularly illustrating the lift arm and the lift arm position sensor;

FIG. 23 is a front view of the portion of the lift motor of FIGS. 20-22, with the lift arm removed, particularly illustrating the lift arm position sensor;

FIG. 24 is a partially exploded front perspective view of the lift motor of FIGS. 2-6, particularly illustrating the construction of the housing and the internal bearing plate;

FIG. 30a is a greatly enlarged front perspective view of a portion of the internal bearing plate and housing as shown in FIG. 30, particularly illustrating the D-shaped washer;

FIG. 34 is a rear perspective view of the locomotion motor of FIGS. 2 and 33;

FIG. 42 is an enlarged side perspective view of a portion of the locomotion motor of FIGS. 2, 33, and others, particularly illustrating the sealing sleeve;

FIG. 52b is a greatly enlarged cross-sectional view of a portion of the turntable motor portion shown in FIG. 52, particularly illustrating the mechanical seals associated with the intermediate shaft;

Figure 1:
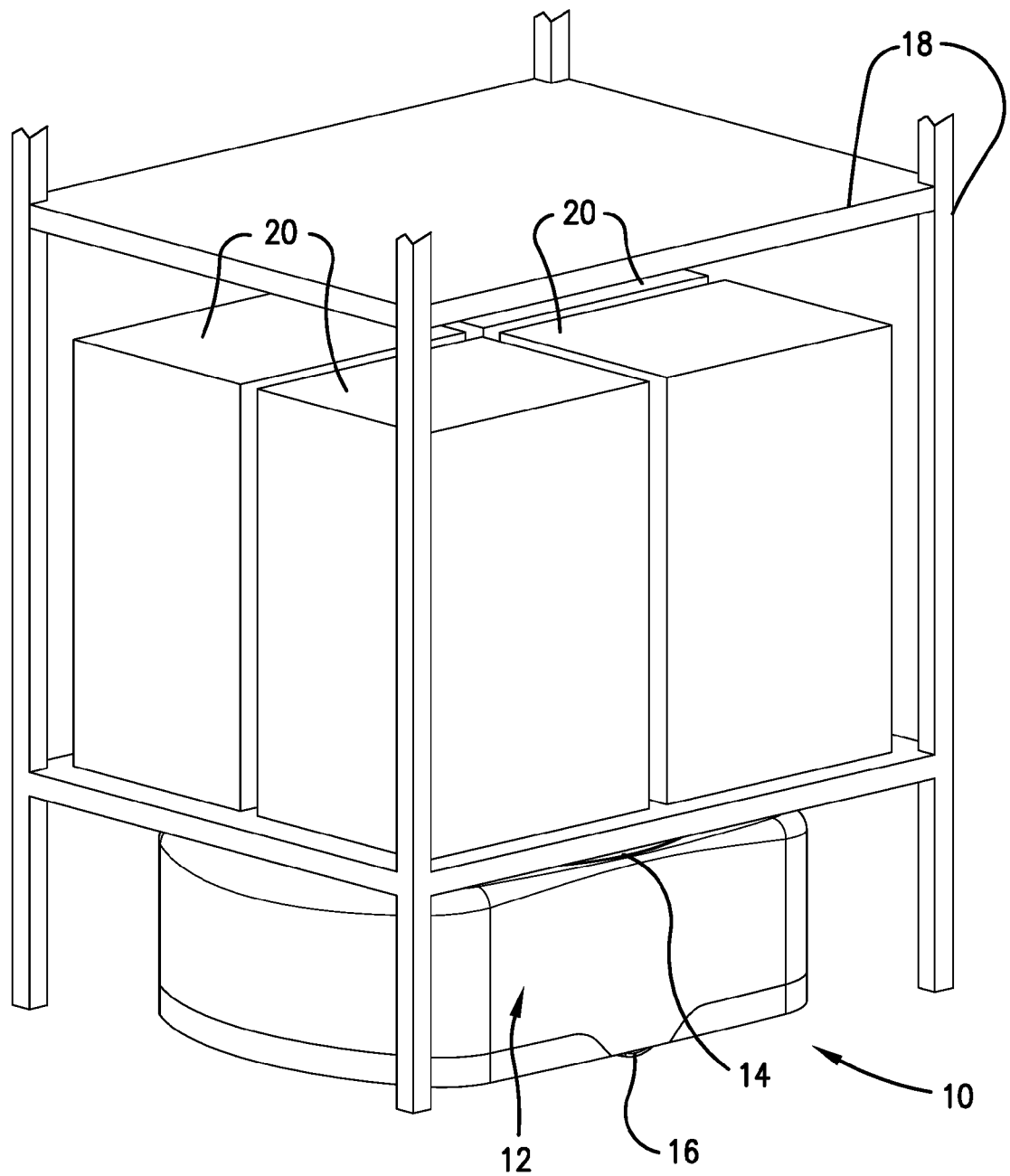
FIG. 1 is a perspective view of a robot, shelving, and goods, wherein the robot is operable to transport the shelving and goods.
Figure 2:
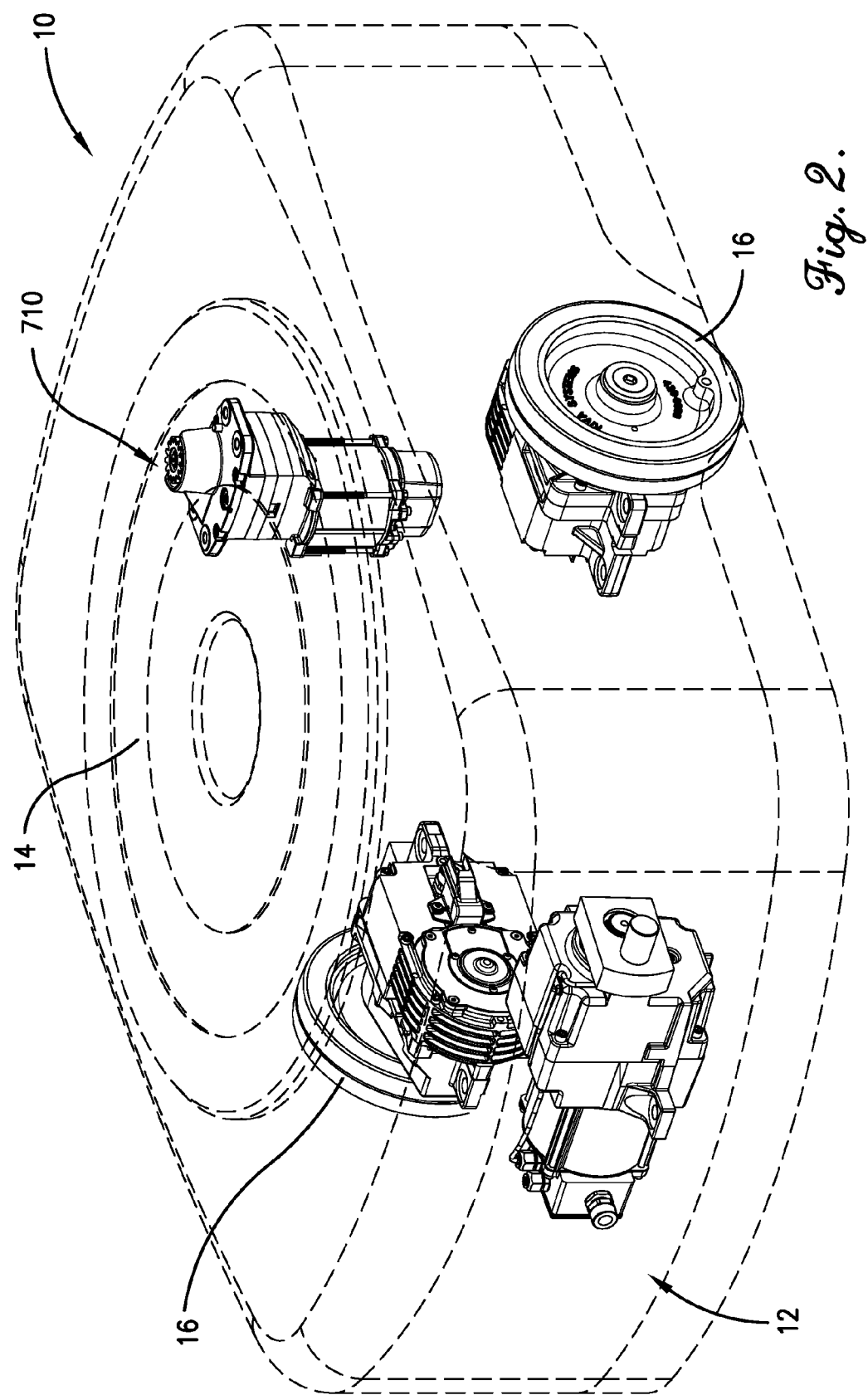
FIG. 2 is a perspective view of the robot of FIG. 1, including the lift, locomotion and turntable motors provided in the robot in accordance with a preferred embodiment of the present invention.
Figure 3:
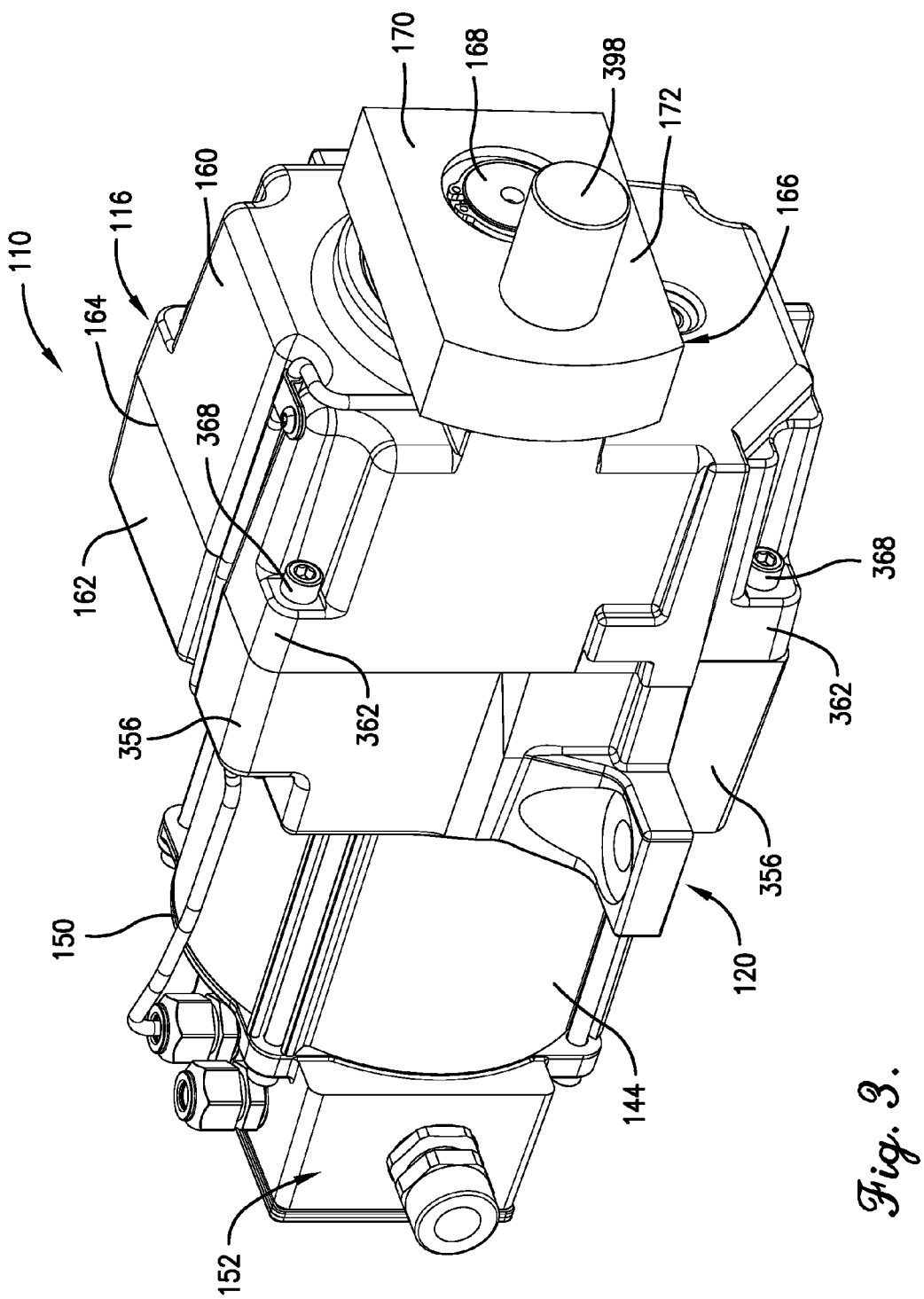
FIG. 3 is a front perspective view of the lift motor of FIG. 2.
Figure 4:
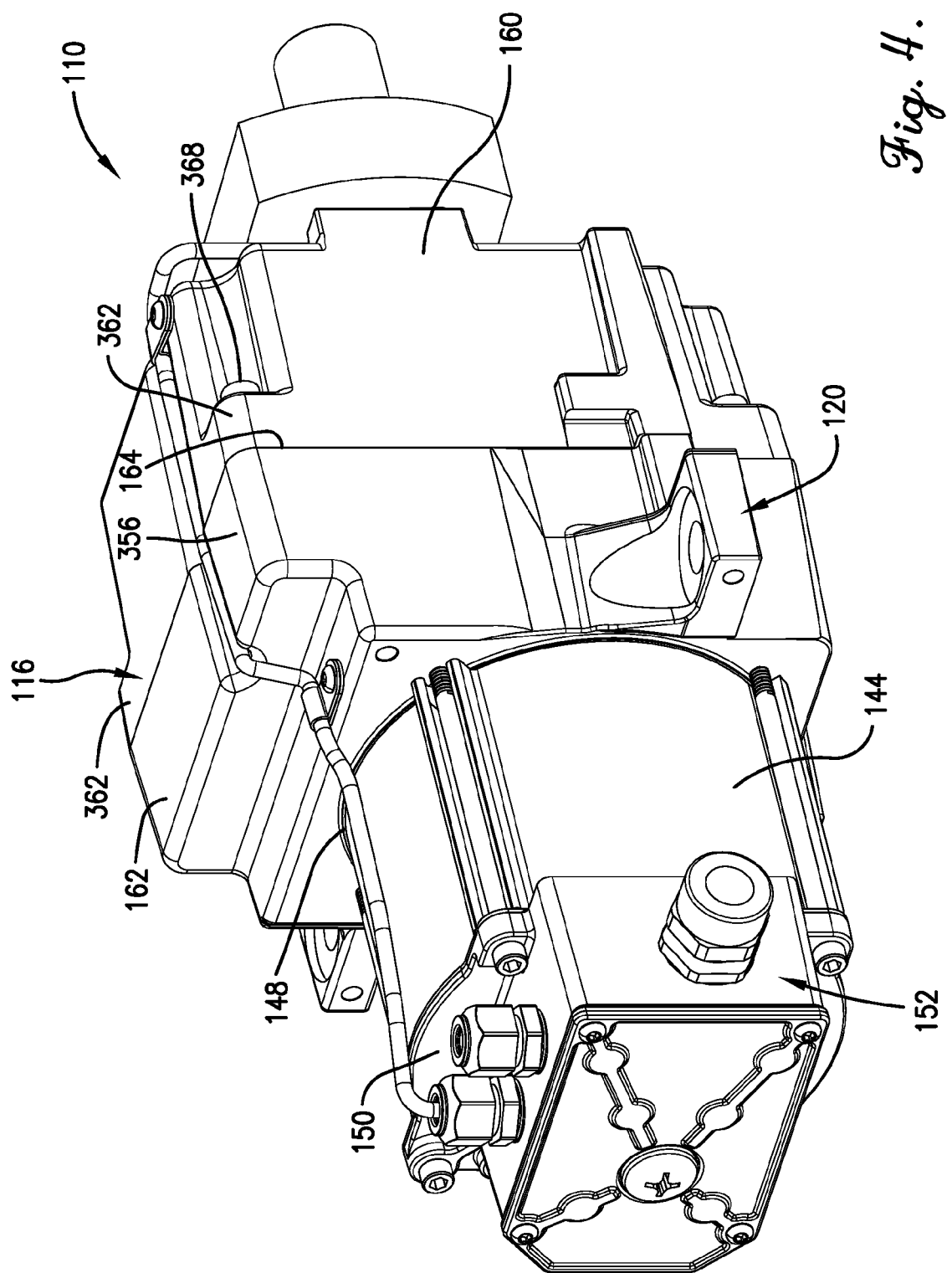
FIG. 4 is a rear perspective view of the lift motor of FIGS. 2 and 3.

The drawing figures do not limit the present invention to the specific embodiments disclosed and described herein. The drawings are not necessarily to scale, emphasis instead being placed upon clearly illustrating the principles of the preferred embodiments.

Furthermore, directional references (e.g., top, bottom, front, back, side, etc.) are used herein solely for the sake of convenience and should be understood only in relation to each other. For instance, a component might in practice be oriented such that faces referred to as "top" and "bottom" are sideways, angled, inverted, etc. relative to the chosen frame of reference.

It is also noted that, as used herein and unless otherwise specified, the terms axial, axially, and variations thereof mean the defined element has at least some directional component along or parallel to the axis. These terms should not be limited to mean that the element extends only or purely along or parallel to the axis. For example, the element may be oriented at a forty-five degree (45) angle relative to the axis but, because the element extends at least in part along the axis, it should still be considered axial. Similarly, the terms radial, radially, and variations thereof shall be interpreted to mean the element has at least some directional component in the radial direction relative to the axis, unless otherwise specified.

It is further noted that, unless otherwise specified, the term annular shall be interpreted to mean that the referenced object extends around a central opening so as to be generally toroidal or ring-shaped. It is not necessary for the object to be circular, nor does the object have to be continuous. Similarly, unless otherwise specified, the term toroidal shall not be interpreted to mean that the object must be circular or continuous.

DETAILED DESCRIPTION OF THE PREFERRED EMBODIMENTS

In a preferred embodiment of the present invention, a robot 10 is provided. The robot 10 preferably includes a main body 12 supported on a chassis (not shown), a support platform 14, and a pair of wheels 16 enabling the robot 10 to have a zero-turn radius.

The robot 10 is preferably configured to transport goods in a warehouse environment. For instance, in a preferred embodiment, the robot 10 is configured to transport shelving 18 and various goods 20 supported thereon through a warehouse environment. More particularly, the robot 10 is preferably operable at least to (1) lift the shelving 18 and associated goods 20 on the platform 14; (2) rotate at least a portion of the platform 14 so as to appropriately orient the shelving 18 and goods 20 supported by the platform 14; (3) transport the shelving 18 and goods 20 on the platform 14 from one location to another in the warehouse, making use of the wheels 16; (4) deposit the shelving 18 and goods 20 at their new location through lowering of the platform 14; and (5) completely disengage from the shelving 18 and goods 20 via lowering of the platform 14 so as to no longer be in contact with the shelving 18 and/or goods 20.

The robot 10 is preferably provided with numerous features to enable such operation, including but not limited to one or more printed circuit boards, sensors, cameras, and communication devices. A control system (not shown) is also preferably provided to control each robot 10 and to synchronize operation of multiple robots 10 in a warehouse.

The robot 10 is preferably battery-powered and rechargeable.

In a preferred embodiment, the robot 10 includes four (4) motors: a lift motor 110 operable to raise the platform 14, preferably but not necessarily with the assistance of a scissor lift mechanism or other lifting aid (not shown); a pair of locomotion motors 510, each of which is associated with a respective one of the wheels 16, and which cooperatively enable the robot 10 to travel through the warehouse; and a turntable motor 710 operable to rotate and stabilize at least a portion of the platform 14. Each of these motors 110, 510, 710 will be described in detail below.

Preferably, the turntable motor 710 is mounted between the chassis and the platform 14. The lift motor 110 and the locomotion motors 510 are preferably mounted directly to the chassis.

Although the turntable motor 710, the lift motor 110, and the locomotion motors 510 are preferably part of the robot 10 and function generally as described above, it is within the scope of the present invention for the motors to instead be provided in an alternative application and/or to be provided separately from one another. For instance, the locomotion motors might instead be provided for use in an electric vehicle for human transport, the turntable motor might be used to operate a rotating display, or the lift motor might be used to raise and lower a load that is in no manner associated with a warehouse operation.

Lift Motor

A preferred embodiment of the lift motor 110 is shown in detail in FIGS. 3-32*a*. In a preferred embodiment, the lift motor 110 broadly includes a rotor 112 rotatable about an axis, a stator 114, a gearbox assembly 116, a lift arm assembly 118, and a motor mounting assembly 120.

The lift motor 110 is preferably oriented such that the axis extends generally horizontally and the mounting assembly 120 generally serves as a base or bottom structure. The lift arm assembly 118 is thus positioned on an axial end of the lift motor 110. It is permissible, however, in connection with certain aspects of the present invention, for the lift motor to be alternatively oriented. That is, unless otherwise specified or made clear, the directional references made herein with regard to the lift motor 110 (e.g., top, bottom, upper, lower, etc.) are used solely for the sake of convenience and should be understood only in relation to each other. For instance, a component might in practice be oriented such that components referred to as "top" and "bottom" are sideways, angled, inverted, etc. relative to the chosen frame of reference.

The lift arm assembly 118 preferably indirectly engages the platform 14 via a scissor mechanism (not shown) to raise and lower the platform 14. Such a configuration is not necessary, however.

Stator Overview

Figure 5:
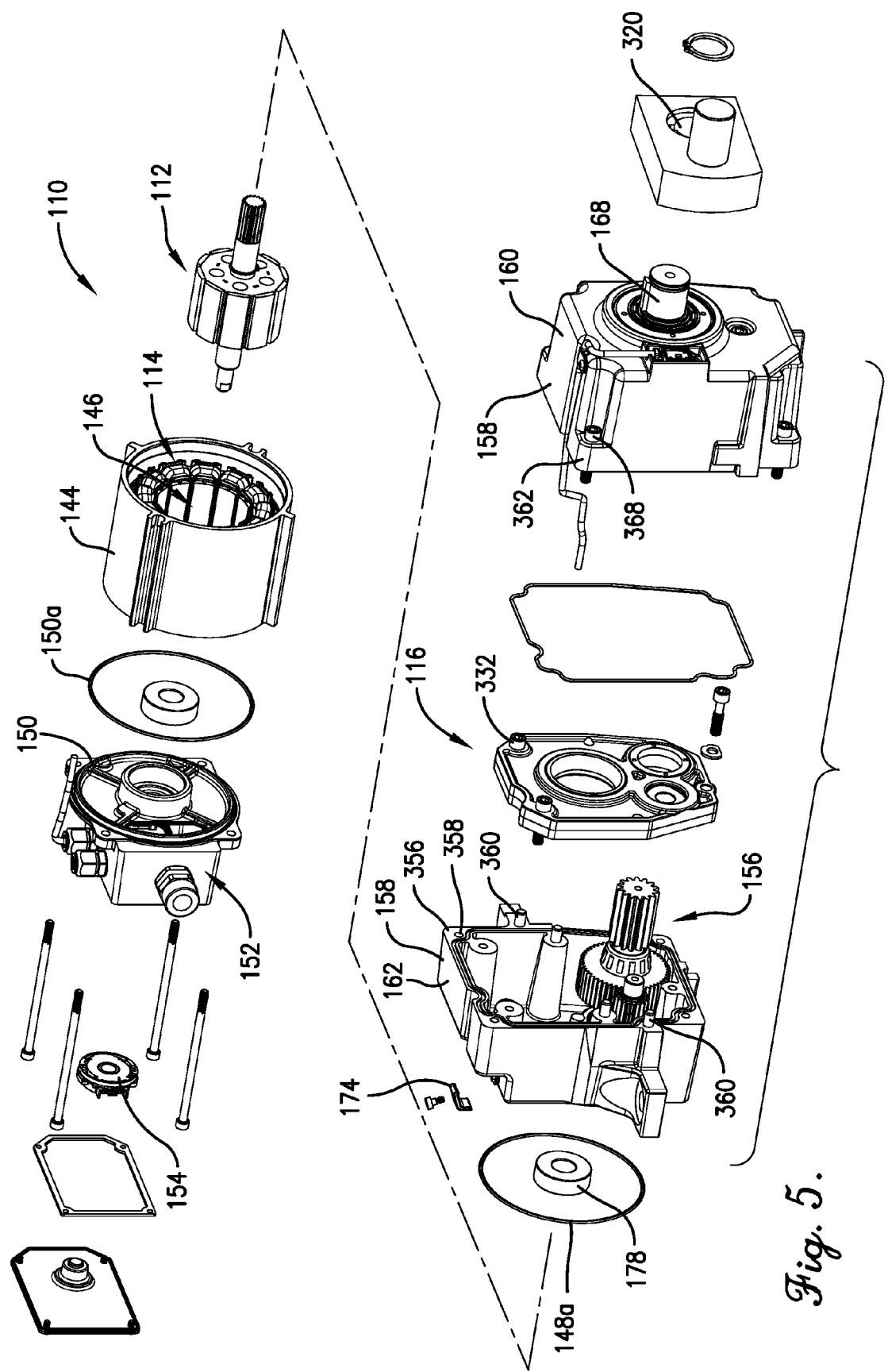
FIG. 5 is an exploded front perspective view of the lift motor of FIGS. 2-4.

As best shown in FIGS. 5 and 6, the stator 114 preferably includes a generally toroidal stator core 122 and a plurality of coils 124 wound about the stator core 122. The stator core 122 is preferably a laminated stator core, although it is permissible for the stator core to be non-laminated. The stator core 122 preferably comprises a ferromagnetic material such as steel, although use of any one or more electrically conductive materials is permissible without departing from the scope of the present invention.

The laminations of the stator core 122 are preferably interlocked to restrict relative axial shifting, although other configurations (e.g., non-interlocked laminations) are permissible.

The stator core 122 preferably includes a plurality of arcuately spaced apart teeth 126. In a preferred embodiment, each of the teeth 126 includes a generally circumferentially extending yoke, a generally radial arm extending from the yoke and having an end, and a crown extending generally circumferentially from the end.

The lift motor 110 is preferably an inner rotor motor, with the stator 114 at least substantially circumscribing the rotor 112. More particularly, each yoke preferably engages a pair of adjacent yokes, such that the yokes cooperatively present an outer circumferential stator core face. The crowns cooperatively present a discontinuous inner circumferential stator core face 128 that faces the rotor 112. As will be discussed in greater detail below, a circumferentially extending radial gap (not shown) is preferably formed between the inner circumferential stator core face 128 and the rotor 112.

Each tooth 126 preferably presents an upper tooth face, a lower tooth face, and two side tooth faces. The teeth 126 preferably cooperatively present an upper stator core face and a lower stator core face.

It is permissible according to some aspects of the present invention for the stator core to be alternatively configured, however. Among other things, for instance, the stator core could comprise a plurality of interconnected multi-tooth segments, comprise one or more helically wound laminations, or comprise stacked annular laminations each formed from a single punched strip.

The coils 124 are preferably wound about the arms of the teeth 126. More particularly, a slot 130 is defined between each adjacent pair of teeth 126. The coils 124 are preferably wound about the teeth 126 and through the slots 130 so as to circumscribe respective ones of the arms.

The coils 124 preferably comprise electrically conductive wiring 132. The wiring 132 is preferably wound multiple times about each tooth 126 to form a plurality of turns or loops. The wiring 132 is preferably formed of copper or aluminum, although any one or more of a variety of electrical conductive materials or a combination thereof may be used within the ambit of the present invention.

Furthermore, the wiring 132 may be coated or uncoated.

Yet further, as will be discussed in greater detail below, the wiring 132 constitutes other components beyond the coils 124 alone (e.g., power wiring, sensor wiring etc.).

As is customary, the wiring 132 is wound around the teeth 126 in a particular manner according to the configuration and desired performance characteristics of the lift motor 110.

The stator core 122 is preferably electrically insulated by means of electrically insulative endcaps 134 fitted over portions of the teeth 126. Each endcap 134 preferably comprises an at least substantially electrically insulative material. For instance, a plastic or synthetic resin material may be used.

In a preferred embodiment and as best shown in FIGS. 5 and 6, each endcap 134 provides both a physical and electrical barrier between the coils 124 and the stator core 122, with a pair of endcaps 134 fitted over opposite axial sides (corresponding to the upper and lower stator core faces) of a corresponding tooth 126 and engaging one another at an endcap juncture so as to in part encompass the tooth 126.

However, it is noted that use of any one or more of a variety of insulation means, including but not limited to the use of electrically insulative overmolding, powder-coating, and/or liners, is permissible according to some aspects of the present invention. It is also permissible according to some aspects of the present invention for the stator core to be devoid of electrical insulation.

The lift motor 110 preferably includes twelve (12) teeth 126 defining twelve (12) slots 130.

Rotor Overview

As best shown in FIGS. 5 and 6, the rotor 112 preferably includes a rotor core 136, a plurality of arcuately arranged magnets 138, and a motor shaft 140.

The rotor core 136 is preferably a laminated rotor core, although it is permissible for the rotor core to be non-laminated. The rotor core 136 preferably comprises a ferromagnetic material such as steel, although use of any one or more electrically conductive materials is permissible without departing from the scope of the present invention.

The laminations of the rotor core 136 are preferably interlocked, although other configurations (e.g., non-interlocked laminations) are permissible.

The rotor core 136 is preferably generally decagonal in cross-section so as to define ten (10) magnet-mounting faces, although other shapes (e.g., round or hexagonal) and numbers of faces are permissible according to some aspects of the present invention. The magnets 138 are preferably mounted to corresponding ones of the magnet-mounting faces through use of a glue or adhesive. Alternative means of securing the magnets fall within the scope of the present invention. Preferably, however, the magnet retention means are sufficient to restrict magnet dislodgement at all speeds of the lift motor 110. The magnet retention means should also be sufficient to restrict magnet dislodgement at all possible magnet temperatures during operation.

The magnets 138 are preferably high-grade rare earth magnets. Other magnet types may be used without departing from some aspects of the present invention, however. For instance, according to some aspects of the present invention, the magnets might be of a lower grade and/or comprise ferrite.

In a preferred embodiment, the magnets 138 include nickel-copper-nickel plating. Alternative plating or no plating is permissible, however.

The magnets 138 preferably have a "bread loaf" geometry, including a flat base for mounting to the corresponding magnet-mounting face, a pair of flat sidewalls, flat front and rear walls, and a rounded top. The tops preferably cooperatively present an outer circumferential rotor face 142.

The aforementioned gap (not shown) is preferably formed between the inner circumferential stator core face 128 and the outer circumferential rotor face 142.

In a preferred embodiment, ten (10) magnets 138 are provided and define ten (10) poles. Magnet quantities and numbers of defined poles may vary within the ambit of the present invention, however.

In keeping with the above-described preferred stator core 122, which defines twelve (12) slots, it is noted that the lift motor 110 is preferably a twelve (12) slot, ten (10) pole motor. It is permissible according to some aspects of the present invention, however, for the lift motor to have a different number of slots and poles maintaining the preferred twelve (12) slot:ten (10) pole ratio or for an entirely different slot to pole ratio to be defined.

In a preferred embodiment, the rotor core 136 presents upper and lower rotor core faces. The magnets 138 are preferably sized so as to not extend past the upper and lower rotor core faces.

The lift motor 110 further preferably includes a motor shell 144 at least substantially circumscribing the stator 114 and in part defining a motor chamber 146 that at least substantially receives the stator 114 and the rotor 112.

In a preferred embodiment, the lift motor 110 includes a first endshield 148 that at least substantially encloses one end of the motor chamber 146 and a second endshield 150 that at least substantially encloses the other end of the motor chamber 146. The motor shell 144 preferably extends between and interconnects that first and second endshields 148 and 150. Furthermore, respective gaskets 148*a* and 150*a* are preferably provided to seal the interfaces between the motor shell 144 and the first and second endshields 148 and 150.

The lift motor 110 further preferably includes a conduit box 152 enclosing an encoder 154, wiring 132 (the wiring 132 being a continuance of the wiring comprising the coils 124), and other electronic components (not shown) for operation of the lift motor 110. As will be discussed in greater detail below, the conduit box 152 is preferably secured at least substantially at one axial end of the lift motor 110. More particularly, the conduit box 152 is preferably integrally formed with the second endshield 150. A non-integral configuration (e.g., one that relies on fasteners, welds, adhesives, and/or other interconnection means to fix the conduit box relative to the second endshield) may be provided instead, however, according to some aspects of the present invention.

The lift motor 110 further preferably includes the aforementioned gearbox assembly 116, comprising a gear train 156 at least substantially enclosed in a gearbox housing 158. As will be discussed in greater detail below, the gearbox housing 158 preferably comprises an upper casting 160 and a lower casting 162 that directly engage each other along an housing interface 164.

An internal bearing plate 165 is preferably disposed radially inside the gearbox housing 158 and adjacent the housing interface 164. That is, the gearbox housing 158 preferably circumscribes the bearing plate 165 such that the bearing plate 165 is enclosed within the gearbox housing 158. The gearbox housing 158 and the internal bearing plate 165 will be discussed in greater detail below.

In a preferred embodiment, as illustrated, the lower casting 162 and the first endshield 148 are integrally formed. A non-integral configuration (e.g., one that relies on fasteners, welds, adhesives, and/or other interconnection means to fix the lower casting relative to the first endshield) may be provided instead, however, according to some aspects of the present invention.

The lift motor 110 additionally preferably includes a lift arm 166, which is part of the lift arm assembly 118, pivotably mounted on an output shaft 168. The lift arm 166 includes a pivot end 170 and a lift end 172.

Bearing Lock

As illustrated in FIGS. 5-14, the lift motor 110 preferably includes a bearing lock 174 configured to facilitate assembly of the lift motor 110. More particularly, the first endshield 148 includes a motor shaft bearing housing 176. The motor shaft bearing housing 176 preferably receives a first motor shaft bearing 178 that supports the motor shaft 140 in the first endshield 148. The first motor shaft bearing 178 is preferably a ball bearing, although other bearing types are permissible within the ambit of the present invention.

The bearing lock 174 is preferably configured both to facilitate assembly of the lift motor 110 and aid in securement of the first motor shaft bearing 178 during and after assembly. More particularly, the below-described preferred configuration of the bearing lock 174 and associated structures preferably enables the lift motor 110 to be at least substantially assembled prior to placement of the first motor shaft bearing 178, with the bearing lock 174 then securing the first motor shaft bearing 178 in place (i.e., to the first endshield 148).

Figure 10:
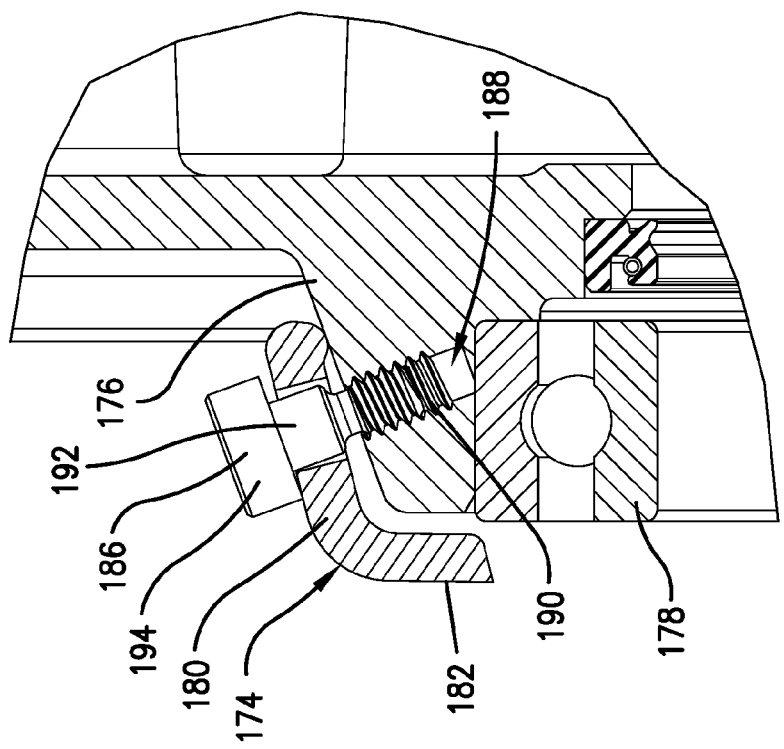
FIG. 10 is a partially cross-sectioned side view particularly illustrating the bearing lock of FIGS. 7-9 in the intermediate position.
Figure 9:
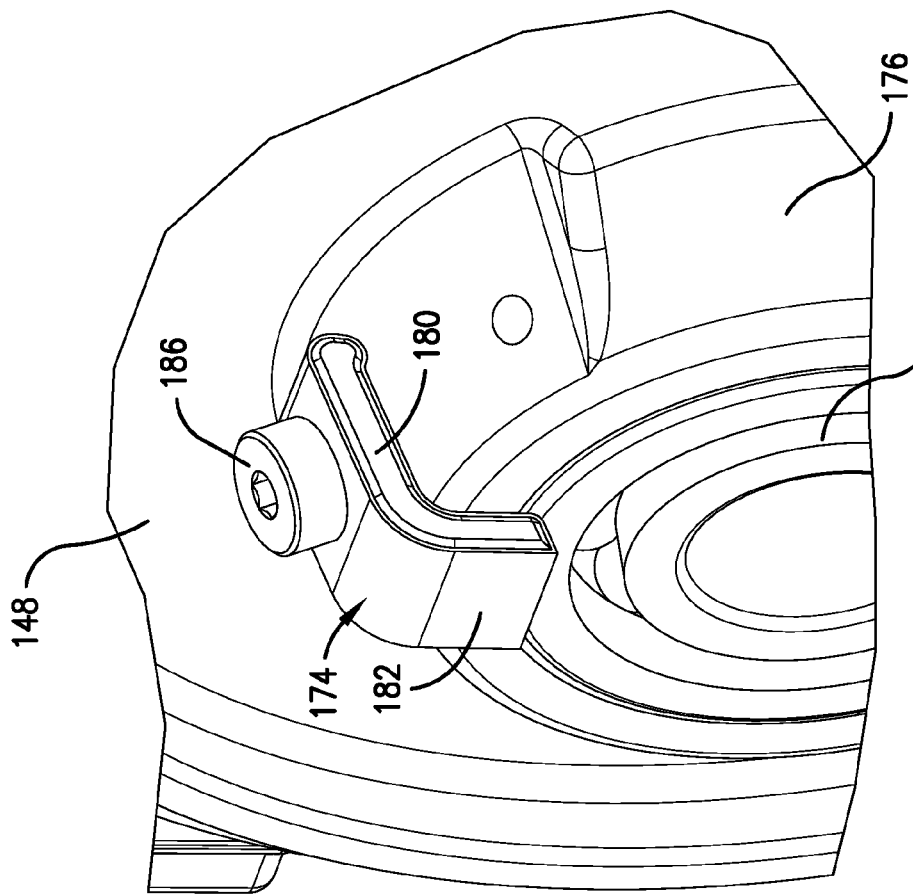
FIG. 9 is an enlarged perspective view of the bearing lock of FIGS. 7 and 8 in an intermediate position.

As will be discussed in greater detail below, for instance, the bearing lock 174 is preferably shiftable between an open position (see FIGS. 7 and 8), in which axial movement of the first motor shaft bearing 178 is unobstructed by the bearing lock 174, and a closed position (see FIGS. 11 and 12), in which such movement is instead restricted by the bearing lock 174. FIGS. 9 and 10 illustrate an intermediate position between the open and closed positions.

The bearing lock 174 preferably includes a generally axially extending main body 180 and a generally radially extending blocking body 182 extending generally orthogonally relative to the main body 180.

The main body 180 preferably defines an elongated fastener-receiving slot 184 that receives a fastener 186. The fastener 186 further extends into a fastener-receiving shaft 188 formed in the motor shaft bearing housing 176. As illustrated, the fastener 186 is preferably a shoulder screw including a threaded portion 190, a shoulder or ring 192, and a head 194. As will be discussed in greater detail below, the shoulder screw is configured to prevent untoward "walking" of the bearing lock 174 out of the desired position. However, other fastener types (including but not limited to bolts, screws, or pins) are also permissible according to some aspects of the present invention.

The motor shaft bearing housing 176 preferably includes a generally radially extending base wall 196 and a circumferential sidewall 198 that extends axially from the base wall 196. The motor shaft 140 preferably passes through a motor shaft opening 200 defined in the base wall 196. The sidewall 198 preferably circumscribes both the motor shaft 140 and the first motor shaft bearing 178, with the first motor shaft bearing 178 being positioned between the motor shaft 140 and the sidewall 198.

The sidewall 198 preferably defines an inner face 200 and an outer face 202.

More particularly, the first motor shaft bearing 178 preferably includes an inner race 206 fixed relative to the motor shaft 140 and an outer race 208 fixed relative to the sidewall 198. Furthermore, the outer race 208 rests against a shelf 210 defined by the base wall 196, such that axial shifting of the first motor shaft bearing 178 toward the motor chamber 146 is restricted by the base wall 196. That is, the first motor shaft bearing 178 defines an outermost face 212 abutting the inner face 200 of the sidewall 198, an innermost face 214 abutting the motor shaft 140, and an inward axial face 216 abutting the shelf 210 of the base wall 196. The first motor shaft bearing 178 further defines an outward axial face 218 opposite the inward axial face 216.

In a preferred embodiment, the first motor shaft bearing 178 is secured on the motor shaft 140 via a press fit. In contrast, the first motor shaft bearing 178 is preferably received within the motor shaft bearing housing 176 in a slip fit. However, other fit types are permissible.

The base wall 196 further preferably supports a gasket 220 positioned axially between the first motor shaft bearing 178 and the motor chamber 146.

As shown in FIGS. 7 and 8, when the bearing lock 174 is in the open position, the fastener 186 extends obliquely through the fastener-receiving slot 184 (more particularly, has an angularly offset axis relative to the fastener-receiving slot 184). Furthermore, the threaded portion 190 extends only shallowly into the fastener-receiving shaft 188. Yet further, in the open configuration, the head 194 of the shoulder screw is angled relative to (i.e., not flush with) the main body 180 of the bearing lock 174.

Figure 12:
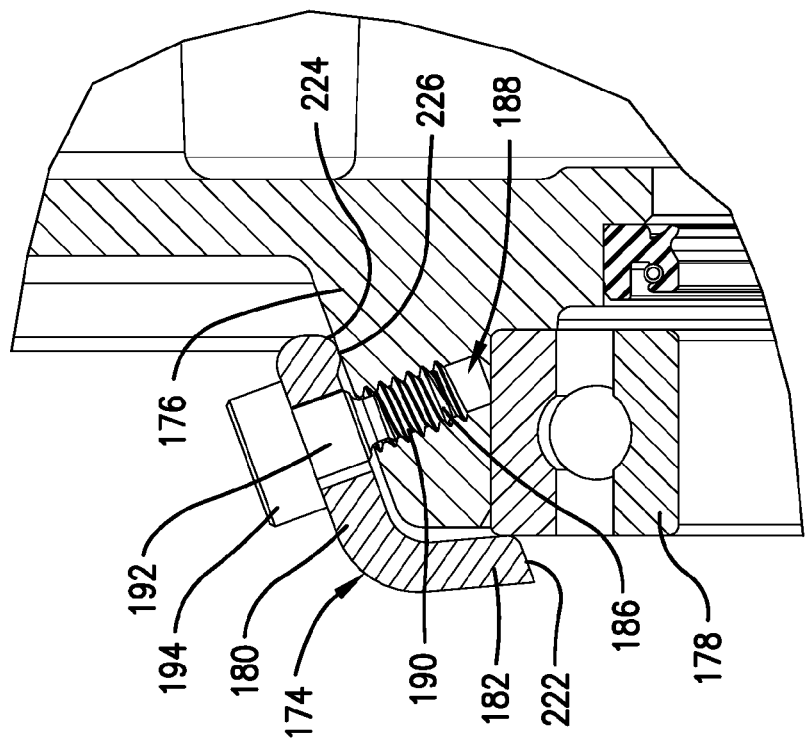
FIG. 12 is a partially cross-sectioned side view particularly illustrating the bearing lock of FIGS. 7-11 in the closed position.
Figure 11:
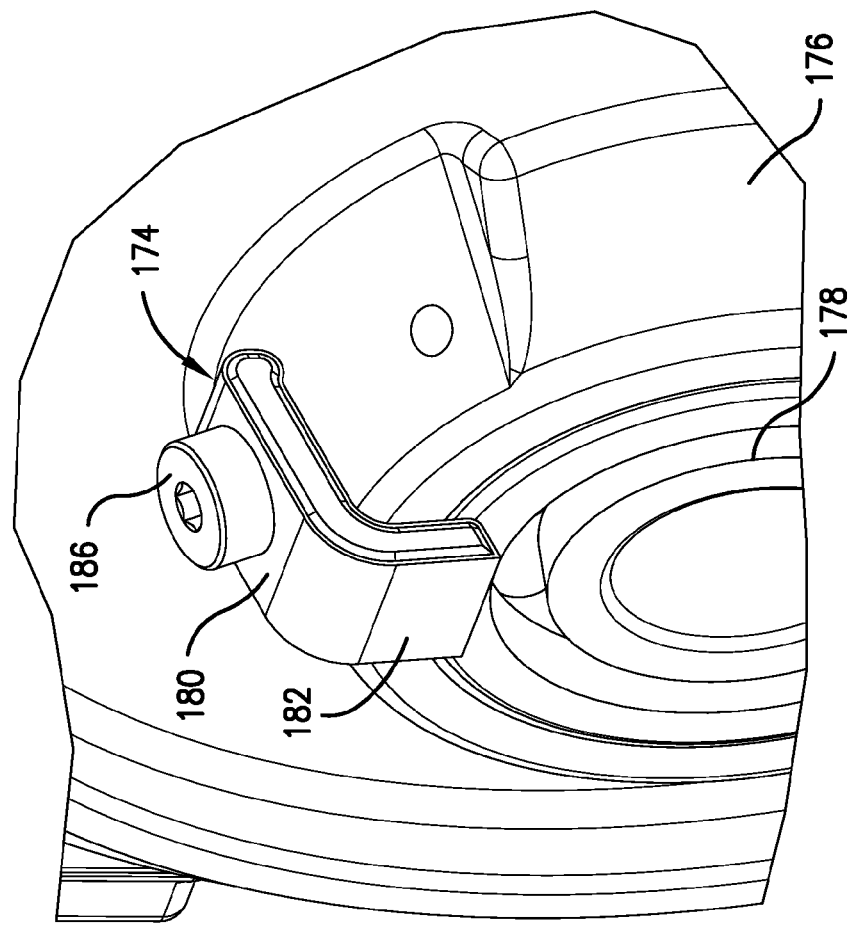
FIG. 11 is an enlarged perspective view of the bearing lock of FIGS. 7-10 in a closed position.
Figure 14:
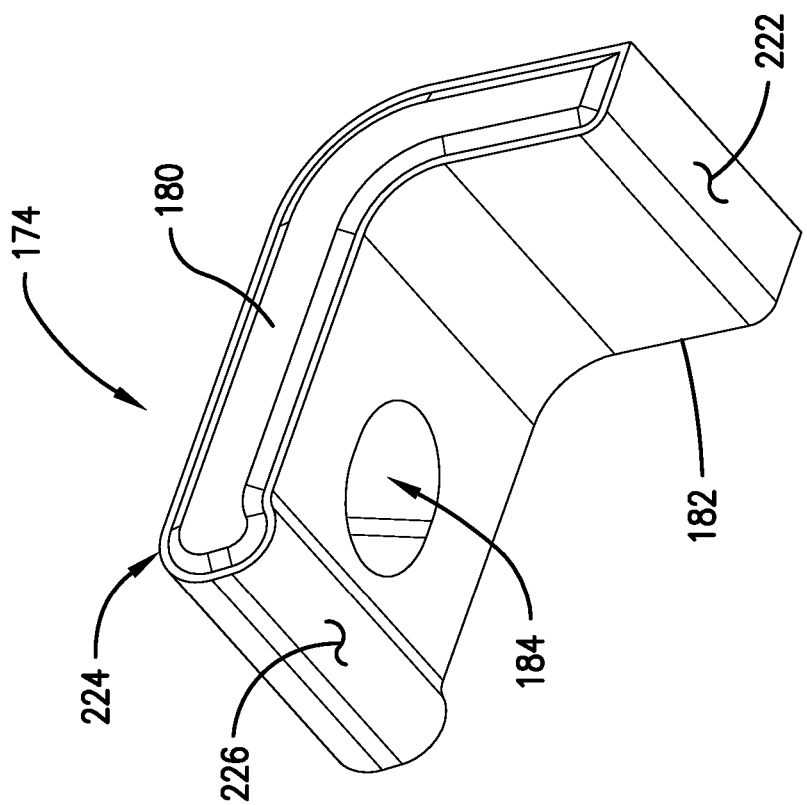
FIG. 14 is a greatly enlarged bottom perspective view of the bearing lock of FIGS. 7-13.
Figure 13:
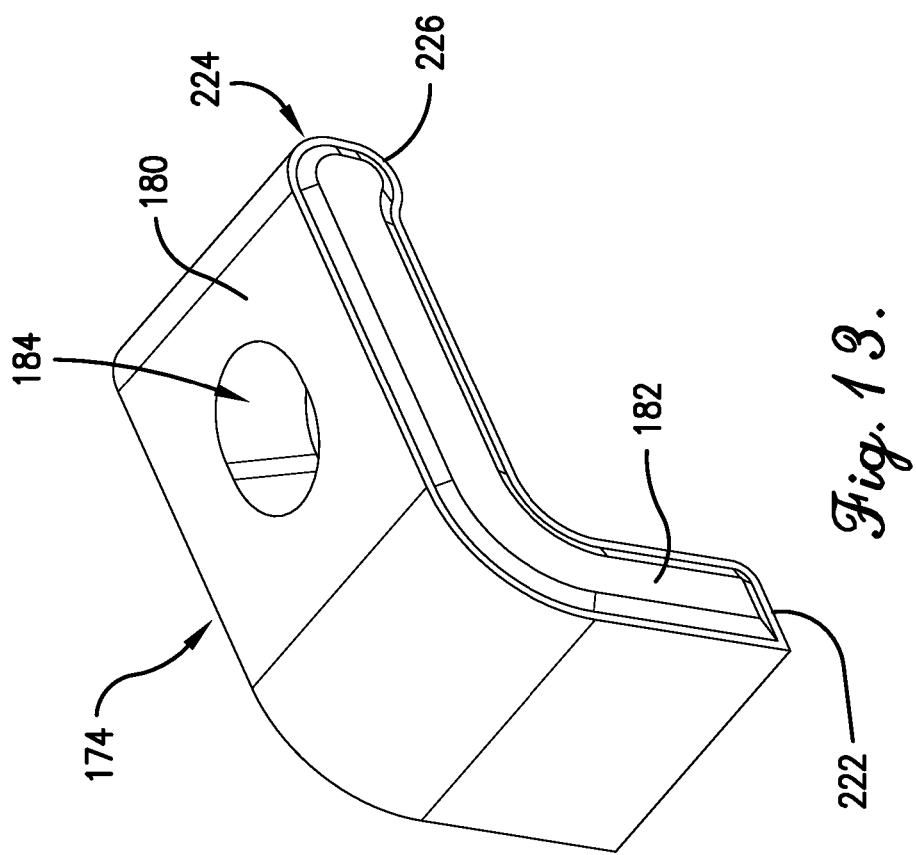
FIG. 13 is a greatly enlarged top perspective view of the bearing lock of FIGS. 7-12.
Figure 16:
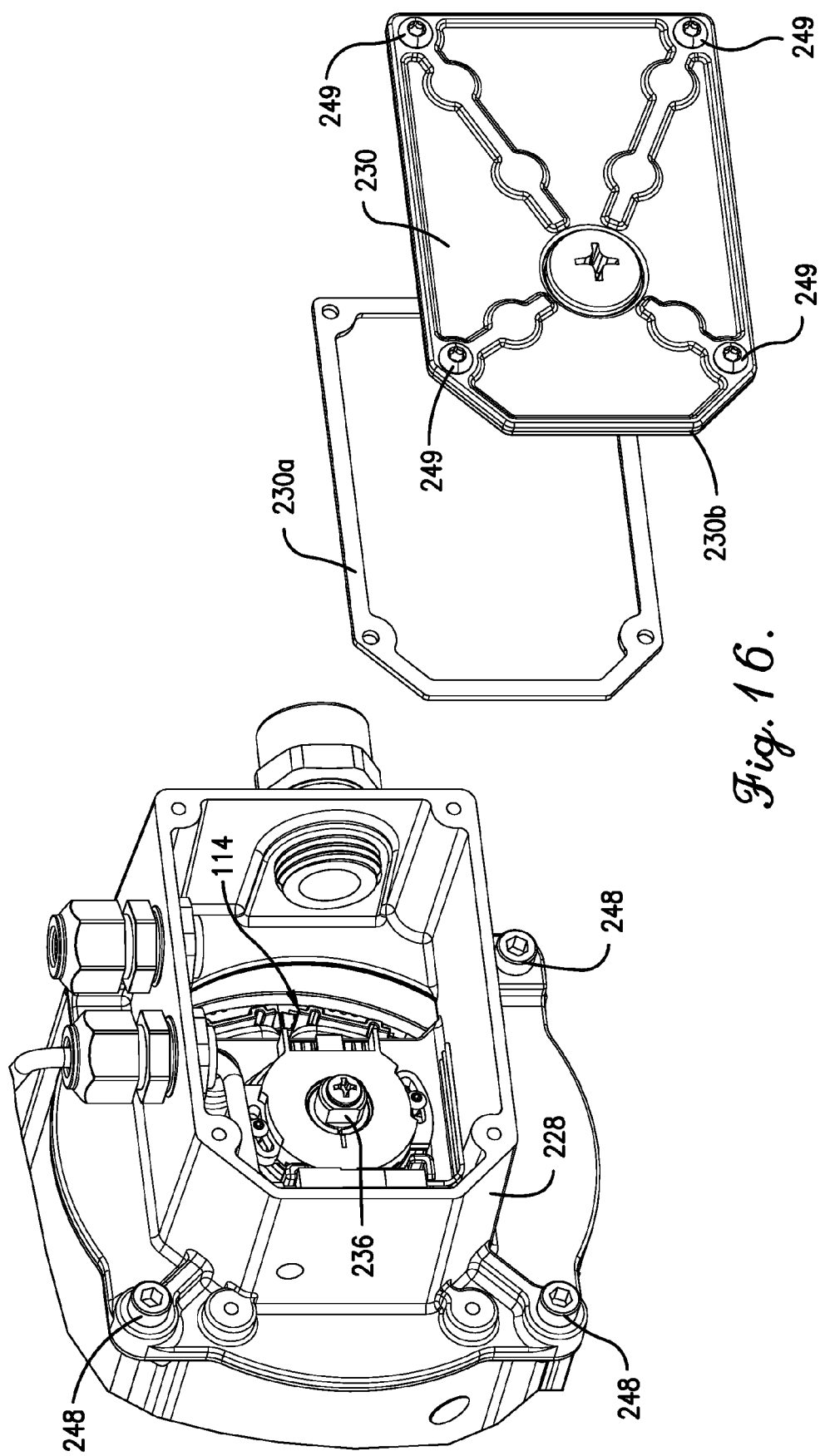
FIG. 16 is an alternative partially exploded rear perspective view of the conduit box of FIG. 15.

In contrast, in the closed position illustrated in FIGS. 11 and 12, the fastener 186 preferably extends in an aligned or parallel manner thorough the fastener-receiving slot 184 (i.e., so as to have a generally shared or parallel axis therewith). Furthermore, the screw head 194 is flush with the main body 180 of the bearing lock 174, and the threaded portion 190 extends more deeply into the fastener-receiving shaft 188. The shoulder 192 is also received tightly within the fastener-receiving slots 184 in the narrower direction (i.e., in the generally lateral direction rather than the generally elongated direction corresponding to the motor axis), such that "walking" of the bearing lock 174 is avoided.

Preferably, the blocking body 182 of the bearing lock 174 presents a radially innermost tapered clearance face 222. In the open position of the bearing lock 174, the clearance face 222 is spaced radially outwardly from the outer race 208 (more particularly, from the outermost face 212 of the first motor shaft bearing 178) such that the first motor shaft bearing 178 is not axially restricted by the bearing lock 174. In the closed position of the bearing lock 174, however, the clearance face 222 is spaced radially inwardly from the outermost face 212 of the first motor shaft bearing 178, such that the blocking body 182 of the bearing lock 174 in part overhangs the outer race 208 and restricts axially outward movement of the first motor shaft bearing 178. Most preferably, as shown in FIGS. 11 and 12, the blocking body 182 directly engages the outward axial face 218 of the first motor shaft bearing 178 at the outer race 208.

It is noted that, although the above-described small amount of overhang is preferred to enable ease of shifting between the open and closed positions of the bearing lock 174, it is permissible according to some aspects of the present invention for greater or lesser amounts of radially inward overhang to occur. For instance, the blocking body might extend inward in the closed position to such an extent as to additionally overhang or abut the inner race, or it might be angled in such a manner as to abut the inner race but be axially spaced from the outer race.

The main body 180 preferably defines a enlarged end 224 opposite the blocking body 182. The enlarged end 224 preferably defines a rounded surface 226, although it permissible according to some aspects of the present invention for the surface to be non-rounded.

As best shown in FIG. 8, in the open position, the main body 180 of the bearing lock 174 extends non-parallel to the outer face 202 of the sidewall 198. As best shown in FIG. 12, however, the bearing lock 174 in the closed position has pivoted along the rounded surface 226 such that the main body 180 extends parallel to the outer face 202 of the sidewall 198. Furthermore, the enlarged end 224 engages the outer face 202 of the sidewall 198 such that the remainder of the main body 180 is spaced from the sidewall 198. That is, only the rounded surface 226 of the enlarged end 224 is in contact with the sidewall 198, and only a portion of the blocking body 182 adjacent the clearance face 222 is in contact with the outer race 208 of the first motor shaft bearing 178.

Alternatively described, the enlarged end 224 preferably causes the bearing lock 174 to angle down onto the outer race 208 as the fastener 186 is tightened.

FIGS. 9 and 10, which illustrate an intermediate stage between the open and closed positions, show the bearing lock 174 having pivoted along the rounded surface 226 such that the main body 180 is approaching but has not yet reached the parallel configuration of the closed position. However, the clearance face 222 is already spaced radially inwardly from the outermost face 212 of the first motor shaft bearing 178, albeit only slightly, such that the blocking body 182 of the bearing lock 174 in part overhangs the outer race 208.

In a preferred embodiment, the bearing lock 174 is non-magnetic. More particularly, the bearing lock 174 preferably comprises power-coated stainless steel. Other materials may be used without departing from the scope of the present invention, however, and/or powder coating may be omitted.

The bearing lock 174, as illustrated, is preferably a feature of the lift motor 110. It is noted, however, that a pair of similar bearing locks is preferably provided on each of the locomotion motors 510. A similar bearing lock is preferably provided on the turntable motor 710, as well.

Conduit Box

As noted previously, the lift motor 110 further preferably includes a conduit box 152. The conduit box 152 preferably includes a housing 228 and a cover 230. The housing 228 preferably includes a generally radially extending base wall 232 and a side wall 234 extending between and connecting the base wall 232 and the cover 230.

As noted previously, the second endshield 150 is preferably integrally formed with the conduit box 152. More particularly, the second endshield 150 is preferably integrally formed with the base wall 232 of the conduit box housing 228.

As best shown in FIGS. 15-19, the conduit box 152 preferably houses and protects the motor encoder 154; portions of the wiring 132, including power wires; and a free end 236 (alternatively referred to as the encoder end 236) of the motor shaft 140. In a preferred embodiment, for instance, the side wall 234 includes an overhanging portion 238 that extends above some of the wiring 132 and the encoder 154 to protect them from drips or other forms of contamination.

The conduit box 152 further preferably defines a pair of apertures 240 and 242 in communication with connectors 244 and 246. Portions of the wiring 132 preferably extend between the lift motor 110 and an external device (not shown) via the connectors 244 and 246.

The conduit box 152 is preferably secured relative to the shell 144 via a plurality of conduit box fasteners 248. Most preferably, the conduit box fasteners 248 are evenly arcuately spaced apart about the exterior of the shell 144, with each fastener extending through a generally longitudinal channel 114a defined by the shell 144, so as to restrict relative radial shifting of the shell 144. Other fastener arrangements are permissible, however.

Furthermore as will be discussed in greater detail below, it is preferred that each conduit box fastener 248 additionally extends into the gearbox assembly 116 so as to fix the conduit box 152 and at least part of the gearbox assembly 116 to each other.

Aluminum Cover

The conduit box housing 228 is preferably cast from aluminum. Furthermore, the cover 230 preferably comprises aluminum. Thus, continuous, direct engagement between the housing 228 and the cover 230, as illustrated, decreases electromagnetic interference (EMI).

The reduced EMI enabled by the aluminum composition of both the cover 230 and the housing 228, as well as the continuous, direct contact therebetween, leads to decreased or eliminated interference with both operation of the encoder 154 and operation of the robot 10 itself. More particularly, with regard to operation of the robot 10, it is noted the robot 10 preferably operates based on radio frequency (RF). Motor EMI could therefore potentially interfere with the electronics of the robot 10 (particularly with the control signal for the robot 10).

Although an aluminum housing 228 and cover 230 are preferred, it is noted that any suitable EMI-blocking material may be used without departing from the scope of some aspects of the present invention. For instance, any one or more of a variety of metals might be used.

Preferably, a gasket 230a is provided to seal the interface between the cover 230 and the housing 228. The gasket 230a is preferably operable to prevent or at least substantially restrict ingress of contaminants (e.g., dust, condensation, etc.) into the conduit box 152.

The gasket 230a is preferably a regular elastomeric gasket. That is, it is not necessary, by merit of the continuous, direct contact between the preferred aluminum housing 228 and cover 230, for a more expensive EMI gasket (e.g., one comprising rubber with embedded aluminum, silver, copper, or other metal particles) to be provided.

In a preferred embodiment, the cover 230 includes an axially extending outer rim 230b that at least substantially circumscribes the gasket 230a to directly and continuously engage the housing 228. Other means by which direct, continuous engagement is achieved are permissible, however. Furthermore, it is permissible according to some aspects of the present invention for the engagement to be discontinuous, although any discontinuities would either result in increased EMI or require mitigation means to avoid such effects.

Preferably, the cover 230 and the gasket 230a are secured to the housing 228 by means of a plurality of cover fasteners 249. Other securement means (e.g., latches, adhesives, welds, etc. are permissible, however).

Wire Connector Seat

In a preferred embodiment, and as best shown in FIGS. 15-19, the housing 228 defines a wire connector seat 250 supporting mating connectors 252 and 254 of sensor wires 256. More particularly, the conduit box housing 228 preferably defines a pair of bosses 258 and 260. The bosses 258 and 260 are preferably integrally formed with the housing 228 but, in alternative embodiments, may be discretely formed. The bosses 258 and 260 each preferably extend axially along the side wall 234 of the conduit box housing 228 and define respective recessed pockets 262 and 263. The first and second mating connectors 252 and 254 are received in corresponding ones of the pockets 262 and 263.

More particularly, each connector 252 and 254 is slid axially into the corresponding one of the pockets 262 and 263. The cover 230 of the conduit box 152 is then secured so as to lock the connectors 252 and 254 into place in respective ones of the pockets 262 and 263.

Provision of the pockets 262 and 263 and the cover 230 enables the connectors 252 and 254 to be secured in a simple and robust manner, at least substantially eliminating the risk of damage to the connectors 252 and 254 (and perhaps a failure of the associated electrical connection), while also enabling easy access to the connectors upon removal of the cover 230. Disconnection as a result of jostling (e.g., during assembly) is also thereby avoided or at least substantially reduced in likelihood.

Furthermore, securement of the connectors 252 and 254 in the pockets 262 and 263 serves to keep the sensor wires 256 away from the free end 236 of the motor shaft 140. Thus, wire damage due to tangling and/or other forms of engagement with the rotating motor shaft 140 is also avoided or at least substantially reduced in likelihood.

Figure 17:
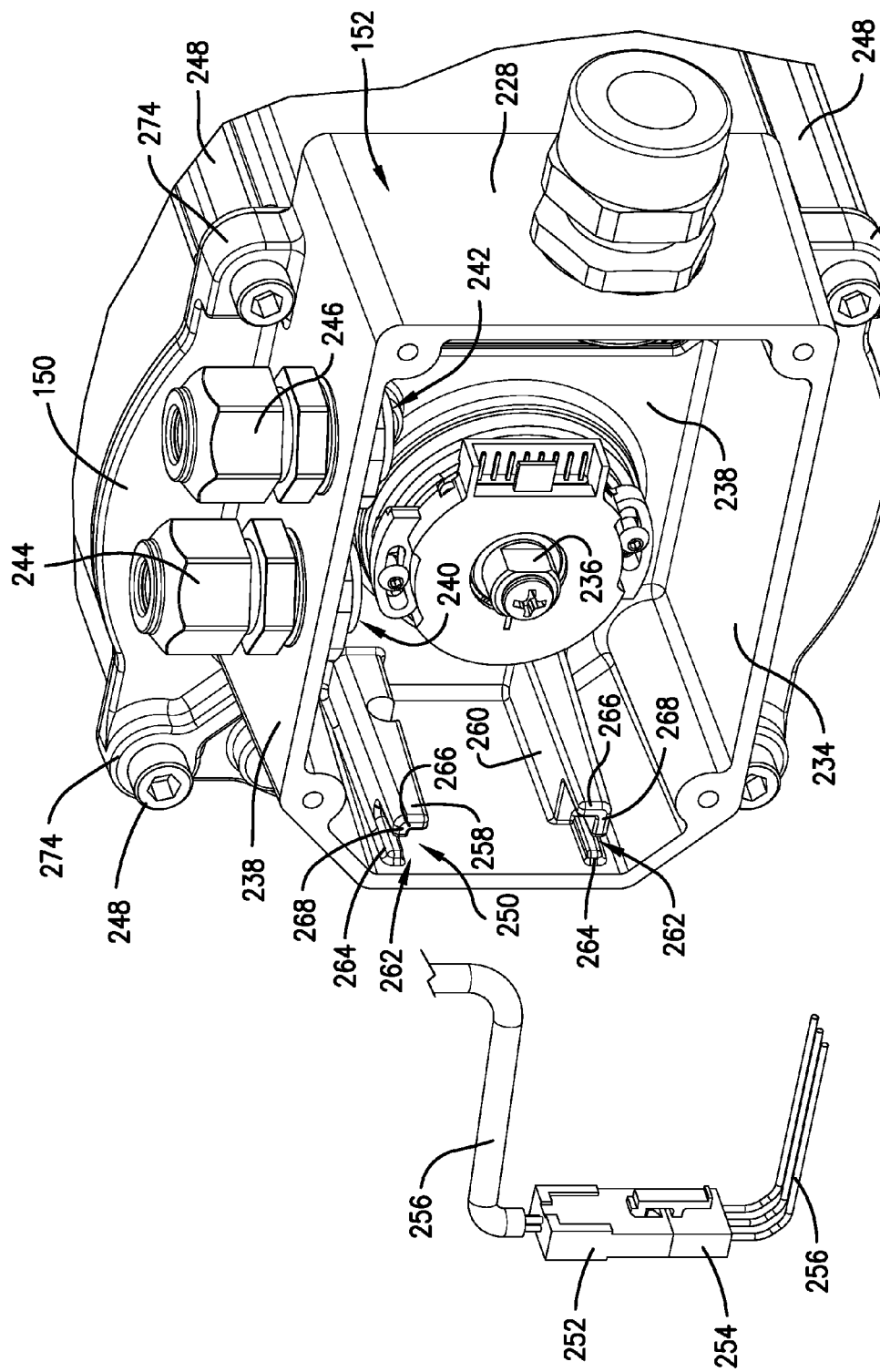
FIG. 17 is a rear perspective view of the conduit box of FIGS. 15 and 16, particularly illustrating the wire connector and wire connector seat.
Figure 25:
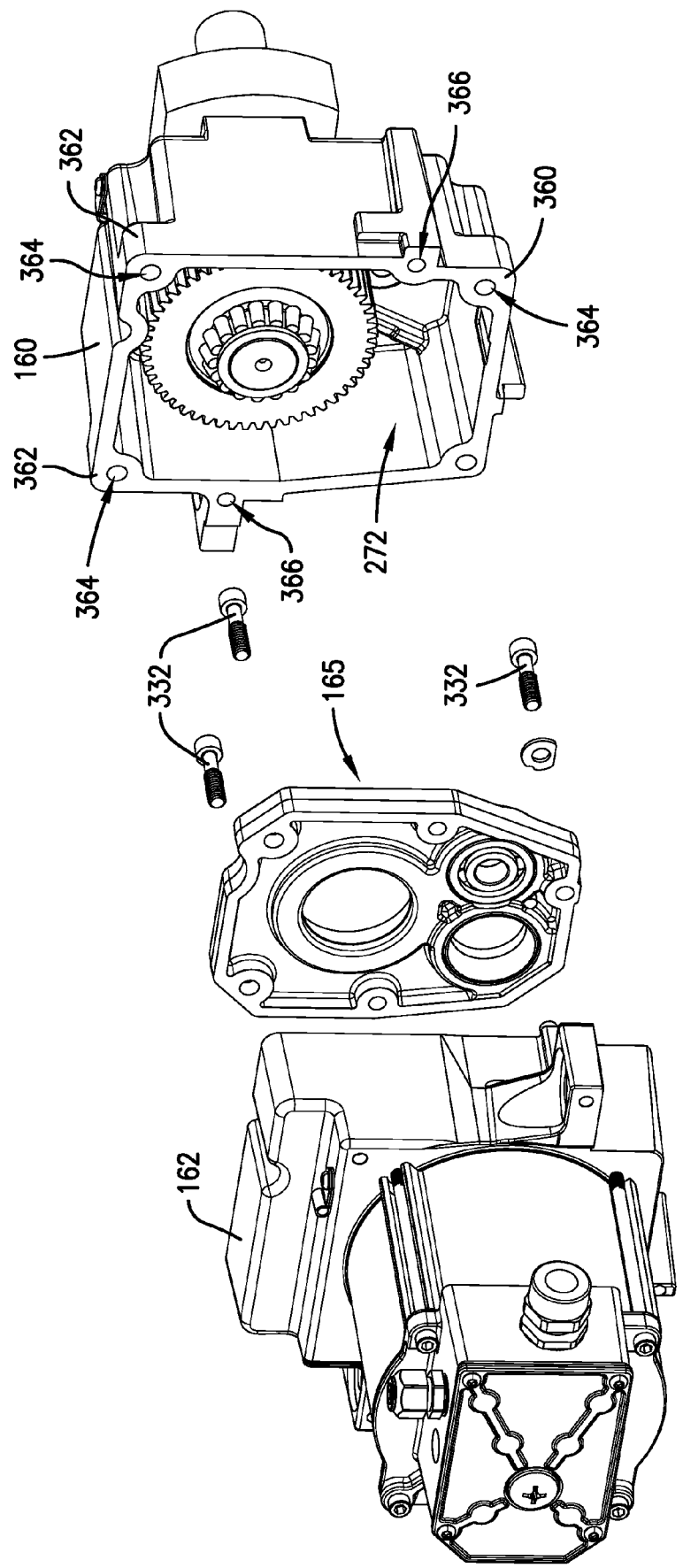
FIG. 25 is a partially exploded rear perspective view of the lift motor of FIGS. 2-6 and 24, particularly illustrating the construction of the housing and the internal bearing plate.

Although a variety of seat configurations are permissible according to some aspects of the present invention, in a preferred embodiment and as best shown in FIG. 17, each seat 250 is defined by an outer bracket 264, an inner bracket 266 spaced generally laterally (i.e., somewhat radially) inwardly from the outer bracket 264, and a shoulder 268 extending between and interconnecting the inner bracket 266 and the outer bracket 264.

Preferably, the inner bracket 266 is at least substantially L-shaped, thus providing bidirectional restriction against shifting of the connectors 252 and 254. Other shapes are permissible without departing from the scope of some aspects of the present invention, however.

Preferably, the pockets 262 and 263 (or, alternatively, each set of brackets 264 and 266 and the shoulder 268) are sized and shaped in a manner so as to complement the corresponding connectors 252 and 254 only when the connectors 252 and 254 are oriented in a predefined manner relative to the pockets 262 and 263. That is, it is preferred that the connectors 252 and 254 be insertable into the pockets 262 and 263 in only one direction or orientation. A more flexible configuration is permissible according to some aspects of the present invention, however.

In a preferred embodiment, the connectors 252 and 254 comprise plastic. Other materials may be used according to some aspects of the present invention, however.

Preferably, at least one of the sensor wires 256 extends to and connects with a lift arm position sensor system 270 (see FIGS. 20-23) that senses the angular or rotational position of the lift arm 166. It is within the ambit of some aspects of the present invention, however, for either or both of the wires to be alternatively routed.

Gearbox Assembly Overview

As noted previously, the lift motor 110 preferably includes the gearbox assembly 116. The gearbox assembly 116 preferably includes the gearbox housing 158 and the gear train 156. The gearbox housing 158 preferably defines a gear chamber 272 in which the gear train 156 is substantially located.

Gearbox Housing

The gearbox housing 158 is preferably secured relative to the shell 144 via the aforementioned conduit box fasteners 248, although other securement means (e.g., latches or adhesives) may additionally or alternatively be used. More particularly, the conduit box fasteners 248 preferably extend through corresponding bosses 274 integrally formed with the second endshield 150, along the shell 144, and into to the lower casting 162. The conduit box fasteners 248 thus preferably secure the shell 144 against radial shifting and additionally fix the conduit box 152 to at least a portion of the gearbox housing 158.

The upper casting 160 and the lower casting 162 each preferably define an integrally formed mounting bracket 276 or 278, respectively (see, for instance, FIG. 6).

Furthermore, the first endshield 148 is preferably integrally formed with the lower casting 162.

Preferably, both the upper casting 160 and the lower casting 162 extend continuously and are at least substantially devoid of openings therein or gaps therebetween, such that the gearbox housing 158 at least substantially encloses the gear chamber 272 and protects it from ingress of contaminants. More particularly, as will be discussed in greater detail below, the gear chamber 272 is preferably at least substantially sealed.

The upper casting 160 and the lower casting 162 are preferably fixed directly to one another in a manner described in greater detail blow.

The upper and lower castings 160 and 162, respectively, preferably comprise cast aluminum. However, other materials and/or fabrication methods may be used without departing from some aspects of the present invention.

Gear Train

Figure 26:
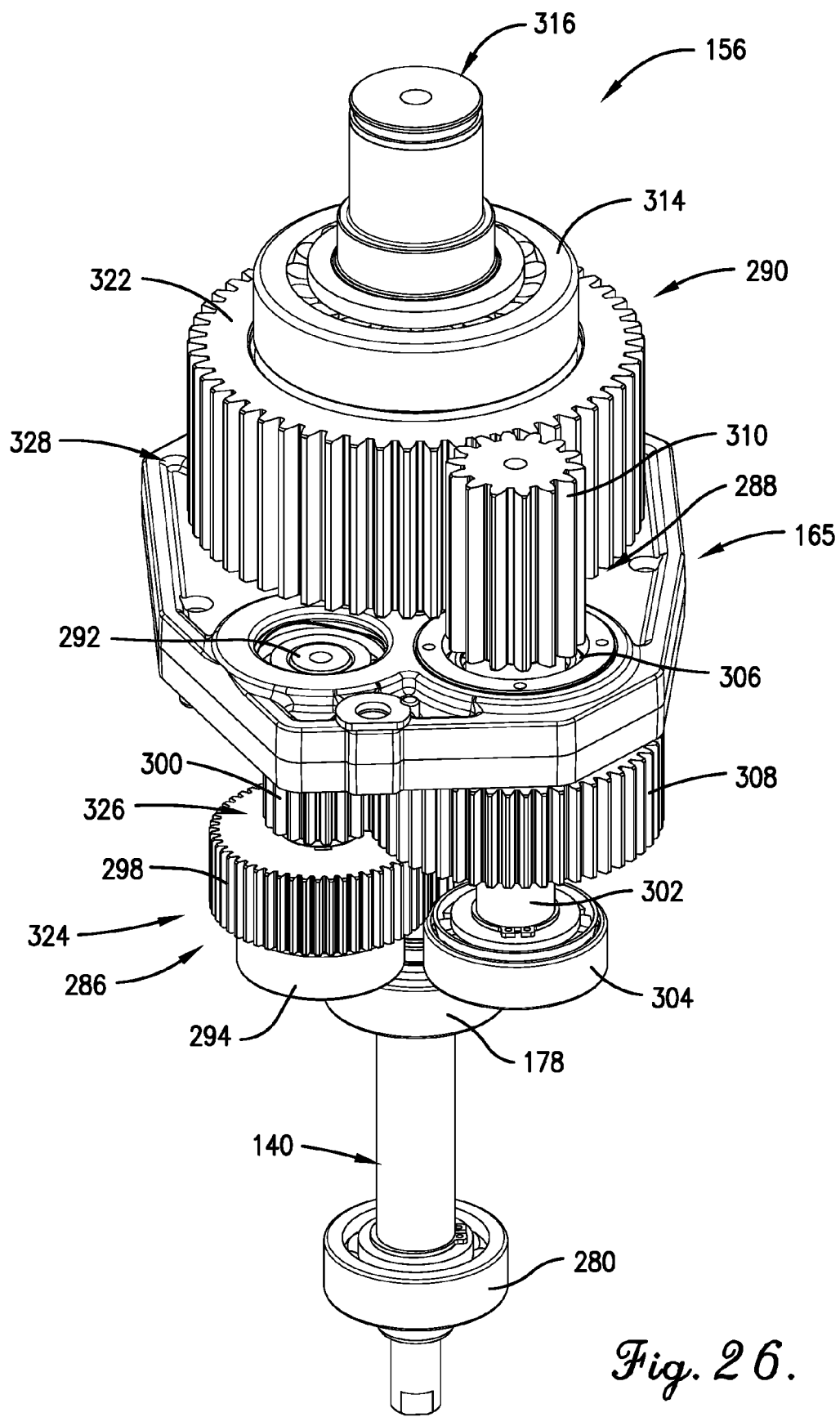
FIG. 26 is top perspective view of gear train of the lift motor of FIGS. 2-6 and others.
Figure 27:
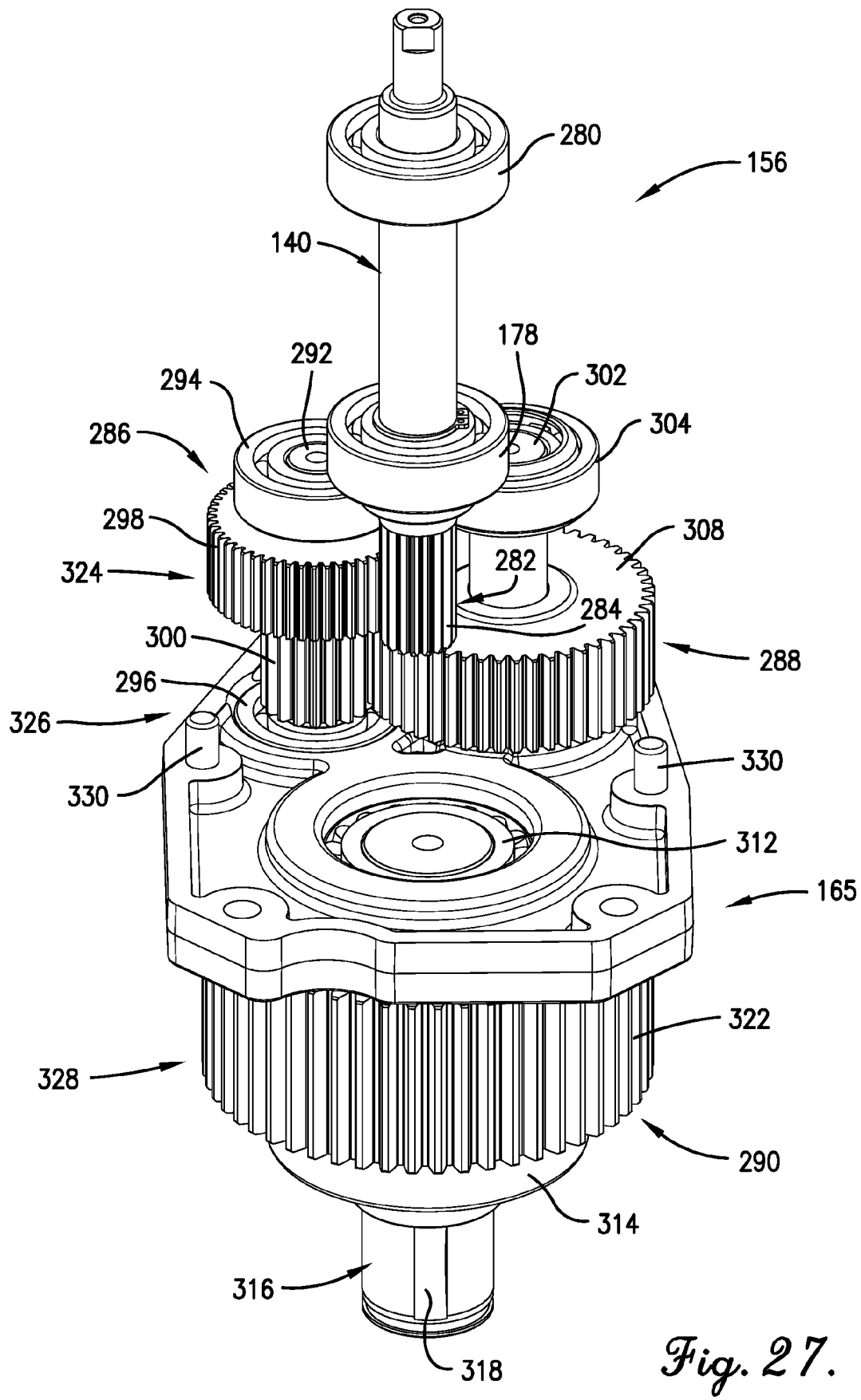
FIG. 27 is a bottom perspective view of the gear train of FIG. 26.
Figure 28:
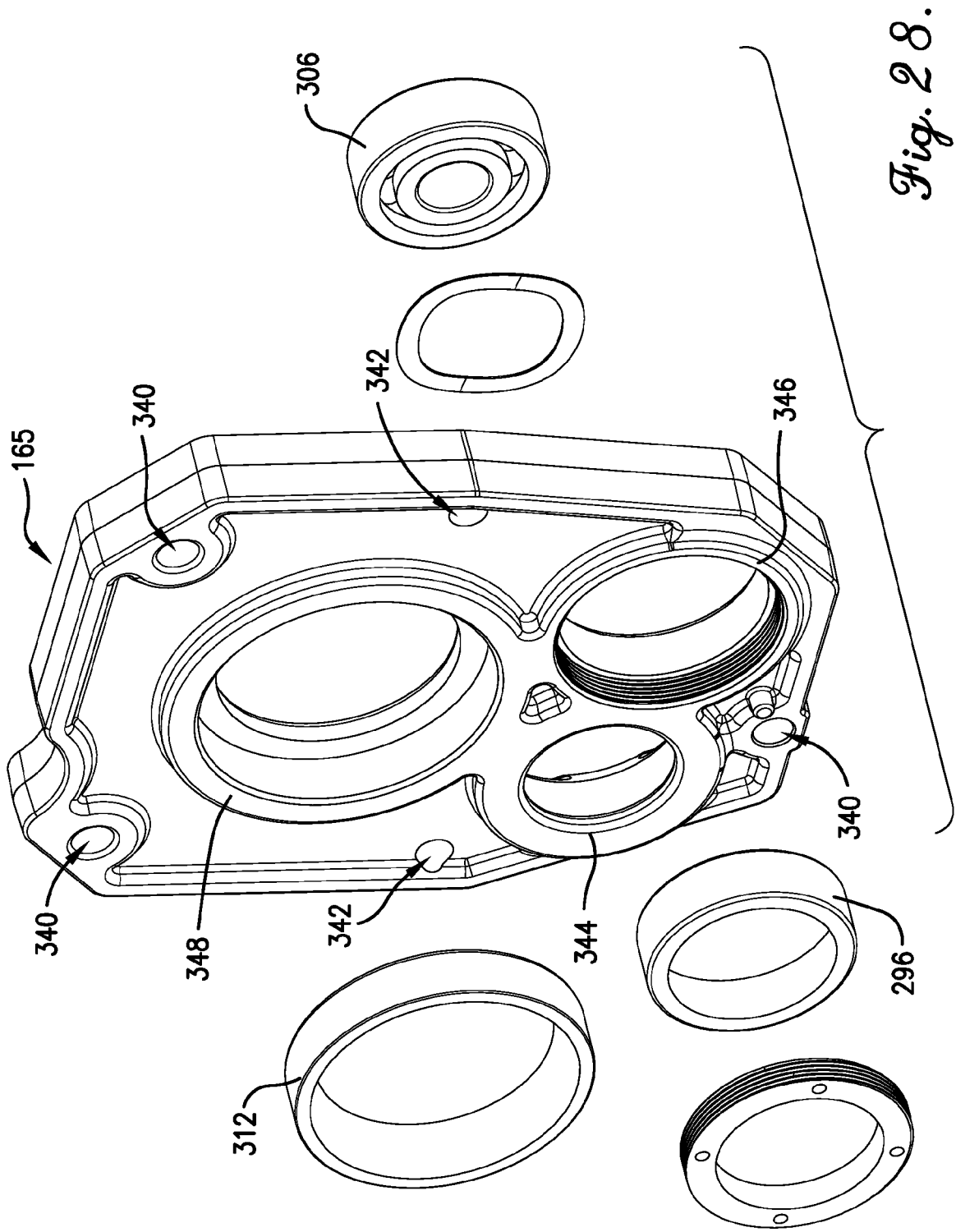
FIG. 28 is an exploded front perspective view of the internal bearing plate and bearing assemblies of the lift motor of FIGS. 2-6 and others
Figure 29:
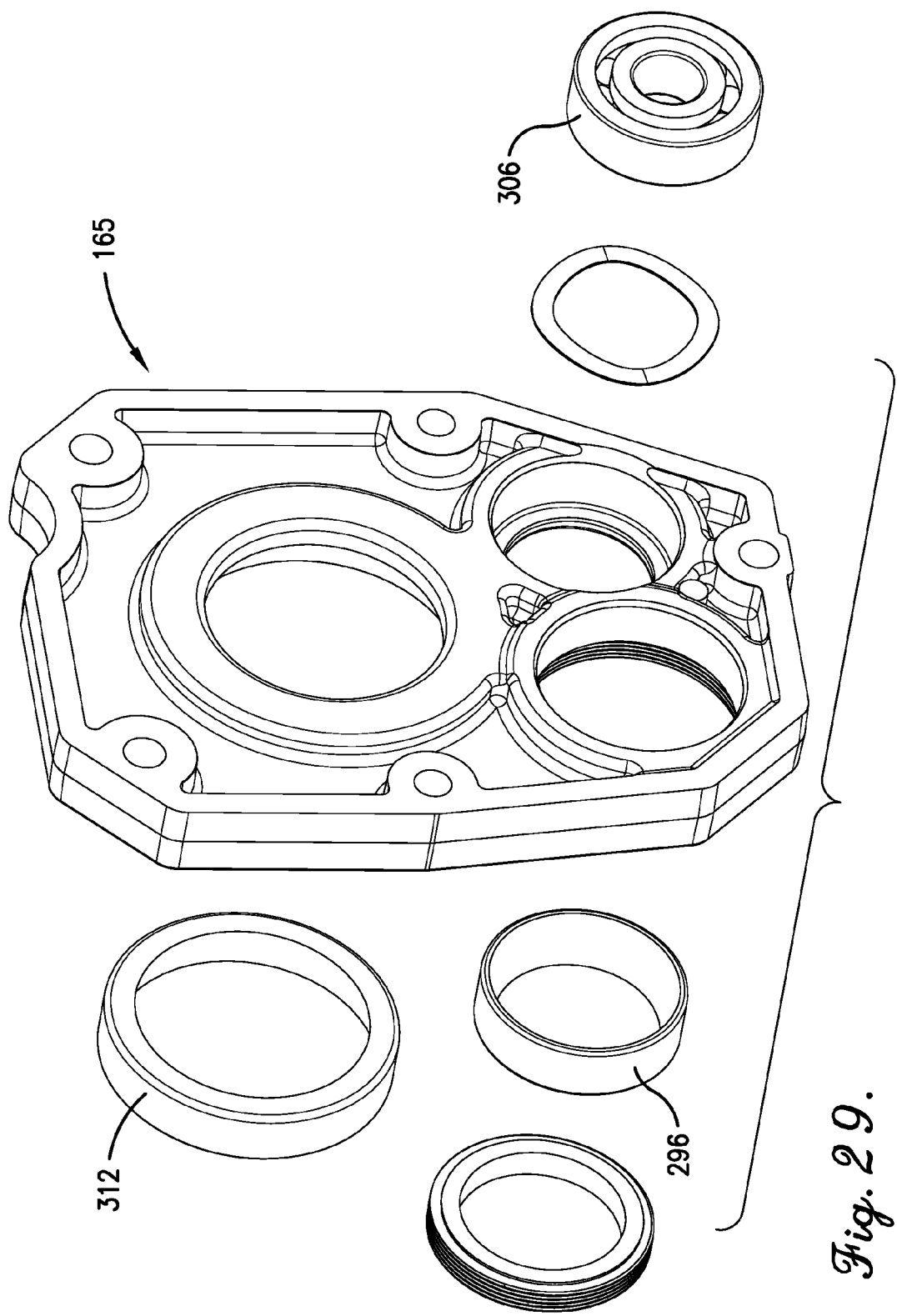
FIG. 29 is ab exploded rear perspective view of the internal bearing plate and bearing assemblies of FIG. 28.

The gear train 156 is best illustrated in FIGS. 26 and 27. In a preferred embodiment, as illustrated, the motor shaft 140 is rotatably supported by the first motor shaft bearing 178 and a second motor shaft bearing 280. Furthermore, the motor shaft 140 preferably includes a free end (or encoder end) 236 and a gear train end 282. The gear train end 282 comprises a pinion gear 284 that engages an intermediate input gear assembly 286. In turn, the intermediate input gear assembly 286 engages an intermediate output gear assembly 288. The intermediate output gear assembly in turn engages an output gear assembly 290.

The intermediate input gear assembly 286 comprises an intermediate input shaft 292 rotatably supported on intermediate input bearings 294 and 296. The intermediate input gear assembly 286 further includes a first intermediate input gear 298 and a second intermediate input gear 300. The pinion gear 284 engages the first intermediate input gear 298 such that rotation of the motor shaft 140 drives rotation of the intermediate input shaft 292 and intermediate input gears 298 and 300. The first intermediate input gear 298 is preferably larger in diameter and comprises more teeth than the second intermediate input gear 300, although such relationships are not essential to some aspects of the present invention.

The intermediate output gear assembly 288 comprises an intermediate output shaft 302 rotatably supported on intermediate output bearings 304 and 306. The intermediate output gear assembly 288 further includes a first intermediate output gear 308 and a second intermediate output gear 310. The second intermediate input gear 300 engages the first intermediate output gear 308 such that rotation of the motor shaft 140 and, in turn, of the first intermediate input shaft 292 and intermediate input gears 298 and 300, drives rotation of the intermediate output shaft 302 and the intermediate output gears 308 and 310. The first intermediate output gear 308 is preferably larger in diameter and comprises more teeth than the second intermediate output gear 310, although such relationships are not essential to some aspects of the present invention.

The output gear assembly 290 comprises the previously mentioned output shaft 168, as well as output bearings 304 and 306 that rotatably support the output shaft 168. The output shaft 168 includes a lift arm connection end 316 to which the lift arm 166 is preferably fixed. The lift arm connection end 316 preferably includes a key 318 corresponding to a slot 320 in the pivot end 170 of the lift arm 166, such that rotation of the output shaft 168 results in pivoting of the lift arm 166 and, in turn, elevation or lowering of the platform 14. Other interconnection means are permissible, however, without departing from the scope of the present invention.

The output gear assembly 290 further includes an output gear 322. The second intermediate output gear 310 engages the output gear 322 such that rotation of the motor shaft 140 and, in turn, of the intermediate input shaft 292, intermediate input gears 298 and 300, intermediate output shaft 168, and intermediate output gears 308 and 310, drives rotation of the output shaft 168 and the output gear 322. Rotation of the output shaft 168, in turn, results in pivoting of the lift arm 166.

As will be readily apparent from the description above, the gear train 156 is preferably a three-stage (3-stage) system. More particularly, the gear train 156 includes a first stage 324 comprising the pinion gear 284 and the first intermediate input gear 298; a second stage 326 comprising the second intermediate input gear 300 and the first intermediate output gear 308; and a third stage 328 comprising the second intermediate output gear 310 and the output gear 322. However, while the illustrated number of stages and associated gear ratios are preferred to appropriately modify rotational speed and torque (e.g., to decrease speed and increase torque), various individual-stage gear ratios and/or overall gear ratios are permissible without departing from the scope of the present invention.

Preferably, the motor shaft 140, the intermediate input shaft 292, the intermediate output shaft 302, and the output shaft 168 are each arranged in parallel to each other, such that the gear train 156 is a parallel-shaft gear train. Non-parallel arrangements or partially parallel arrangements fall within the scope of some aspects of the present invention, however.

It is also preferred that each of the motor shaft 140, the intermediate input shaft 292, the intermediate output shaft 302, and the output shaft 168 is at least in part received within the gear chamber 272. More particularly, it is preferred that the motor shaft 140 and the output shaft 168 each are disposed only in part in the gear chamber 272, while the intermediate input and output shafts 292 and 302, respectively, are disposed entirely within the gear chamber 272.

Furthermore, although preferred bearing types are illustrated, other bearing types (e.g., ball, roller, needle etc.) and/or arrangements (e.g., different positioning) are permissible without departing from the ambit of the present invention.

As will be discussed in greater detail below, certain of the bearings are preferably supported by the internal bearing plate 165, which is disposed transversely between the second and third stages 326 and 328 of the gear train 156.

Bearing Assembly and Internal Bearing Plate

As noted previously, the internal bearing plate 165 is preferably positioned adjacent the housing interface 164 between the upper and lower castings 160 and 162, respectively. More particularly, in a preferred embodiment, the internal bearing plate 165 is fixed to the lower casting 162 by means of bearing plate positioning pegs 330 and a plurality of bearing plate fasteners 332. Furthermore, the internal bearing plate 165 preferably directly engages the lower casting 162 along a bearing plate interface 333.

With further regard to fixation, as best shown in FIG. 24, the lower casting 162 preferably defines a plurality of bearing plate fastener receiving bosses 334, each defining a corresponding receiving hole 336, and a plurality of bearing plate peg bosses 338, with a corresponding one of the positioning pegs 330 (preferably discrete but permissibly integral) extending from each. The internal bearing plate 165 preferably defines a plurality of fastener-receiving holes 340 corresponding to the receiving holes 336 of the lower casting 162, as well as a plurality of positioning holes 342 corresponding to the pegs 330. During assembly, the bearing plate fasteners 332 (preferably threaded bolts, but alternatively any suitable form of fastener, including but not limited to screws, nails, or pegs) are received in corresponding ones of both the fastener-receiving holes 340 and the receiving holes 336. The pegs 330 are received in corresponding ones of the positioning holes 342.

Although the above-described means for securing the internal bearing plate 165 to the lower casting 162 are preferred, additional or alternative means, including but not limited to latches or adhesives, may also be used. Furthermore, the internal bearing plate might instead or additionally be secured directly to the upper casting. That is, it is permissible for either one of the housing components or castings to act as a supporting structure for the internal bearing plate without departing from the scope of some aspects of the present invention.

In a preferred embodiment, the upper casting 160 includes an axially and perimetrically extending lip 350 defining a generally transversely extending, at least substantially flat upper engagement face 352. Similarly, the lower casting 162 preferably defines a generally transversely extending, at least substantially flat lower engagement face 354 that engages the upper engagement face 352 along the housing interface 164. The internal bearing plate 165 preferably defines an at least substantially flat bearing plate mounting face 165*a* abutting the lower engagement face 354 along the bearing plate interface 333.

Figure 31:
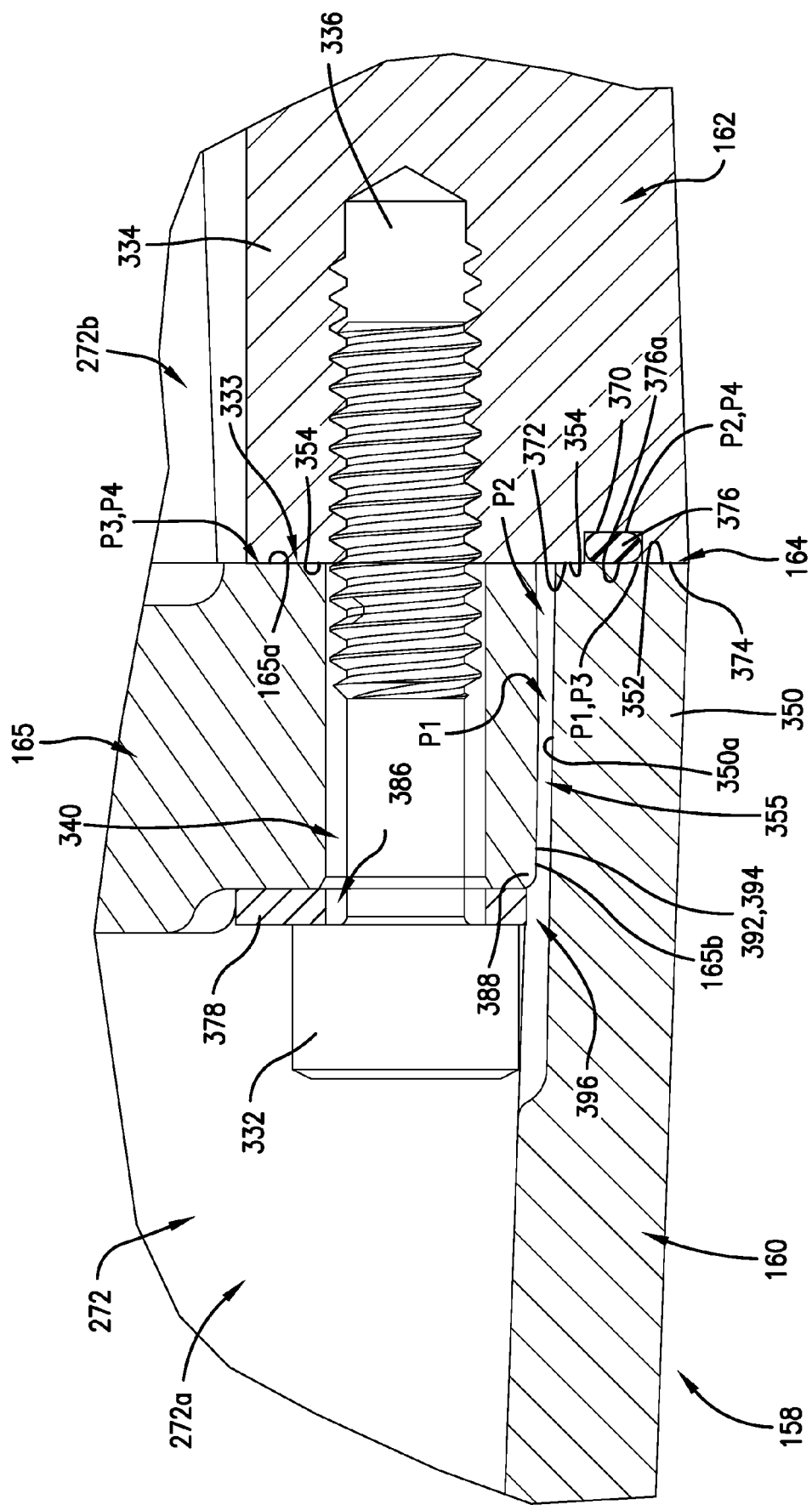
FIG. 31 is a great enlarged, partially sectioned side view of the housing interface and internal bearing plate of the lift motor of FIGS. 2-6 and others.

Upon assembly of the upper and lower castings 160 and 162 and the internal bearing plate 165, the lip 350 at least substantially circumscribes the internal bearing plate 165. That is, the internal bearing plate 165 is at least substantially received within the upper casting 160 or, in other words, within the gear chamber 272. A detailed view of such circumscription is shown in FIG. 31.

In a preferred embodiment, the lip 350 presents a radially innermost perimetrical surface 350a. The bearing plate 165 preferably presents a radially outermost perimetrical surface 165b that is spaced generally radially inwardly from the lip innermost perimetrical surface 350, such that a perimetrical, radially extending gap 355 is formed therebetween.

It is particularly noted that both the bearing plate engagement face 165a and the upper engagement face 352 engage the same at least substantially flat lower housing engagement face 354, such that the interfaces 164 and 333 are at least generally coplanar. Non-coplanar arrangements are permissible according to some aspects of the present invention, however. For instance, the housing and bearing interfaces could be slanted so as to define an angle therebetween, or they could be offset from one another but generally parallel. Furthermore, it is permissible according to some aspects of the present invention for one or more of the interfaces and/or the mounting face to alternatively be non-planar itself or themselves, including but not limited to zig-zagged, curved, and/or stepped.

It is also noted that, as indicated above, the upper casting engagement face 352, the lower casting engagement face 354, and the bearing plate mounting face 165a additionally each extend transversely relative to the axis. However, it is permissible according to some aspects of the present invention for one or more of the interfaces and/or the mounting face to in whole or in part be skewed or oblique relative to the axis.

Yet further, it is preferred that the bearing plate 165 itself is disposed generally transversely relative to the axis. Thus, the bearing plate 165 in general and the housing interface 164 are preferably at least substantially parallel.

Preferably, the internal bearing plate 165 facilitates assembly of the gear train 156 and associated bearings 296, 306, and 312. More particularly, the bearing plate 165 includes housings 344, 346, and 348 at least substantially receiving the second intermediate input bearing 296, the second intermediate output bearing 306, and the first output bearing 312, respectively.

Assembly of Gearbox Housing

Preferably, the lower casting 162 includes a plurality of lower casting bosses 356 each defining a corresponding lower casting fastener-receiving hole 358. The lower casting 162 further preferably includes a plurality of positioning pegs 360. The positioning pegs 360 may suitably be integrally formed with the casting or instead be discrete components.

The upper casting 160 preferably includes a plurality of upper casting bosses 362 defining upper casting fastener-receiving holes 364, as well as a plurality of upper casting peg-receiving holes 366. The upper casting fastener-receiving holes 364 and the upper casting peg-receiving holes 366 preferably correspond to the lower casting fastener-receiving holes 358 and pegs 360.

A plurality of gearbox fasteners 368 preferably extend through corresponding ones of the fastener-receiving holes 358 and 364, while the pegs 360 each extend into corresponding ones of the upper casting peg-receiving holes 366. The upper and lower castings 160 and 162 are thereby fixed to one another.

The gearbox fasteners 368 and the pegs 360 preferably are positioned laterally outside the internal bearing plate 165, although alternative dispositions are permissible according to some aspects of the present invention.

Sealing of Gear Chamber

In a preferred embodiment, a groove 370 is defined in the lower engagement face 354 of the lower casting 162 so as to split the lower engagement face 354 into an inner portion 372 and an outer portion 374. A seal 376 is fitted in the groove 370. As best shown in FIG. 31, securement of the upper casting 160 to the lower casting 162 (or, more particularly, engagement of the upper and lower engagement faces 352 and 354) leads to compression and resulting deformation of the seal 376 at and adjacent the interface 164. That is, the seal 376 preferably initially extends axially beyond the lower engagement face 354 (see, for instance, the undeformed state illustrated in FIGS. 24, 30, 30a, and 32, in which the seal 376 is only partially received in the groove 370) but is compressibly deformed as shown schematically in FIG. 31 so as to engage the upper engagement face 352 while also allowing direct engagement between the upper and lower engagement faces 352 and 354. That is, the seal 376 preferably presents an outer seal face 376a that is at least substantially coplanar with the upper and lower engagement faces 352 and 354 and the bearing plate mounting face 165a upon compression of the seal 376 (due to engagement of the upper and lower castings 160 and 162 as described above).

Thus, the seal 376 serves to seal the interface 164 against ingress of dust, water, and/or other contaminants that might otherwise enter into the gear chamber 272. Conversely, the seal 376 also seals the interface 164 against egress of oil, grease, and/or other lubricants from the gear chamber 272 to the environment (or more particularly, other components of the robot 10, the shelving 18, and/or the goods 20).

Preferably, the groove 370 and the seal 376 extend continuously perimetrically. It is permissible according to some aspects of the present invention, however, for either or both of the groove and seal to be discontinuous and/or to be truncated.

Most preferably, the seal 376 comprises a generally annular gasket, although other seal types and configurations (e.g., grooveless) fall within the ambit of some aspects of the present invention.

Although the above-described arrangement is preferred, in certain alternative embodiments falling within the scope of some aspects of the present invention, the bearing plate might be secured to the upper casting rather than the lower casting. Yet further, in some embodiments, the bearing plate might be disposed between the upper and lower castings in a "sandwiched" manner so as to itself present an external face of the gearbox housing. In such an embodiment, direct engagement between the upper and lower castings might not occur. Rather, direct engagement would occur between the upper casting and the bearing plate, as well as between the bearing plate and the lower casting, such that two interfaces are defined, with each of the interfaces preferably including a sealing element such as a gasket.

In a preferred embodiment, the intermediate bearing plate 165 divides the gear chamber 272 into upper and lower portions 272a,b. More particularly, the bearing plate 165 and the upper casting 160 preferably cooperatively define the upper portion 272a. The bearing plate 165 and the lower casting 162 preferably cooperatively define the lower portion 272b.

Preferably, the first and second stages 324 and 326, respectively, of the gear train 156 are disposed in the lower portion 272b of the gear chamber 272. The third stage 328 of the gear train 156 is preferably disposed in the upper portion 272a of the gear chamber 272. Alternative placements of the stages of the gear train relative to the chamber portions are permissible according to some aspects of the present invention, however.

As noted previously, the seal 376 is preferably disposed along the housing interface 164 to seal the gear chamber 272 against ingress or egress of dust, water, grease or other lubricants, and/or other contaminants that might otherwise enter or exit the gear chamber 272 via the interface 164. However, the seal might in certain alternative embodiments be located elsewhere. For instance, the seal might instead be disposed along the bearing interface, without departing from some aspects of the present invention. In such an alternative embodiment, only the lower portion of the gear chamber would be sealed by the seal. In another alternative embodiment, seals might be provided on both the housing interface and the bearing plate interface to provide singular sealing of the upper portion of the gear chamber and redundant sealing of the lower portion of the gear chamber It is further noted that, in addition to the means provided by conventional operation of the preferred seal 376, the gear chamber 272 is also to at least some extent preferably protected against ingress or egress by the irregular paths into the upper portion 272a and the lower portion 272b. More particularly, a right-angled path P1 into the upper portion 272a extends generally transversely along the housing interface 164 and the outer seal face 376a, then generally axially through the gap 355. A tortuous or right-angularly zig-zagged path P2 into the upper portion 272a extends alternately generally transversely and generally axially along the housing interface 164 and the groove 370, then generally axially through the gap 355. A generally transverse path P3 into the lower portion 272b extends generally transversely along the housing interface 164 and the outer seal face 376a, then generally transversely along the bearing plate interface 333. A tortuous or right-angularly zig-zagged path P4 into the lower portion 272b extends alternately generally transversely and generally axially along the housing interface 164 and the groove 370, then generally transversely along the bearing plate interface 333.

D-Shaped Washer

Figure 30:
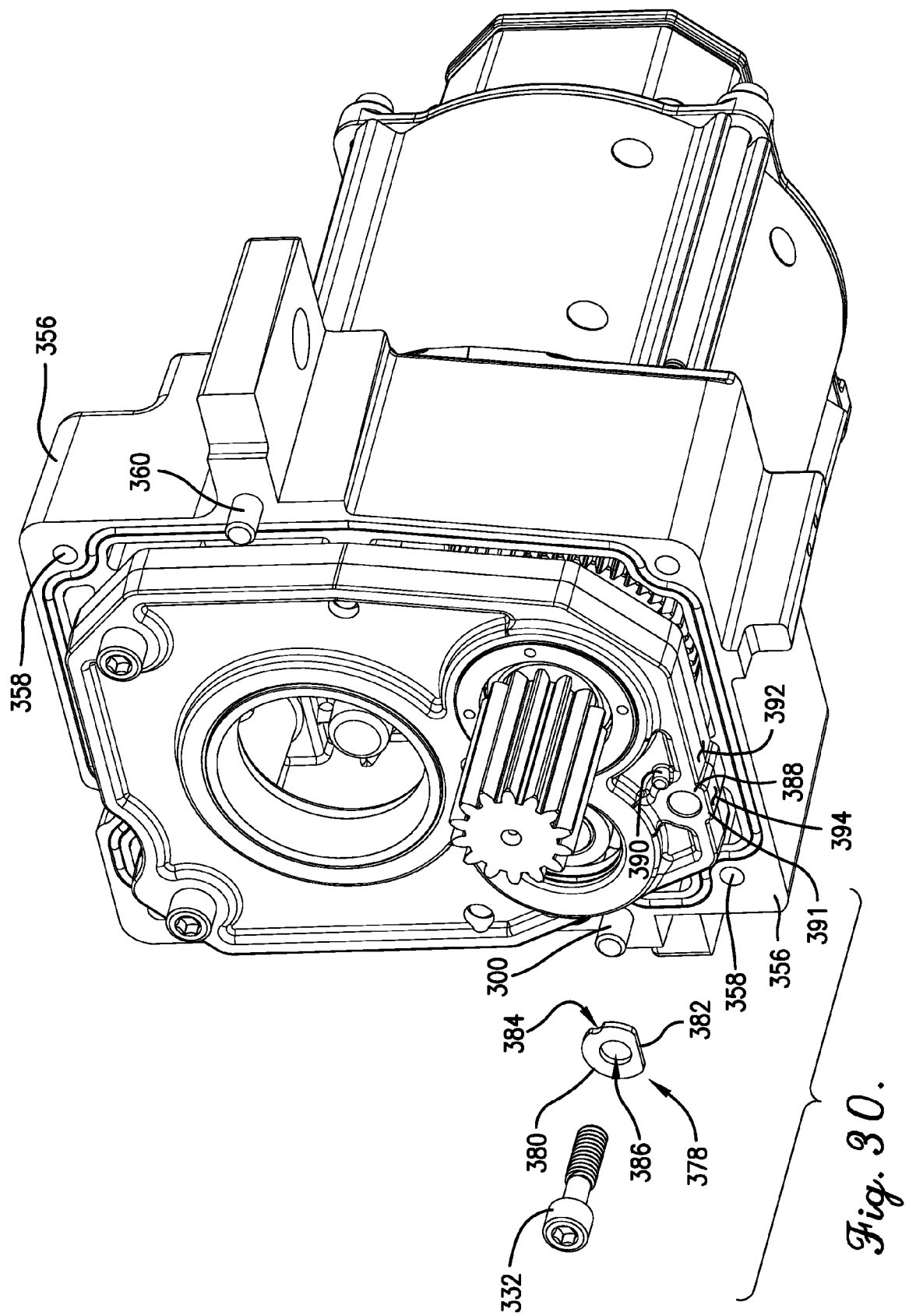
FIG. 30 is a partially exploded front perspective view of a portion of the lift motor of FIGS. 2-6 and others, particularly illustrating the assembly of the internal bearing plate and the housing, as well as the D-shaped washer.

In a preferred embodiment, a D-shaped washer 378 is associated with the internal bearing plate 165. More particularly, as shown in FIGS. 30, 31, and others, the washer 378 includes a curved outer face 380 and a flat outer face 382 extending between and interconnecting the ends of the curved outer face 380. The curved outer face 380 is preferably at least substantially semi-circular.

In a preferred embodiment, a notch 384 is formed in the washer 378 so as to interrupt the curved outer face 380.

Furthermore, the washer 378 preferably defines a center opening 386 extending therethrough.

The washer 378 preferably abuts the internal bearing plate 165 such that the center opening 386 is at least substantially aligned with one of the fastener-receiving holes 340 defined by the bearing plate 165. More particularly, the bearing plate 165 preferably defines a washer boss 388 that defines one of the fastener-receiving holes 340. The washer 378 rests on the washer boss 388.

An anti-rotation lug 390 extends generally axially adjacent the washer boss 388 so as to at least in part fill the notch 384 in the washer 378. Engagement of the washer 378 by the lug 390 prevents undesirable rotation of the washer 378 during tightening of the corresponding bearing plate fastener 332.

Furthermore, the washer 378 reduces the load in the thinner outer wall 391 (see, for instance, FIG. 30) defining part of the corresponding fastener-receiving hole 340.

The lug 390 is preferably integral with the bearing plate 165 but may be discretely formed without departing from the scope of some aspects of the present invention. Most preferably, the notch 384 is semi-circular and the lug 390 has a circular cross section. Alternative shapes are permissible, however.

Figure 32:
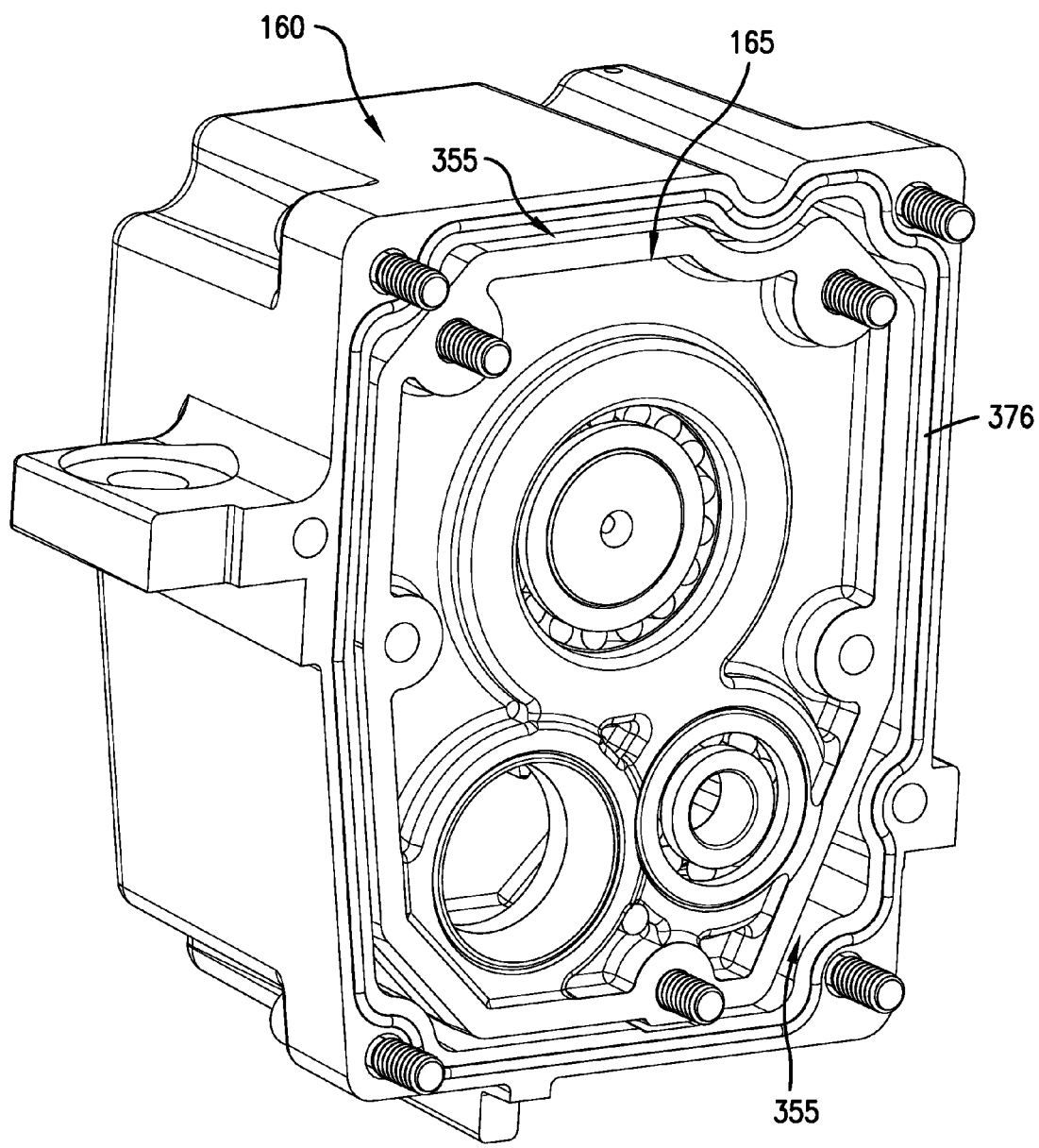
FIG. 32 is a rear perspective view of a portion of the lift motor of FIGS. 2-6 and others, particularly illustrating the relative positioning of the internal bearing plate and the housing.
Figure 33:
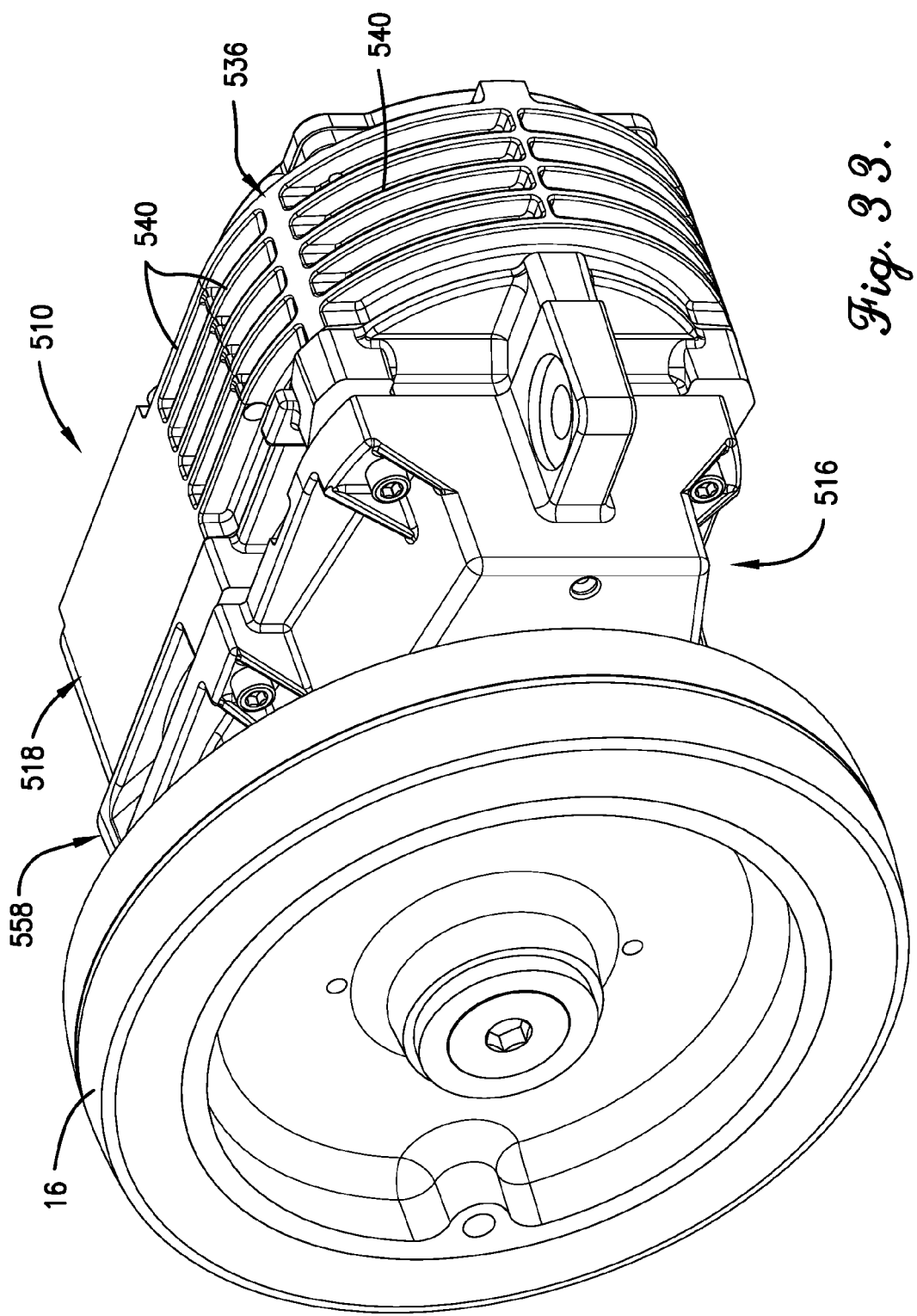
FIG. 33 is a front perspective view of the locomotion motor of FIG. 2.
Figure 34:
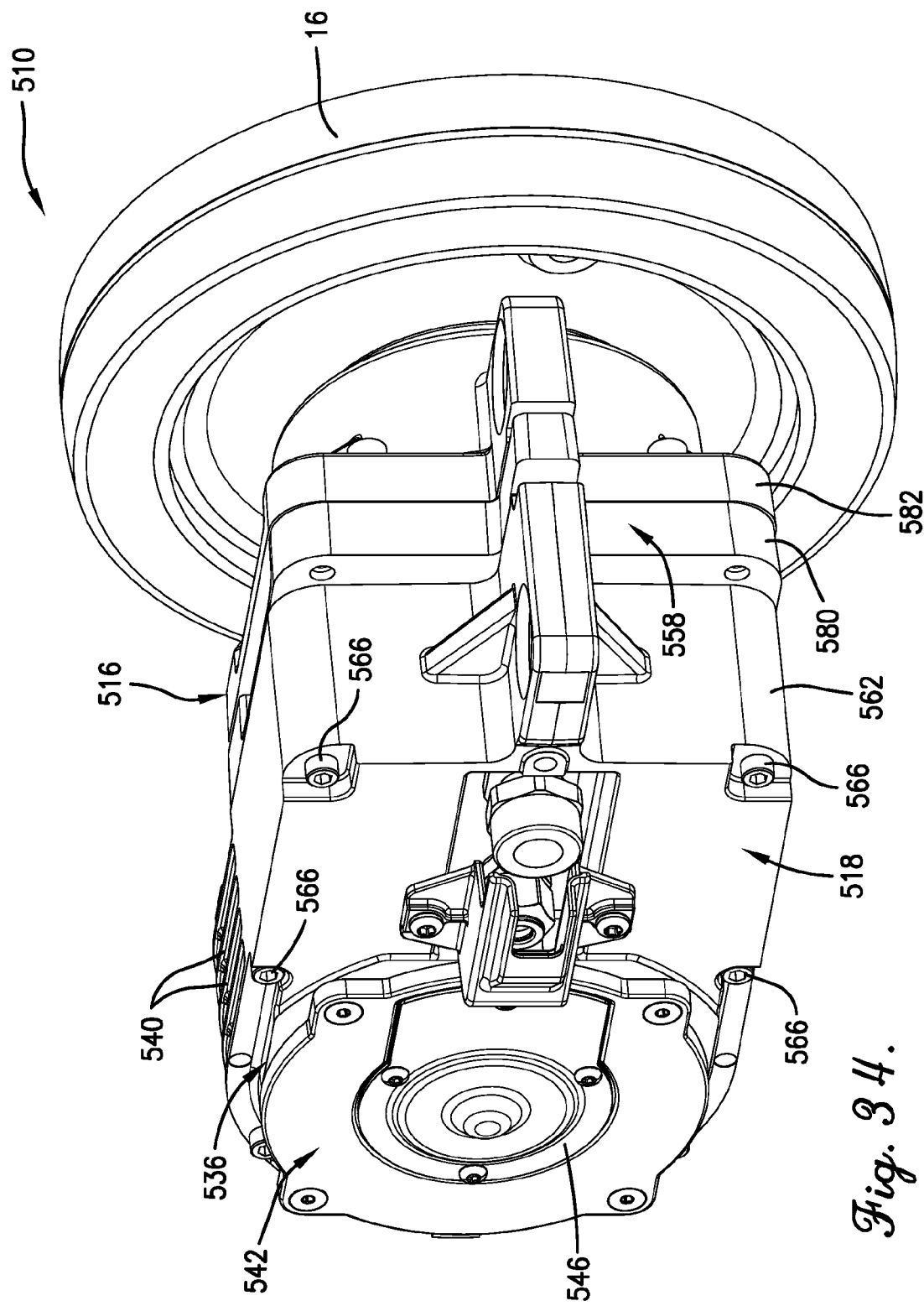
FIG. 34 is a rear perspective view of the locomotion motor of FIG. 2.
Figure 35:
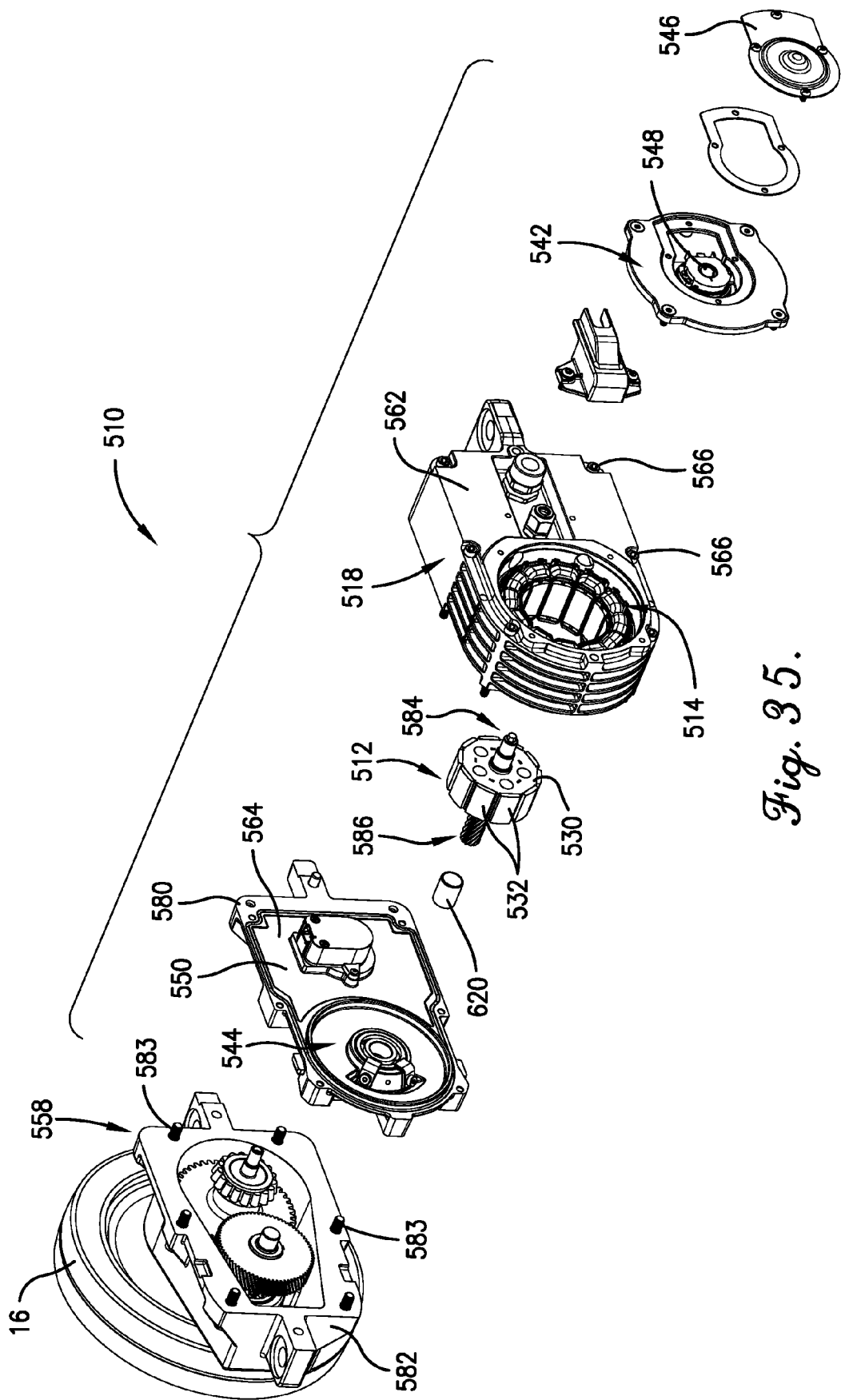
FIG. 35 is an exploded, alternative rear perspective view of the locomotion motor of FIGS. 2, 33, and 34.
Figure 36:
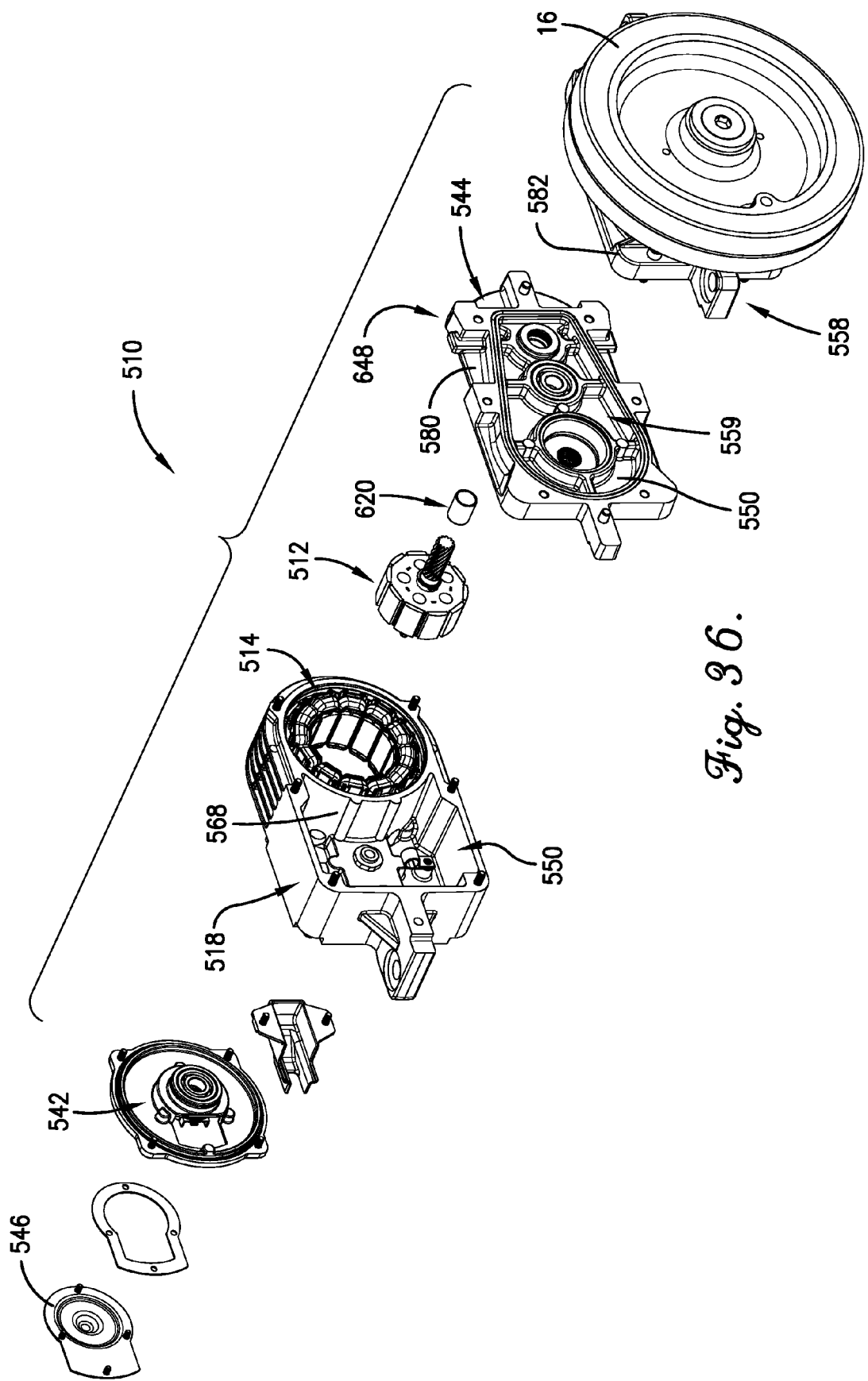
FIG. 36 is an exploded, alternative front perspective view of the locomotion motor of FIGS. 2, 33, and others.
Figure 37:
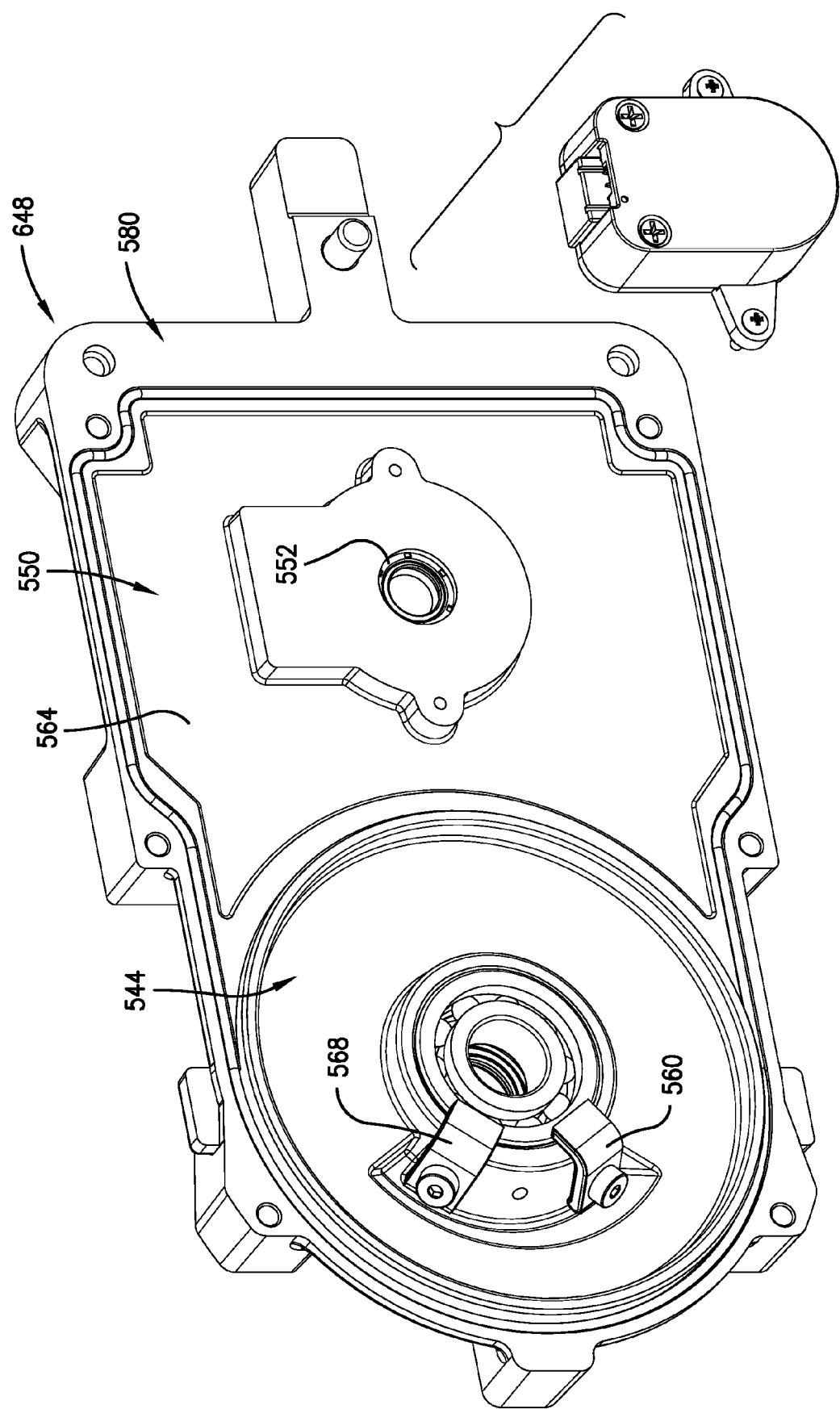
FIG. 37 is a rear perspective view of an endshield of the locomotion motor of FIGS. 2, 33, and others, particularly illustrating a pair of bearing locks.

In a preferred embodiment, the internal bearing plate 165 defines a perimetrical outer face 392. The lip 350 of the upper casting 160 preferably circumscribes the outer face 392. Preferably, the outer face 392 includes a flat region 394 that corresponds to and is at least substantially aligned with the flat outer face 382 of the washer 378. That is, the washer 378 is preferably positioned on the washer boss 388 such that the curved outer face 380 is positioned radially inwardly relative to the flat outer face 382, which preferably at least substantially aligns with (e.g., is flush with or slightly recessed relative to) a flat region 394 of the perimetrical outer face 392 of the bearing plate 165. Such a configuration is desirable to avoid interference between the washer 378 and the lip 350 of the upper casting 160 (see FIG. 31 for reference). That is, as illustrated in FIG. 32, a gap 396 is maintained between the washer 378 and the lip 350 by merit of the orientation of the washer 378 and the provision of the flat outer face 382.

Lift Arm Assembly Overview

As noted previously, the lift motor 110 preferably includes the lift arm assembly 118, which is positioned on an axial end of the lift motor 110. The lift arm assembly 118 includes the aforementioned crank arm or lift arm 166, which is preferably operable to lift the platform 14 with assistance of a scissor mechanism or other lifting aid. However, as also noted previously, direct lifting of the platform 14 is permissible without departing from the scope of the present invention.

More particularly, the lift arm 166 is preferably generally radially extending and fixed to the output shaft 168. A crank pin 398 preferably extends generally axially from the lift arm 166.

The lift arm 166 preferably comprises tempered and quenched chromium molybdenum steel with a trivalent chromate conversion coating. Other materials, hardening treatments (including no hardening treatments), and surface treatments (including no surface treatments) are permissible, however.

The crank pin 398 preferably comprises tempered and quenched chromium molybdenum steel with a hard chromium plating. Other materials, hardening treatments (including no hardening treatments), and surface treatments (including no surface treatments) are permissible, however.

Preferably, the crank pin 398 is press fit into the lift arm 166, although other interconnection means (e.g., adhesives and or pins) may be used in addition to or in lieu of the preferred press fit.

The lift arm 166 preferably includes the aforementioned pivot end 170 and lift end 172. The pivot end 170 is mounted to the output shaft 168 of the gear train 156 to rotate therewith. More particularly, as noted previously, the pivot end 170 preferably includes the slot 320 that receives the corresponding key 318 on the lift arm connection end 316 of the output shaft 168. Alternative means of interconnection are permissible, however, including those that use alternative keyed arrangements, fasteners, welds, adhesives, etc.

In a preferred embodiment, the crank pin 398 is located at the lift end 172.

The lift arm 166 may be shiftable among discrete positions (e.g., upper, lower, and home positions) or alternatively be configured for shifting among a continuum of positions.

In the illustrated embodiment, the lift motor 110 is devoid of structural limiters to prevent over-rotation of the lift arm 166. It is permissible according to some aspects of the present invention, however, for physical stops to be provided. For instance, upper and lower stops could be integrally formed with the upper casting 160 of the gearbox housing 158, with each of the stops being configured to engage the lift arm and thereby restrict swinging of the arm beyond a respective predetermined condition.

Lift Arm Position Sensor System

In a preferred embodiment, and as best shown in FIGS. 5 and 20-23, the lift arm assembly 118 includes the previously introduced lift arm position sensor system 270. The lift arm position sensor system 270 preferably senses the rotational or angular position of the lift arm 166.

The lift arm position sensor system 270 preferably includes a fixed portion 400 and a moveable portion 402. The fixed portion 400 is preferably fixed relative to the gearbox housing 158, while the moveable portion 402 is preferably fixed relative to the lift arm 166. The moveable portion 402 is thus preferably arcuately shiftable relative to the fixed portion 400.

The fixed portion 400 preferably includes a base 404 integrally formed with the upper casting 160, a bracket 406 secured to the base 404 by means of base fasteners 408, a printed circuit board 410 and associated wiring 412 secured by the bracket 406, and a sensor 414 fixed to the printed circuit board 410. The moveable portion 402 preferably includes a plurality of magnets 416 received in and glued into an elongated channel 418 defined by the lift arm 166 at the lift end 172 thereof.

More particularly, the sensor 414 is preferably fixed in a precise location on the board 410. The board 410 is positioned in a precise location on the bracket 406 by means of a plurality (preferably three (3)) of board locating pins 420.

The bracket 406 is secured to the base 404 at a precise location by means of the base fasteners 408 and a plurality (preferably a pair) of bracket locating pins 421 that extend through precisely machined locating holes 422 formed in the base 404. The locating holes 422 are preferably precisely positioned relative to a shaft opening 424 (for the output shaft 168) machined in the upper casting 160 of the gearbox housing 158, and the bracket locating pins 421 are preferably sized and shaped so as to fit tightly into the locating holes 422. Accurate positioning is thus assured.

In contrast, the bracket fasteners 408, which are most preferably screws but may be fasteners of other types (e.g., bolts or pins) preferably fit relatively loosely into a plurality of bracket fastener holes 426 formed in the base 404. That is, it is preferred that the bracket fasteners 408 are primarily a securement means rather than a positioning means.

Preferably, the board 410 is further secured within the bracket 406 by means of potting (e.g., in an epoxy or other suitable material).

The channel 418 is preferably machined into the lift arm 166 and locates the magnets 416 generally radially from the pivot point (at the pivot end 170) of the lift arm 166. A fixture (not shown) preferably precisely locates the magnets 416 along the length of the channel 418 (i.e., generally arcuately, although the channel 418 is preferably straight) during assembly.

It is permissible for alternative means and locations of fixation of the printed circuit board, sensor, and magnets to be provided. For instance, the printed circuit board and sensor might be affixed directly to the gearbox housing, without an intermediate bracket, while the magnets in contrast might be fitted to a bracket that mounts to the lift arm.

Preferably, regardless of exact fixation means, the magnets 416 are exposed axially (i.e., stick out) beyond the lift arm 166. That is, the magnets 416 are not embedded entirely in the lift arm 166. Such a configuration reduces the leakage field.

The sensor 414 is preferably a Hall device, although other sensor types may be used without departing from the scope of some aspects of the present invention.

Preferably, three (3) magnets 416 are provided. More particularly, two (2) smaller, outer magnets 416a are preferably positioned at opposite ends of a larger, inner magnet 416b. The magnets 416a,416b are preferably oriented such that a sharp switch in polarity occurs across each transition from one magnet to the next (i.e., from the inner end of a first one of the outer magnets 416a to the adjacent end of the inner magnet 416b, then from the other end of the inner magnet 416b to the inner end of the second outer magnet 416a). Provision of small outer magnets 416a, as opposed to larger magnets, is permissible and in fact preferred because it is only necessary that the above-described pair of sharp transitions between poles (i.e., from one magnet 416a,416b to the next) occur. Such sharp transitions are desirable for efficient switching.

Preferably, the two outer magnets 416a force the magnetic field to precisely locate the switch point.

The lift arm position sensor system 270 is configured to sense the position only of a home range of the lift arm 166. Preferably, the home range extends approximately twenty (20) degrees. Thus, the sensor 414 is positioned at a specific arc, and the inner magnet 416b extends twenty (20) degrees.

Once the lift arm 166 moves out of the home range, the motor encoder 154 is used to know the position of the lift arm 166. More particularly, the encoder 154 analyzes the revolutions of the lift motor 110, the gear ratios associated with the gear train 156, the length of the lift arm 166, and/or other appropriate factors to calculate the position of the lift arm 166.

One advantage of the aforementioned configuration is that, due to the described precision built into the component designs (e.g., bracket locating pins 421 and locating holes 422) and assembly techniques (e.g., use of a magnet positioning fixture), calibration of the sensor 414 after the lift motor 500 is assembled may be avoided.

Locomotion Motor

A preferred embodiment of the locomotion motor 510 is shown in detail in FIGS. 33-44. It is initially noted that, with certain exceptions to be discussed in detail below, many of the elements of the locomotion motor 510 are the same as or very similar to those described in detail above in relation to the lift motor 110. Therefore, for the sake of brevity and clarity, redundant descriptions and numbering will be generally avoided here. Unless otherwise specified, the detailed descriptions of the elements presented above with respect to the lift motor 110 should therefore be understood to apply at least generally to the locomotion motor 510, as well.

In some cases, features described below with respect to the locomotion motor 510 may also be applicable to the lift motor 110, described in detail above, and/or the turntable motor 710, described below.

In a preferred embodiment, the locomotion motor 510 broadly includes a rotor 512 rotatable about an axis, a stator 514, a gearbox assembly 516, a conduit box 518, and one of the wheels 16.

The locomotion motor 510 is preferably oriented such that the motor axis extends generally horizontally. It is permissible, however, in connection with certain aspects of the present invention, for the locomotion motor to be alternatively oriented. That is, unless otherwise specified or made clear, the directional references made herein with regard to the locomotion motor 510 (e.g., top, bottom, upper, lower, etc.) are used solely for the sake of convenience and should be understood only in relation to each other. For instance, a component might in practice be oriented such that components referred to as "top" and "bottom" are sideways, angled, inverted, etc. relative to the chosen frame of reference.

Motor Overview

Similar to the stator 114 of the lift motor 110, the stator 514 of the locomotion motor 510 preferably includes a generally toroidal stator core 520 and a plurality of coils 522 wound about the stator core 520. The stator core 520 is preferably electrically insulated by means of electrically insulative endcaps 524. Furthermore, the stator core 520 preferably includes twelve (12) teeth 526 defining twelve (12) slots 528 therebetween.

The rotor 512 preferably includes a rotor core 530, a plurality of arcuately arranged magnets 532, and a motor shaft 534. In a preferred embodiment, ten (10) magnets 532 are provided.

The stator 514 at least substantially circumscribes the rotor 512, such that the locomotion motor 510 is an inner rotor motor.

A motor shell 536 preferably at least substantially circumscribes the stator 514 and in part defines a motor chamber 538 that at least substantially receives the stator 514 and the rotor 512. In a preferred embodiment, the motor shell 536 defines a plurality of fins 540 configured to disperse heat generated during operation of the locomotion motor 510. Preferably, the fins 540 define a generally cylindrical motor shell envelope, although other shapes are permissible according to some aspects of the present invention.

The locomotion motor 510 further preferably includes first and second axially spaced apart endshields 542 and 544, respectively, that connect with the shell 536 to at least substantially enclose respective axial ends of the motor chamber 538.

In a preferred embodiment, the first endshield 542 includes a removable cover 546 enabling access to, among other things, a first motor encoder 548, without removal of the entire first endshield 542. The cover can be omitted without departing from the scope of the present invention, however.

The conduit box 518 defines a conduit box chamber 550 and preferably encloses therein a second encoder 552, wiring (not shown), and other electronic components (not shown) for operation of the locomotion motor 510. Furthermore, the conduit box 518 preferably defines a variety of wire-routing structures 554.

As will be discussed in greater detail below, the conduit box 518 is preferably secured at least substantially alongside the stator 514, the rotor 512, and the shell 536. That is, rather than being positioned at an axial end of the motor 510, the conduit box 518 is preferably disposed at the side of, laterally from, or generally radially outwardly of the stator 514, the rotor 512, and the shell 536. As will be discussed in greater detail below, the configuration of the conduit box 518, as well as its positioning, preferably reduces the overall axial length of the locomotion motor 510.

The gearbox assembly 516 preferably includes a gear train 556. The gearbox assembly 516 also includes a gearbox housing 558 defining a gear chamber 559, with the gear train 556 being at least primarily located within the chamber 559. The gearbox assembly 516 is preferably at least substantially disposed at an axial end of the stator 514, the rotor 512, and the shell 536.

The locomotion motor 510 further preferably includes a pair of bearing locks 560 at least substantially similar to the bearing lock 174 described above with respect to the lift motor 110.

Conduit Box Disposition

As noted above, the conduit box 518 is preferably positioned at least substantially laterally adjacent the stator 514, the rotor 512, and the shell 536. More particularly, the conduit box 518 preferably includes a body 562 and a lid 564. The body 562 is preferably integrally formed with the motor shell 536. Preferably, the lid 564 is discretely formed relative to the body 562 and the motor shell 536 but is integrally formed with the second endshield 544. The lid 564 is preferably attached to the body by means of a plurality of threaded lid bolts 566, although other fastener types (screws, pins, latches, and/or adhesives, for instance) may alternatively be used.

Figure 38:
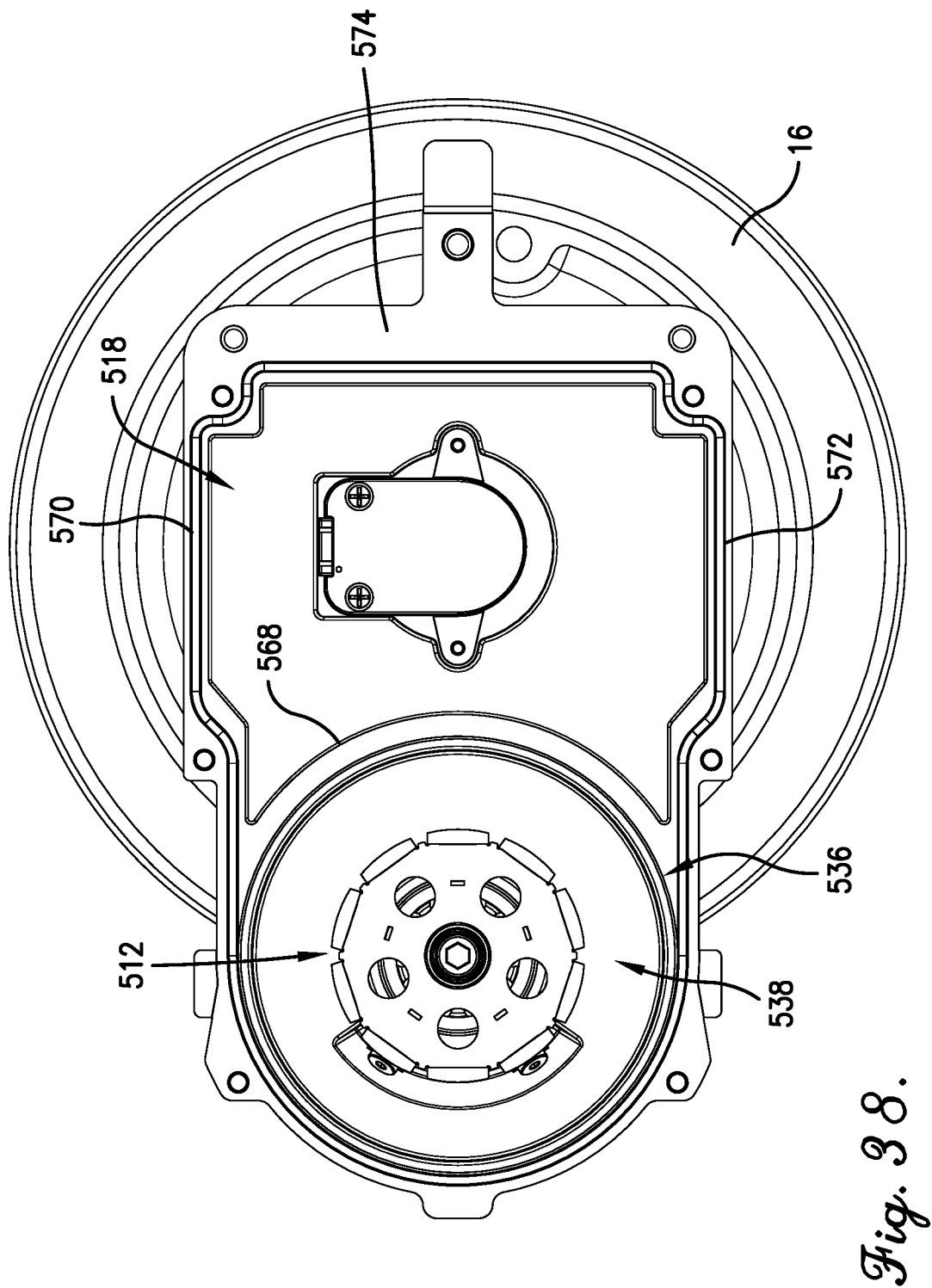
FIG. 38 is a rear view of a portion of the locomotion motor of FIGS. 2, 33, and others, particularly illustrating the motor chamber.
Figure 39:
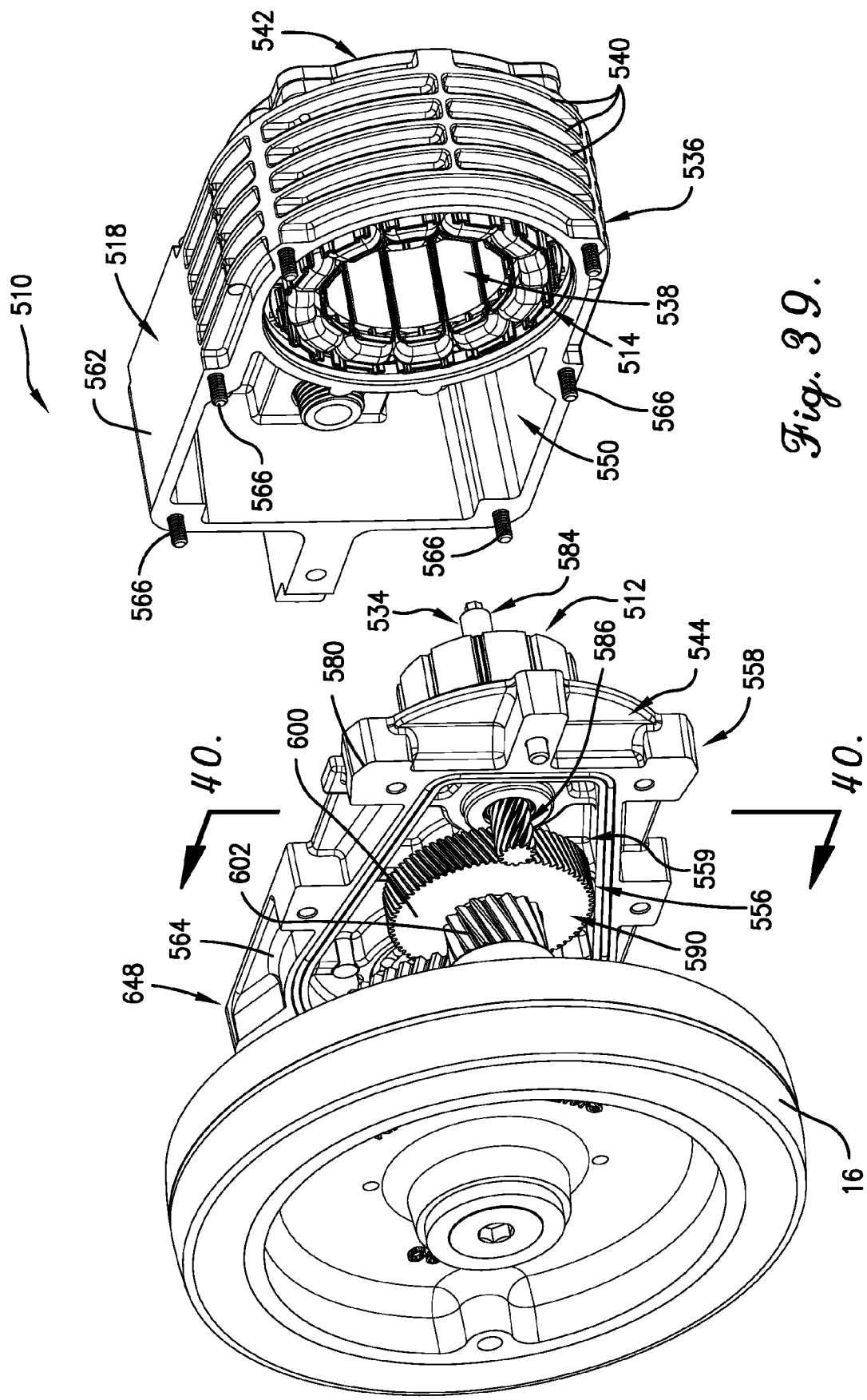
FIG. 39 is a partially exploded front perspective view of the locomotion motor of FIGS. 2, 33, and others, particularly illustrating the disposition of the conduit box.
Figure 40:
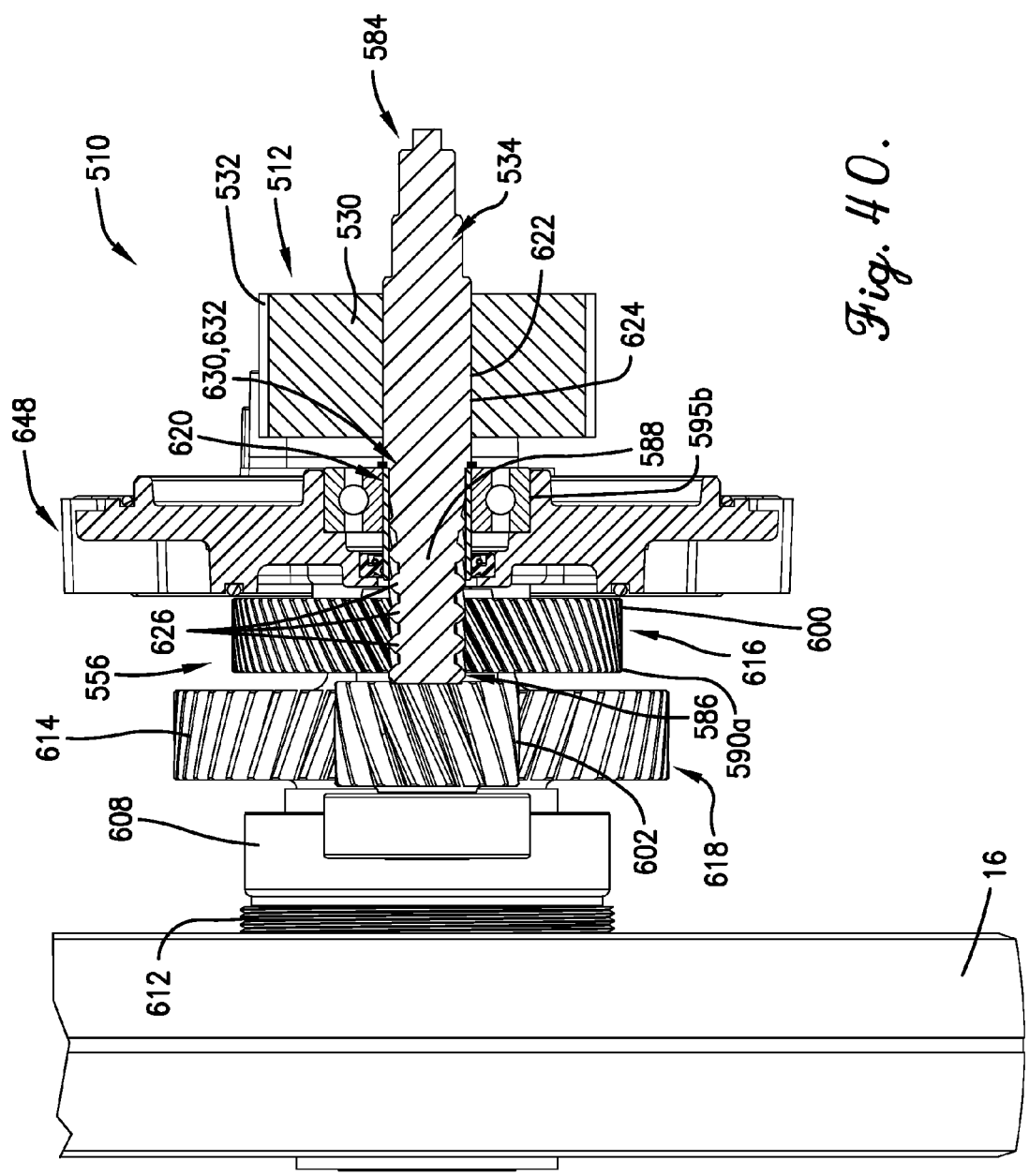
FIG. 40 is a partially sectioned side view of a portion of the locomotion motor of FIGS. 2, 33, and others, particularly illustrating the gear train.
Figure 41:
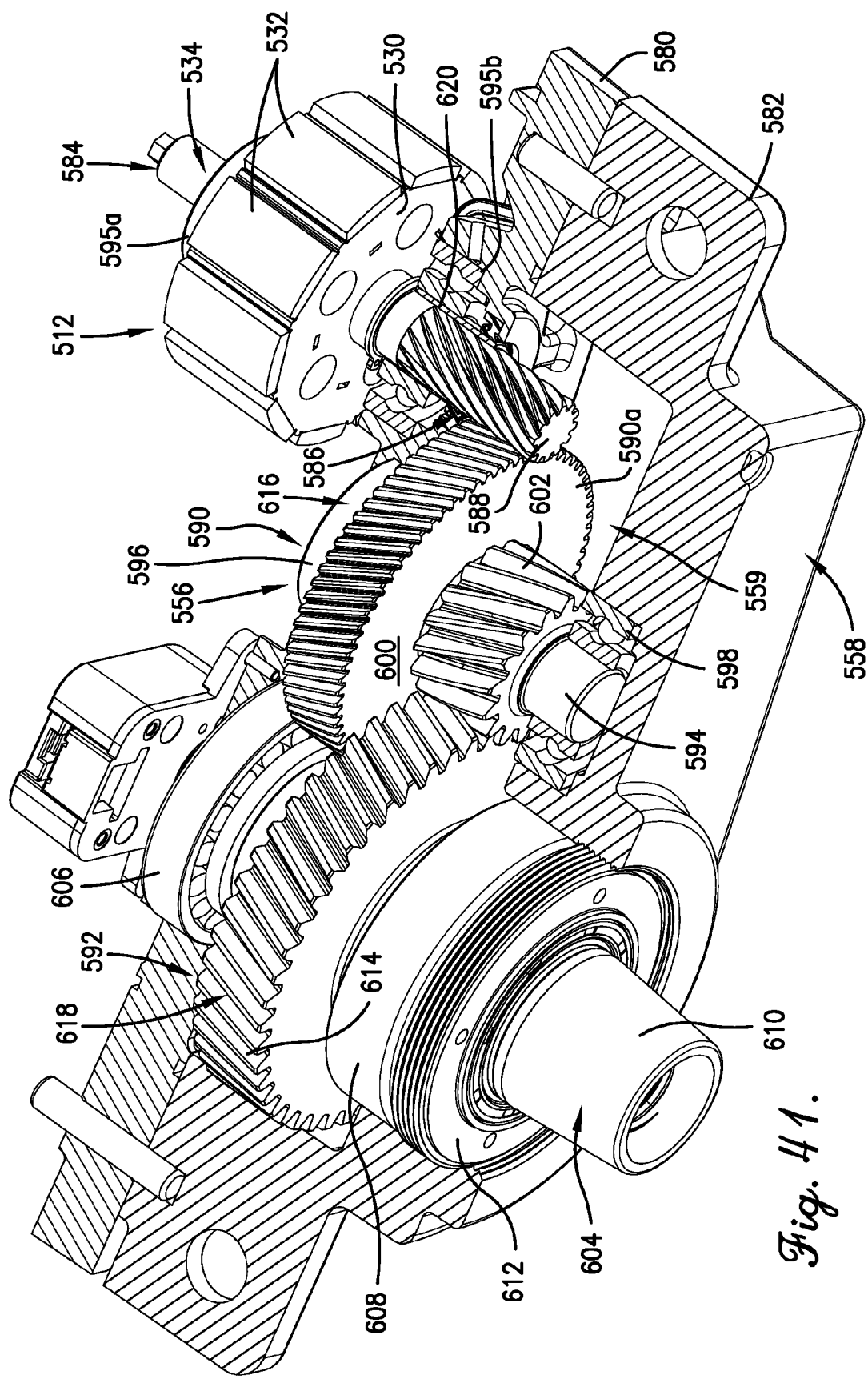
FIG. 41 is a partially sectioned front perspective view of a portion of the locomotion motor of FIGS. 2, 33, and others, particularly illustrating the gear train.
Figure 42A:
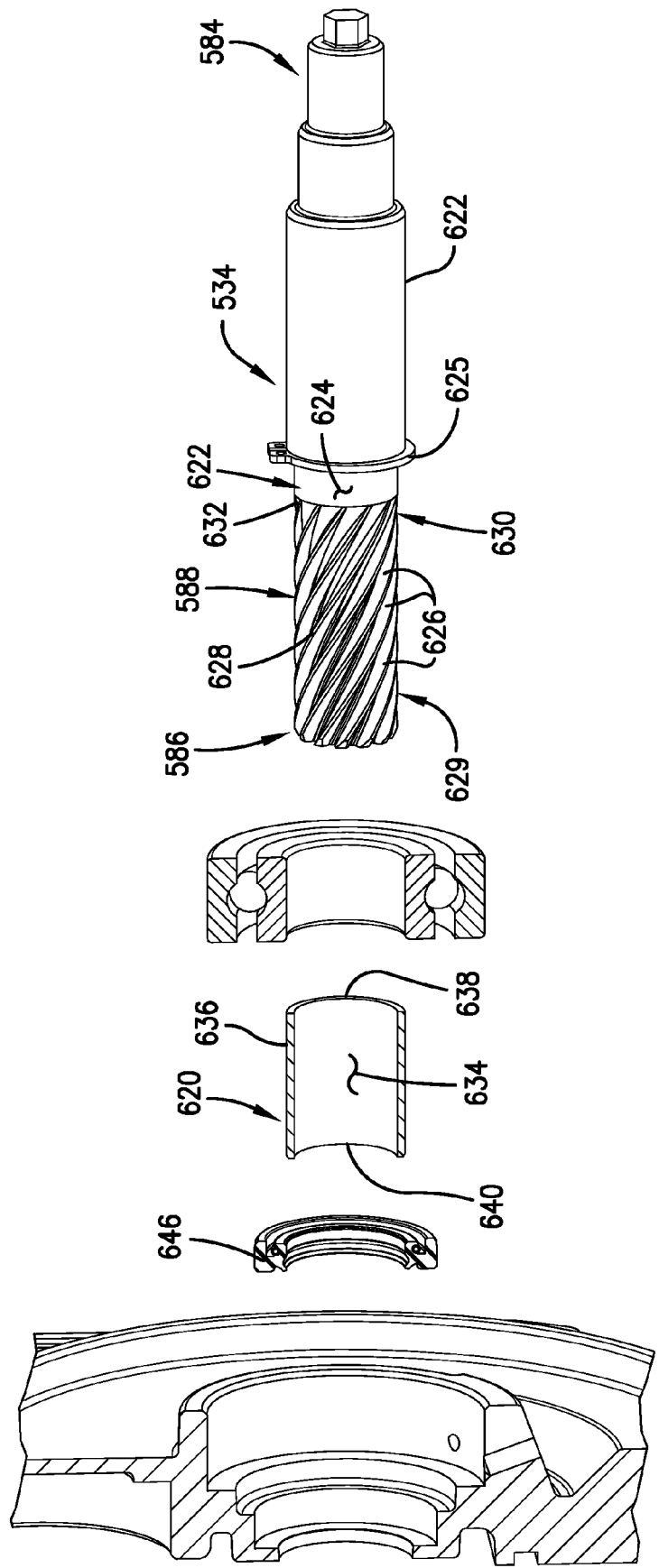
FIG. 42a is an exploded side perspective view of a portion of the locomotion motor of FIGS. 2, 33, and others, particularly illustrating the sealing sleeve.
Figure 42B:
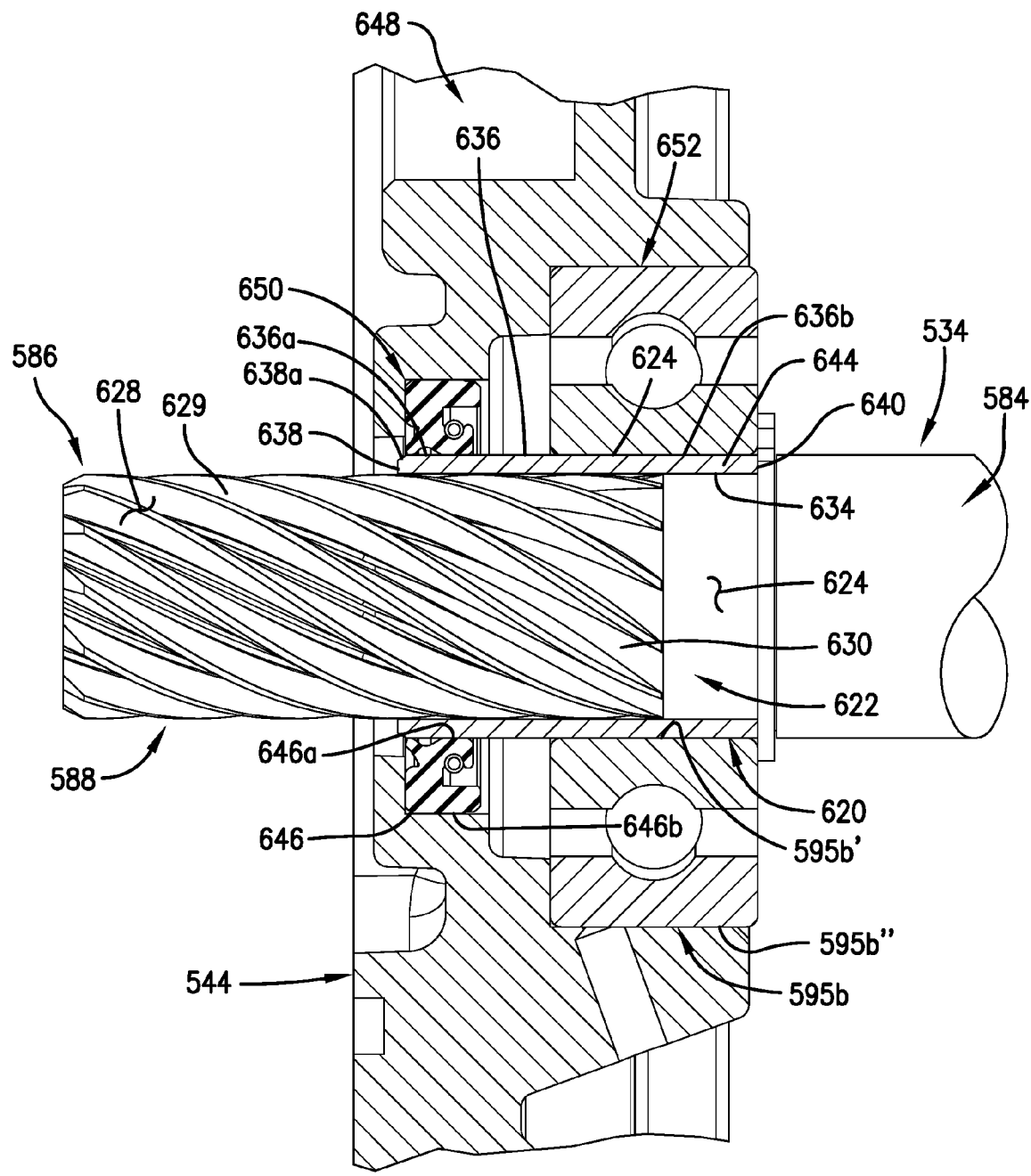
FIG. 42b is a partially sectioned side view of a portion of the locomotion motor of FIGS. 2, 33, and others, particularly illustrating the sealing sleeve.
Figure 43:
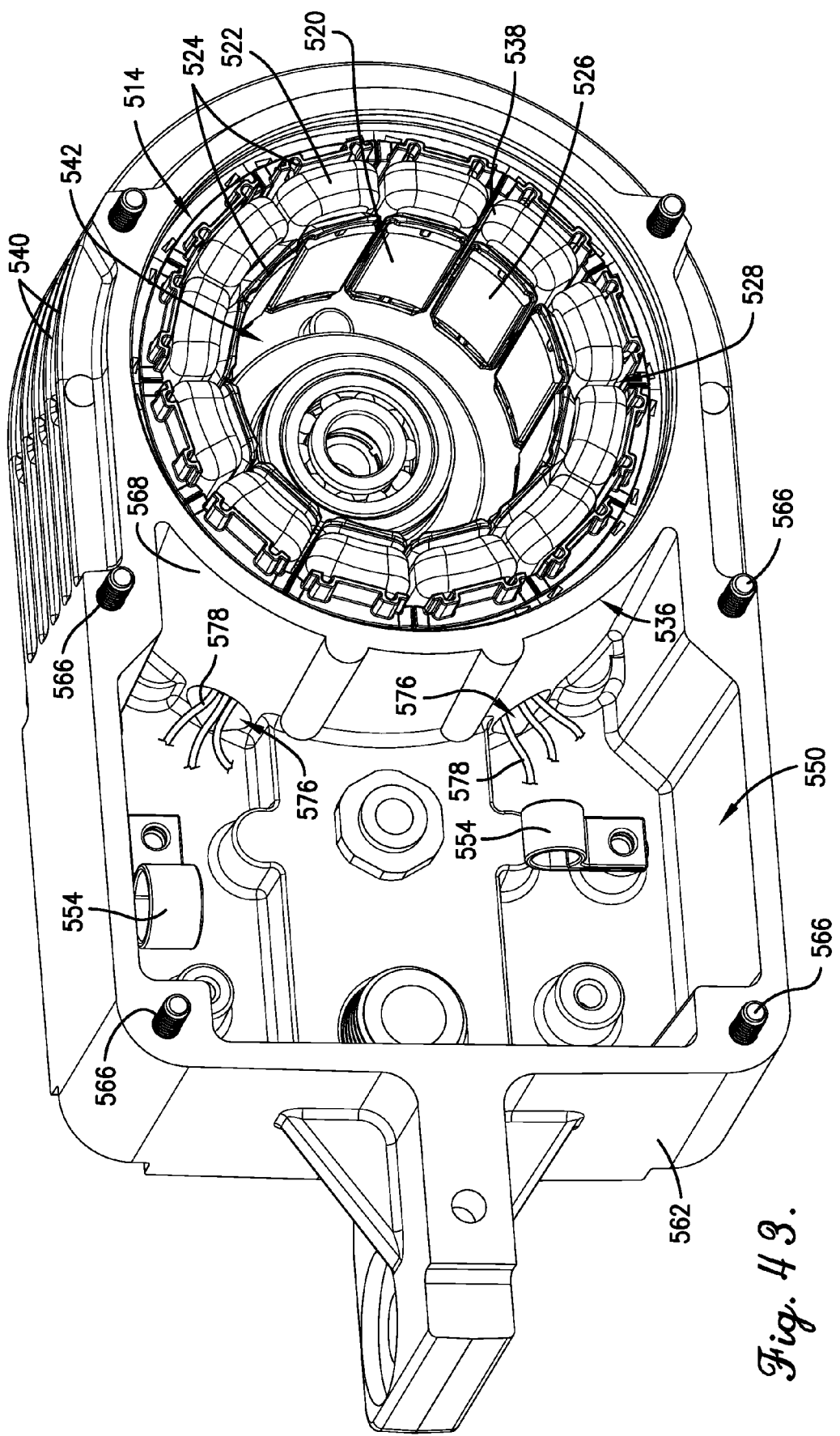
FIG. 43 is a front perspective view of a portion of the locomotion motor of FIGS. 2, 33, and others, particularly illustrating the pass-through wiring holes and the disposition of the conduit box.
Figure 44:
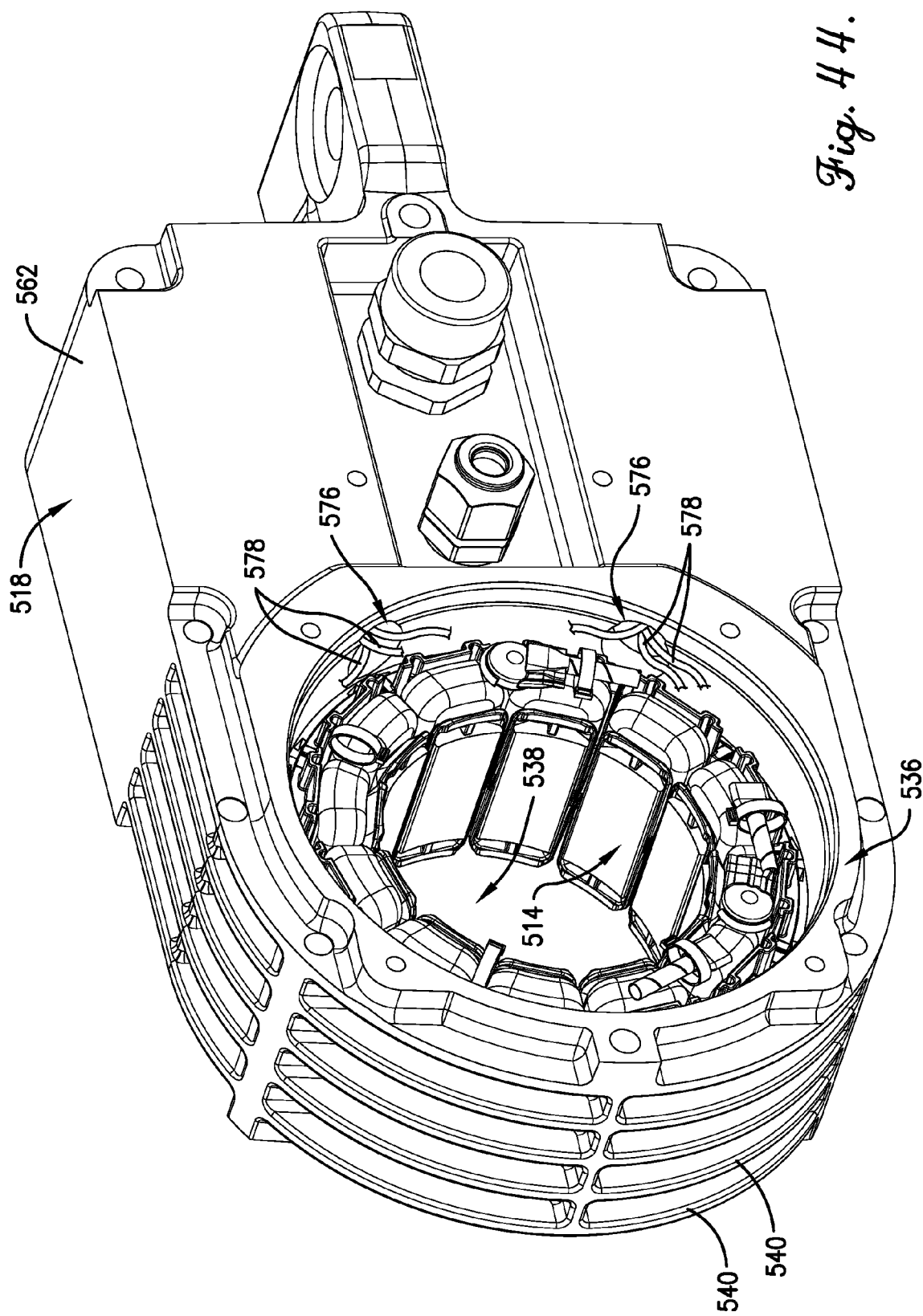
FIG. 44 is a rear perspective view of a portion of the locomotion motor of FIGS. 2, 33, and others, particularly illustrating the pass-through wiring holes and the disposition of the conduit box.
Figure 45:
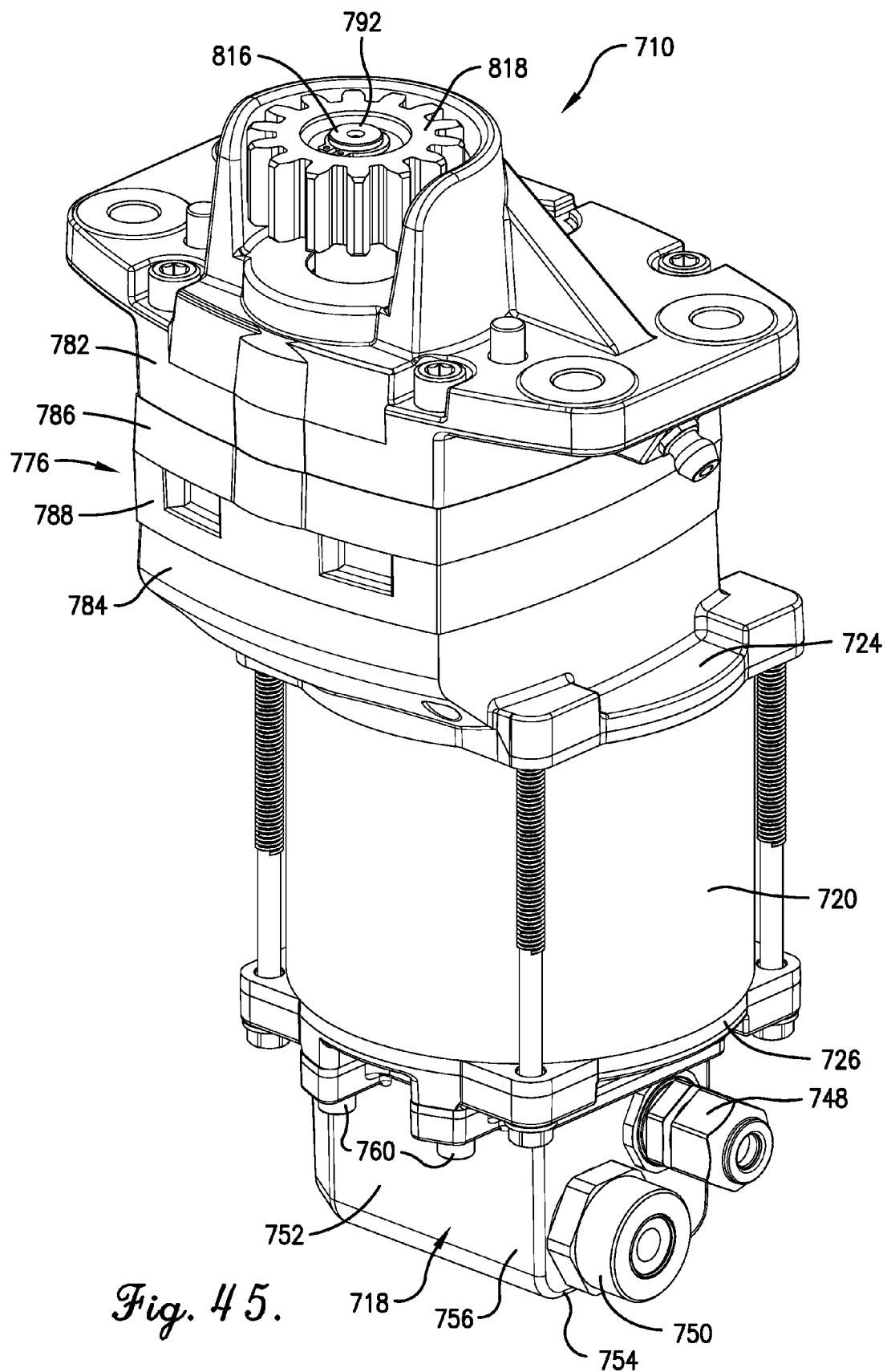
FIG. 45 is a top perspective view of the turntable motor of FIG. 2.
Figure 46:
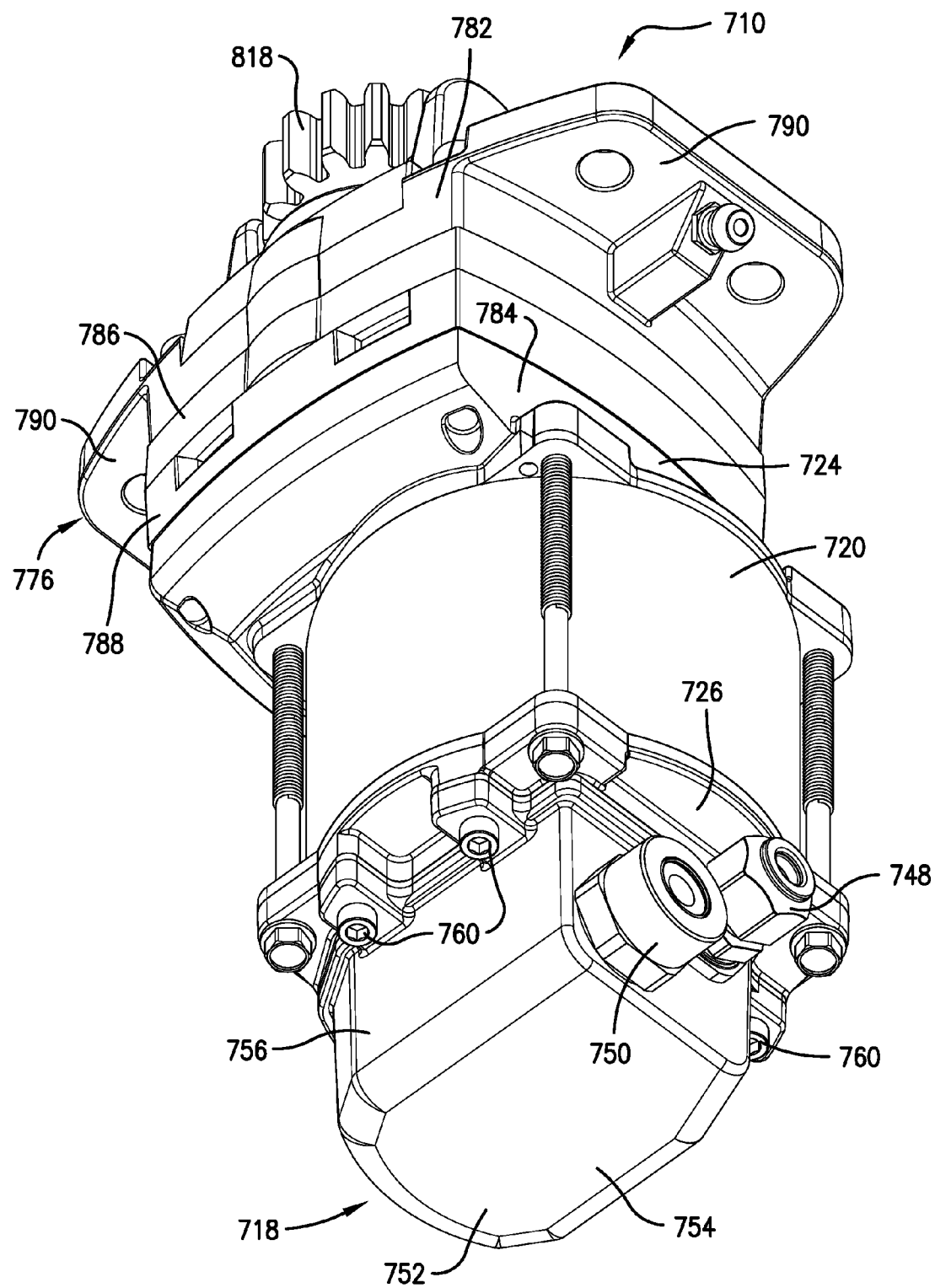
FIG. 46 is a bottom perspective view of the turntable motor of FIGS. 2 and 45.
Figure 47:
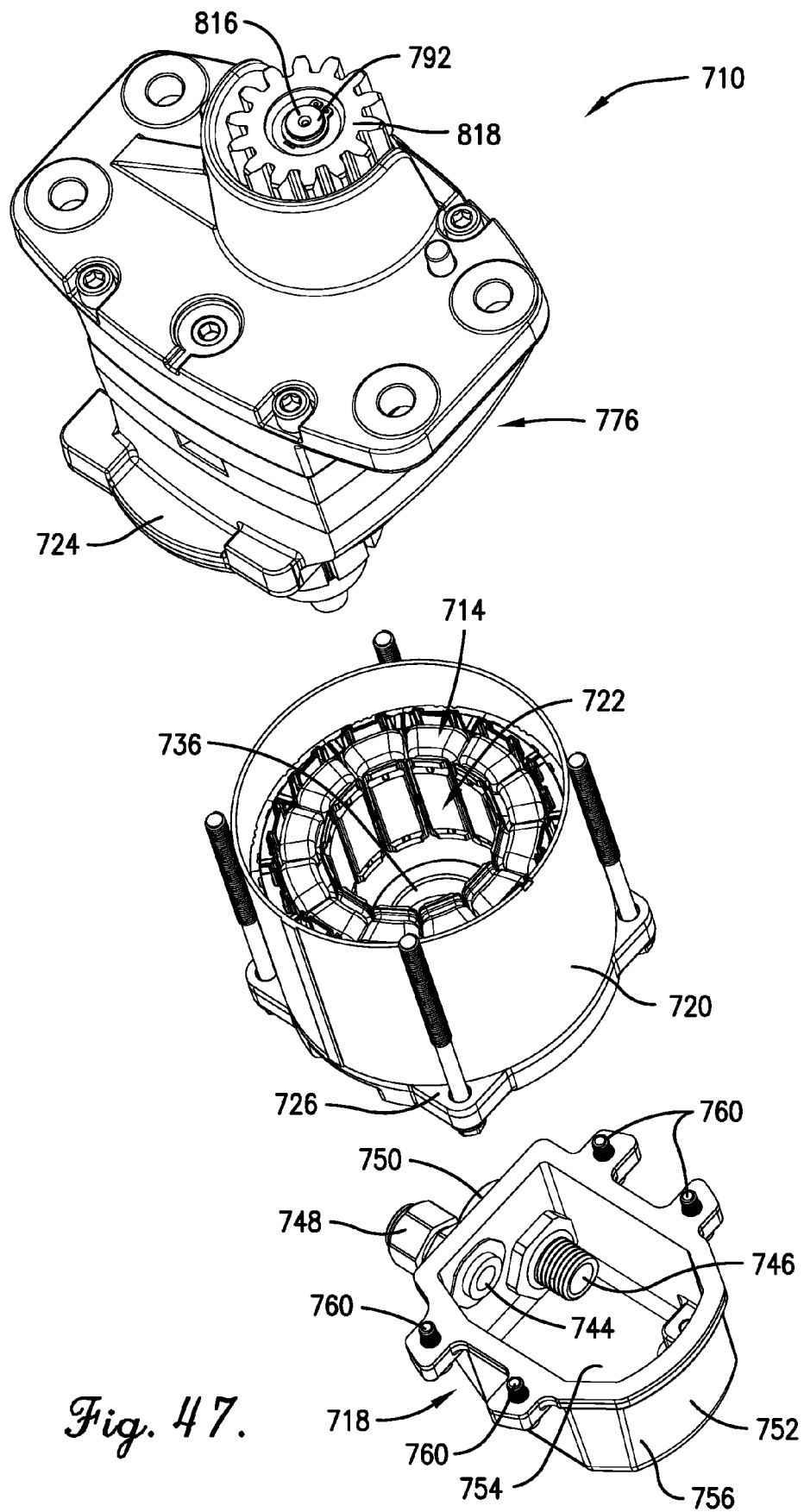
FIG. 47 is an exploded top perspective view of the turntable motor of FIGS. 2, 45, and 46.
Figure 48:
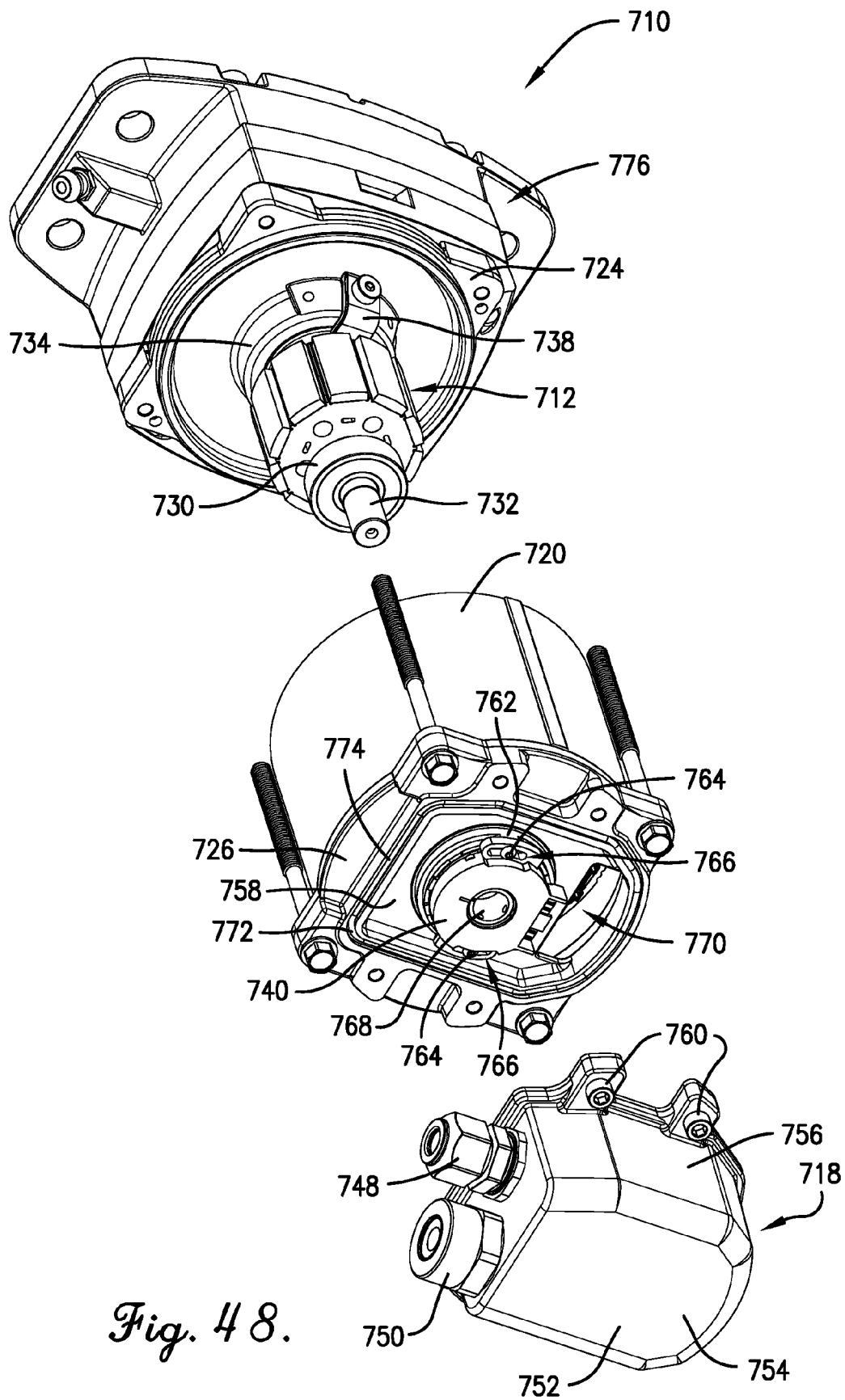
FIG. 48 is an exploded bottom perspective view of the turntable motor of FIGS. 2, 45, and others.

As shown in FIG. 38 and others, the conduit box 518 is preferably generally rectangular in cross-section, but with a curved inner side 568 comprising a portion of the motor shell 536. More particularly, the conduit box is preferably defined by the curved inner side 568 formed by the motor shell 536; substantially parallel, generally straight top and bottom sides 570 and 572 extending generally tangentially from the motor shell 536 and interconnected by the curved inner side 568; and a generally straight outer side 574 extending generally orthogonally relative to and interconnecting the top and bottom sides 570 and 572.

As noted briefly above, such disposition of the conduit box 518 is desirable to meet the very tight space constraints associated with the locomotion motor 510. More particularly, the axial length of the locomotion motor 510 is reduced.

Conduit Box Pass-Through Wiring Holes

In a preferred embodiment, the conduit box 518 defines a plurality of pass-through wiring holes 576 through which wiring 578 extends between the motor chamber 538 and the conduit box chamber 538. More particularly, it is preferred that a pair of the wiring holes 576 are formed through the curved inner side 568 of the conduit box 518 (or, equivalently, through the appropriate portion of the motor shell 536).

The wiring 578 preferably comprises A, B, and C phase wiring (i.e., wiring for a three-phase motor) extending from the conduit box chamber 538 to the motor chamber 538, where the wiring 578 forms the aforementioned stator coils 522.

As with the general placement of the conduit box 518, this configuration reduces the axial length of the locomotion motor 510.

Furthermore, seals between the motor chamber 538 and the conduit box chamber 538 are not required. That is, provision of internal wire routing via the pass-through wiring holes 576 (in contrast to externally routed wiring passing through an axial end of the motor shell 536 and/or through an external trough, for instance) eliminates the need for additional sealing considerations.

Gearbox Assembly Overview

As noted previously, the gearbox assembly 516 preferably includes the gear train 556, which is housed in the gearbox housing 558. The gear train 556 preferably ultimately transfers rotation of the motor shaft 534 to an output shaft 604 and, in turn, to the corresponding wheel 16.

The gearbox housing 558 preferably comprises two components: an inner portion 580 spaced from the corresponding wheel 16 and an outer portion 582 adjacent the corresponding wheel 16. The inner portion 580 and the outer portion 582 are preferably interconnected by means of a plurality of gearbox housing fasteners 583 in the form of threaded bolts, although other fastener types (e.g., screws, pegs, or latches) may additionally or alternatively be used.

In a preferred embodiment, the inner portion 580 is integrally formed with the second endshield 544 and the conduit box lid 564. Discrete formation is permissible without departing from the scope of the present invention, however.

In a preferred embodiment, the motor shaft 534 includes an encoder end 584 and a gear train end 586. In a preferred embodiment, the gear train end 586 includes an engagement region 588 that engages an engaged component 590a. Most preferably, the engagement region 588 comprises a pinion gear 588 that engages a component 590a (described in greater detail below) of an intermediate gear assembly 590. The intermediate gear assembly 590 preferably in turn engages an output gear assembly 592.

The motor shaft 534 is preferably rotatably supported on first and second motor shaft bearings 595a,b.

The intermediate gear assembly 590 comprises an intermediate shaft 594 rotatably supported on intermediate bearings 596 and 598. The intermediate gear assembly 590 further includes a first intermediate gear 600, which comprises the engaged component 590a, and a second intermediate gear 602. The pinion gear 588 engages the first intermediate gear 600 such that rotation of the motor shaft 534 drives rotation of the intermediate shaft 594 and the intermediate gears 600 and 602. The second intermediate gear 602 is preferably smaller in diameter than the first intermediate gear 600 and comprises fewer gear teeth, although other size and tooth number relationships are permissible according to some aspects of the present invention.

The output gear assembly 592 comprises the output shaft 604, which is preferably rotatably supported on output bearings 606 and 608. The output shaft 604 includes a hub end 610 to which the wheel 16 of the locomotion motor 510 is mounted so as to rotate therewith. Preferably, the output bearing 608 is secured by means of a threaded locking nut 612, although other securement means are permissible.

The output gear assembly 592 further includes an output gear 614. The second intermediate gear 602 preferably engages the output gear 592 such that rotation of the motor shaft 534 and, in turn, of the intermediate shaft 594 and intermediate gears 600 and 602, drives rotation of the output shaft 604 and the output gear 614. Thus, rotation of the motor shaft 534 drives rotation of the wheel 16.

As will be readily apparent from the description above, the gear train 556 is preferably a two-stage (2-stage) system. More particularly, the gear train 556 preferably includes a first stage 616 comprising the pinion gear 588 and the first intermediate gear 600. The gear train 556 further preferably includes a second stage 618 comprising the second intermediate gear 602 and the output gear 614. However, while the illustrated number of stages and associated gear ratios are preferred to appropriately modify rotational speed and torque (e.g., to decrease speed and increase torque), various individual-stage gear ratios and/or overall gear ratios are permissible without departing from the scope of the present invention.

Preferably, the motor shaft 534, the intermediate shaft 594, and the output shaft 604 are each arranged in parallel to each other, such that the gear train 556 is a parallel-shaft gear train. Non-parallel arrangements or partially parallel arrangements fall within the scope of some aspects of the present invention, however.

Furthermore, although preferred bearing types are illustrated, other bearing types (e.g., ball, roller, needle etc.) and/or arrangements (e.g., different positioning) are permissible without departing from the ambit of the present invention.

Sealing Sleeve

As will be discussed in greater detail below, the gearbox assembly 516 further preferably includes a sealing sleeve 620 positioned over a portion of the motor shaft 534.

As noted previously, the motor shaft 534 preferably includes an encoder end 584 and a gear train end 586. The gear train end 586 includes the engagement region 588, which engages the engaged component 590a.

The motor shaft 534 also preferably includes a second or middle region 622 extending between and interconnecting the encoder end 584 and the gear train end 586 so as to be disposed adjacent the engagement region 588. The middle region 622 preferably presents an at least substantially smooth outer shaft surface 624.

The engagement region 588 and the middle region 622 preferably present at least substantially equal outer diameters, although disparities in size are permissible according to some aspects of the present invention.

In a preferred embodiment, the encoder end 584 presents a greater outer diameter than that of the engagement region 588 and the middle region 622, although such relative dimensioning is not integral to some aspects of the present invention. (A C-clip 625 is preferably but not necessarily disposed at an interface between the middle region 622 and the encoder end 584.)

Furthermore, the engagement region 588 and the middle region 622 preferably present congruent outer cross-sectional profiles and, more particularly, each preferably present circular outer cross-sectional profiles. Disparities in shape are permissible according to some aspects of the present invention, or same but non-circular cross-sectional shapes may be defined without departing from the scope of some aspects of the present invention.

The engagement region 588 preferably comprises a plurality of helically arranged teeth 626 (i.e., a plurality of splines) presenting a substantially variable and, most preferably, discontinuous outer shaft surface 628 that at least in part engages the engaged component 590a. Alternative engagement-driving components, including but not limited to keys, spokes, conventional gear teeth, etc. may constitute the engagement region or a portion thereof without departing from the scope of the present invention, however.

The engagement region 588 preferably includes a primary portion 629 configured for engagement with the engaged component 590a and a transition portion or region 630 adjacent the primary portion 629. The primary portion 629 and the transition portion 630 preferably cooperatively define the variable outer shaft surface 628.

Furthermore, the transition portion 630 preferably extends between and interconnects the middle region 622 and the primary portion 629. Alternatively stated, the transition region 630 is disposed adjacent an interface 632 between the middle region 622 and the gear train end 586 (i.e., between the smooth outer surface 624 and the substantially variable outer surface 628.

As will be readily apparent to those of ordinary skill in the art, the transition region 630 of the illustrated embodiment includes a "sweep out" of the teeth 626 as they transition from an initial partial-depth configuration adjacent the interface 632 to their full depth configuration in the primary portion 629 of the engagement region 588. For alternate tooth designs, however, the transition region should be understood in a broad sense to include a region of teeth or other engagement-driving components immediately adjacent the interface.

The sealing sleeve 620 is preferably a discrete component fully circumscribing or encircling the shaft 534. Integral formation or partial circumscription are permissible according to some aspects of the present invention. Most preferably, as will be discussed in greater detail below, the sleeve 620 engages the shaft 534 in such a manner as to rotate therewith.

Preferably, the sealing sleeve 620 is in the form of a cylindrical tube presenting a smooth inner surface 634 and a smooth outer surface 636, as well as axially spaced apart first and second end margins 638 and 640. Other shapes are permissible according to some aspects of the present invention, as are alternative finishes to parts or the entireties of the inner and outer surfaces of the sleeve.

The sleeve 620 preferably includes a first section 642 and a second section 644. The first section 642 preferably at least partly circumscribes and engages the engagement region 588 of the shaft 534. The second section 644 preferably at least partly circumscribes and engages the middle region 622. Most preferably, the first section 642 envelops (i.e., circumscribes and makes contact with) the entirety of the transition portion 630 and part of the primary portion 629 (i.e., a part of primary portion 629 that abuts the transition portion 630).

In keeping with the above-described preferred substantially equal outer diameters of the engagement region 588 and the middle region 622, the first and second sections 642 and 644 of the sleeve 620 preferably present at least substantially equal inner diameters, although disparities in size are permissible according to some aspects of the present invention. Furthermore, it is preferred that the first and second sections 642 and 644 of the sleeve 620 also present at least substantially equal outer diameters. Again, however, deviations are permissible according to some aspects of the present invention.

Turning again to the relationship of the sleeve 620 to the shaft 534, the smooth inner surface 634 of the sleeve 620 preferably engages both the substantially variable outer surface 628 defined by the teeth 626 and the smooth outer surface 624 defined by the middle region 622.

Preferably, the sealing sleeve 620 is hot-dropped into position on the motor shaft 534 (e.g., heated so as to expand enough to provide a loose or slip fit over the motor shaft 534, then actively or passively cooled so as to shrink into a tight and secure fit about the motor shaft 534). As will be apparent to one of ordinary skill in the art, the sealing sleeve 620 is thereby fixed to the shaft 534 to rotate therewith.

The outer face of the sealing sleeve 620 is then preferably ground to define the sleeve outer surface 636. Such grinding methodology is preferably precise enough to present a very smooth outer surface 636 having a desired diameter to relatively strict tolerance.

The first section 642 of the sleeve 620 preferably presents an outer seal-engaging portion 636a of the outer surface 636. The first and second sections 642 and 644 of the sleeve 620 preferably cooperatively present an outer bearing-engaging portion 636b of the outer surface 636. Although it is permissible according to some aspects of the present invention for the seal-engaging and bearing-engaging portions of the outer surface to be alternatively defined, it is most preferable for reasons that will be discussed in greater detail below for the first section of the sleeve to at least in part define both the seal-engaging and bearing-engaging portions of the outer surface.

The second motor shaft bearing 595b preferably at least partly circumscribes and engages the sleeve outer surface 636, as does a seal 646 that prevents transfer of contaminants between the gear chamber 559 and the motor chamber 538. More particularly, the bearing 595b preferably engages the bearing-engaging portion 636b of the outer surface 636, while the seal 646 preferably engages the seal-engaging portion 636a of the outer surface 636.

More particularly, the seal 646 preferably at least partly circumscribes the engagement region 588 of the shaft 534 and the first section 642 of the sleeve 620 (said sleeve 620 being disposed radially between the shaft 534 and the seal 646) to sealingly engage the seal-engaging portion 636a.

Similarly, the bearing 595b preferably at least partly circumscribes the engagement region 588 of the shaft 534 and the first section 642 of the sleeve 620 (said sleeve 620 being disposed radially between the shaft 534 and the bearing 595b) to sealingly engage the bearing-engaging portion 636b.

In greater detail still, the seal 646 most preferably circumscribes the primary portion 629 of the engagement region 588. The bearing 595b most preferably circumscribes both the middle region 622 and the transition portion 630 (and perhaps but not necessarily part of the primary portion 629) of the engagement region 588. The first section 642 of the sleeve 620 most preferably circumscribes and engages both the transition portion 630 and part of the primary portion 629 of the engagement region 588. The second section 644 of the sleeve 620 most preferably circumscribes and engages the middle region 622. The sleeve 620 is disposed between and engages each of the seal 646 and the primary portion 629. Furthermore, the sleeve 620 is disposed between and engages each of the bearing 595b and both the transition portion 630 and middle region 622.

Preferably, the seal 646 is disposed adjacent the first end margin 638. The bearing 595b is preferably disposed adjacent the second end margin 640. It is permissible according to some aspects of the present invention, however, for either or both of the seal and the bearing to be axially spaced from the end margins in a significant manner.

Although the above-described fitting and grinding process is preferred, it is noted that other assembly and/or preparation methods may apply to the sleeve without departing from the scope of some aspects of the present invention. Provision of a smooth sealing surface having an outer diameter within predetermined tolerances is critical, however, to the effectiveness of the seal. A smooth surface also leads to improved seating of the associated bearing.

Provision of the sealing sleeve 620 is highly advantageous, enabling the seal 646 to be effectively implemented in a smaller axial space than would otherwise be required (e.g., if the motor shaft were to be extended to enable the seal to be positioned against the smooth outer surface of the middle region). That is, the relatively soft seal 646 cannot be positioned effectively directly against the engagement region 588 due to its relatively hard, discontinuous outer surface 628, which could cut or otherwise damage the seal 646, and by merit of the difficulty in a more general sense in forming a seal with such a discontinuous or variable surface. However, the seal 646 can be positioned effectively relative to the relatively hard but precisely ground, smooth sleeve outer surface 636. This is particularly important due to the restrictive space requirements associated with the locomotion motor 510, especially in the axial direction.

Positioning of the bearing 595b as described in detail above is also advantages for similar space-related reasons.

In a preferred method of assembly, the sleeve 620 is positioned on the shaft 534 as described above. The bearing 595b the seal 646 are then assembled onto the sleeve 620, with a chamfer 638a at the first end margin 638 facilitating such assembly.

Preferably, as will be readily apparent to one of ordinary skill in the art and as briefly alluded to above, the sleeve 620 comprises a material well suited to resist abrasion, cutting, or other forms of damage potentially inflicted by the teeth 626. Furthermore, such material is preferably harder than that of the seal 646. Most preferably, the sleeve 620 comprises steel, while the seal 646 comprises a synthetic resin. Other materials may be used without departing from the scope of some aspects of the present invention, however.

As noted above, the motor 510 includes the gearbox assembly 516 and the conduit box 518. The conduit box 518 includes the body 562 and the lid 564. The gearbox housing 558 includes the inner portion 580 and the outer portion 582. The motor 510 further includes the first and second endshields 542 and 544, respectively. The second endshield 544, the lid 564, and the inner portion 580 are preferably jointly formed. That is, the motor 510 preferably includes an intermediate plate 648 comprising (and most preferably integrally forming) the second endshield 544, the lid 564, and the inner portion 580, such that the intermediate plate 648 in part defines each of the motor chamber 538 and the gear chamber 559.

Furthermore, the intermediate plate 648 (and, most preferably, the second endshield 544) defines seal and bearing housings 650 and 652, respectively, for receiving and supporting respective ones of the seal 646 and the bearing 595b.

Preferably, the seal 646 presents a radially innermost seal surface 646a and a radially outermost seal surface 646b. The bearing 595b preferably presents a radially innermost bearing surface 595b' and a radially outermost bearing surface 595b". The radially innermost seal surface 646a and the radially innermost bearing surface 595b' preferably engage the sleeve 620, while the radially outermost seal surface 646a and the radially outermost bearing surface 595b" preferably engage respective ones of seal and bearing housings 650 and 652.

Turntable Motor

A preferred embodiment of the turntable motor 710 is shown in detail in FIGS. 45-50. It is initially noted that, with certain exceptions to be discussed in detail below, many of the elements of the turntable motor 710 are the same as or very similar to those described in detail above in relation to the lift motor 110 and/or the locomotion motor 510. Therefore, for the sake of brevity and clarity, redundant descriptions and numbering will be generally avoided here. Unless otherwise specified, the detailed descriptions of the elements presented above with respect to the lift motor 110 and/or the locomotion motor 510 should therefore be understood to apply at least generally to the turntable motor 710, as well.

In some cases, features described below with respect to the turntable motor 710 may also be applicable to the lift motor 110 and/or the locomotion motor 510, described in detail above.

As noted previously, a preferred embodiment of the turntable motor 710 is shown in detail in FIGS. 45-50. Among other things, the turntable motor 710 preferably includes a rotor 712 rotatable about an axis, a stator 714, a gearbox assembly 716, and a conduit box 718.

The turntable motor 710 is preferably oriented such that the axis is a vertical axis. The rotor 712 and stator 714 are preferably positioned at an axially downward end of the turntable motor 710, while the gearbox assembly 716 is positioned at an axially upward end of the turntable motor 710. It is permissible according to some aspects of the present invention, however, for the turntable motor to be alternatively oriented. That is, unless otherwise specified or made clear, the directional references made herein with regard to the turntable motor 710 (e.g., top, bottom, upper, lower, etc.) are used solely for the sake of convenience and should be understood only in relation to each other. For instance, a component might in practice be oriented such that components referred to as "top" and "bottom" are sideways, angled, inverted, etc. relative to the chosen frame of reference.

As will be discussed in greater detail below, the gearbox assembly 716 preferably engages the platform 14 such that the turntable motor 710 causes rotation of the platform 14.

The turntable motor 710 preferably includes a motor shell 720 at least substantially circumscribing the stator 714. The motor shell 720 preferably in part defines a motor chamber 722 that at least substantially receives the stator 714 and the rotor 712. Preferably, the shell 720 is cylindrical in form, although other shapes (e.g., polygonal) are permissible according to some aspects of the present invention.

In a preferred embodiment, the turntable motor 710 includes an upper endshield 724 that at least substantially encloses one end of the motor chamber 722 and a lower endshield 726 that at least substantially encloses the other end of the motor chamber 722. That is, the motor shell 720, the upper endshield 724, and the lower endshield 726 preferably cooperatively define the motor chamber 722.

The gearbox assembly 716 is preferably secured to the upper endshield 724. The conduit box 718 is preferably secured to the lower endshield 726.

The turntable motor 710 preferably includes a pair of upper and lower motor shaft bearings 728 and 730 supporting the rotor 712. More particularly, the rotor 712 preferably includes a motor shaft 732 that is rotatably supported by the upper and lower motor shaft bearings 728 and 730.

The endshields 724 and 726 preferably include respective motor shaft bearing housings 734 and 736 that support the upper and lower motor shaft bearings 728 and 730, respectively. A bearing lock 738, at least substantially similar to the bearing lock 174 of the lift motor 110, is also preferably provided to secure the upper motor shaft bearing 728.

Unitary Conduit Box

In a preferred embodiment, the conduit box 718 houses a motor encoder 740. In a preferred embodiment, the encoder 740 senses the position and speed of the rotor 712. The conduit box 718 further preferably covers a free end or encoder end 742 of the motor shaft 732. Yet further, the conduit box 718 preferably defines a pair of apertures 744 and 746 in communication with connectors 748 and 750.

The conduit box 718 preferably broadly includes a conduit box body 752. The body 752 is preferably integrally formed and includes a top wall 754 and a plurality of side walls 756. That is, in contrast to the lift motor 110, for instance, a discrete cover is not provided.

The conduit box 718 further preferably includes a base wall 758. Preferably, the base wall 758 is integrally formed with the lower endshield 726. It is permissible according to some aspects of the present invention, however, for nonintegral configurations to be utilized.

The side walls 756 are preferably secured to the base wall 758 by means of conduit box fasteners 760, such that the side walls 756 extend between and interconnect the base wall 758 and the top wall 754. The conduit box fasteners 760 are preferably bolts, as illustrated, but may be alternatively configured (e.g., as screws, pins, latches, etc.) and/or may cooperate with other fixation means, such as latches or adhesives.

The apertures 744 and 746 are preferably formed through one of the side walls 756, with the connectors 748 and 750 therefore preferably secured to the selected one of the side walls 756.

The base wall 758 preferably includes a pedestal 762 on which the encoder 740 is secured using encoder fasteners 764. More particularly, the encoder fasteners 764 extend through corresponding elongated slots 766 formed on the encoder 740 and into the pedestal 762.

Preferably, an encoder hub 768 is formed in the encoder 740. The encoder 740 is mounted on the pedestal 762 in such a manner that the motor shaft 732 extends through the encoder hub 768 (such engagement not shown explicitly but readily apparent in FIG. 48).

An access opening 770 is preferably formed through the base wall 758 to enable access to the motor chamber 722. Furthermore, routing of wiring (not shown) through the access opening 770 (e.g., from the motor chamber 722 to the conduit box 718) is also enabled. Thus, in addition to housing the encoder 740, the conduit box 718 protects the wiring from moisture and/or other contaminants.

Wiring (not shown) that passes through the access opening 770 (or additional wiring connected to the wiring that passes through the access opening) is further preferably routed through the apertures 744 and 746 and the connectors 748 and 750 to enable the turntable motor 710 to be connected to an external device. For instance, in a preferred embodiment, the connectors 748 and 750 are associated with power and with sensors and controls.

The connectors 748 and 750 may be integrally formed with the conduit box 718 or discrete components secured by self-provided features such as threads and/or by discrete components or materials such as fasteners, welds, adhesives, latches, etc.

In a preferred embodiment, the body 752 of the conduit box 718, as well as the base wall 758 (and, more broadly, the entire conduit box 718 and lower endshield 726) comprises aluminum. Thus, direct engagement between the conduit box 718 and the lower endshield 726 is possible without increasing electromagnetic interference (EMI). That is, in a manner similar to that discussed above with respect to the conduit box 152 of the lift motor 110, reduced EMI enabled by the aluminum lower endshield 726 and conduit box body 752 leads to decreased or eliminated interference with both operation of the encoder 740 and operation of the robot 10 itself.

The body 752 of the conduit box 718 is secured to the base wall 758, as noted previously, by the conduit box fasteners 760. Furthermore, a gasket 772 is preferably provided to seal the interface between the body 752 and the base wall 758. The gasket 772 is preferably operable to prevent or at least substantially restrict ingress of contaminants into the conduit box 718.

The gasket 772 is preferably a regular elastomeric gasket. That is, it is not necessary, by merit of the preferred aluminum composition of the lower endshield 726 and the conduit box 718, for a more expensive EMI gasket (e.g., one comprising rubber with embedded aluminum particles) to be provided.

In a preferred embodiment, the base wall 758 defines a generally perimetrically extending groove 774 that substantially receives the gasket 772 so as to enable direct engagement of the base wall 758 and the body 752 upon compression of the gasket 772 (e.g., due to tightening of the conduit box fasteners 760). Other arrangements enabling formation of an appropriate seal will be apparent to those of ordinary skill in the art, however.

Although an aluminum lower endshield 726 and conduit box 718 are preferred, it is noted that any suitable non-magnetically conductive material may be used without departing from the scope of some aspects of the present invention.

As noted previously, in a preferred embodiment, the base wall 758 is an integrally formed part of the lower endshield 726. More particularly, the base wall 758 and the remainder of the lower endshield 726 are preferably formed of a single cast structure. Furthermore, the body 752 of the conduit box 718 is preferably a unitary cast structure. Thus, in keeping with the above-described material preferences, it is therefore most preferable that the base wall 758 and the remainder of the lower endshield 726 are a first unitary cast aluminum structure, while the body 752 of the conduit box 718 is second unitary cast aluminum structure.

Gearbox Assembly Overview

As noted previously, the turntable motor 710 preferably includes the gearbox assembly 716. The gearbox assembly 716 preferably includes a gearbox housing 776 defining a gear chamber 778 in which a gear train 780 is substantially located.

Gearbox Housing

The gearbox housing 776 preferably includes an upper portion 782, a lower portion 784, and upper and lower mid-portions 786 and 788, respectively positioned between the upper and lower portions 782 and 784.

In a preferred embodiment, each portion 782, 784, 786, 788 of the gearbox housing 776 is an aluminum casting. However, it is permissible according to some aspects of the present invention for alternative materials or formation techniques to be used. The gearbox housing 776 could be in whole or in part machined, for instance, or formed of a different material.

It is also permissible according to some aspects of the present invention for the gearbox housing to be formed of a single piece or to include more or fewer portions than the four (4) preferred portions described above.

In a preferred embodiment, the lower portion 784 of the gearbox housing 776 is integrally formed with the upper endshield 724. More particularly, the lower portion 784 and the upper endshield 724 are preferably formed of a single cast aluminum structure. It is permissible according to some aspects of the present invention, however, for the lower portion and upper endshield to be discrete components connected to each other by means of fasteners, welds, adhesives, latches, or other means known in the art. Yet further, it is within the ambit of some aspects of the present invention for the endshield and lower portion to be non-interconnected or only indirectly connected. Further still, alternative materials or formation techniques may be used.

The lower mid-portion 788 and the upper mid-portion 786 are preferably each formed of separate, single cast aluminum structures. As noted above with respect to the lower portion 784 and the upper endshield 724, however, alternative materials or formation techniques may be used. It is also permissible according to some aspects of the present invention for the upper- and lower-mid portions to be integrally formed with each other.

Similarly, the upper portion 782 of the gearbox housing 776 is preferably a single, cast aluminum structure. Alternative materials or formation techniques may be used, however.

Preferably, the upper portion 782 of the gearbox housing 776 includes a plurality of mounting bosses 790 to enable mounting of the turntable motor 710 to the platform 14. Other mounting means fall within the scope of the present invention, however.

Gear Train

As noted previously, the gearbox assembly 716 preferably includes the gear train 780, which is housed in the gearbox housing 776. The gear train 780 preferably transfers rotation of the motor shaft 732 to an output shaft 792 and, in turn, to the platform 14.

Figure 49:
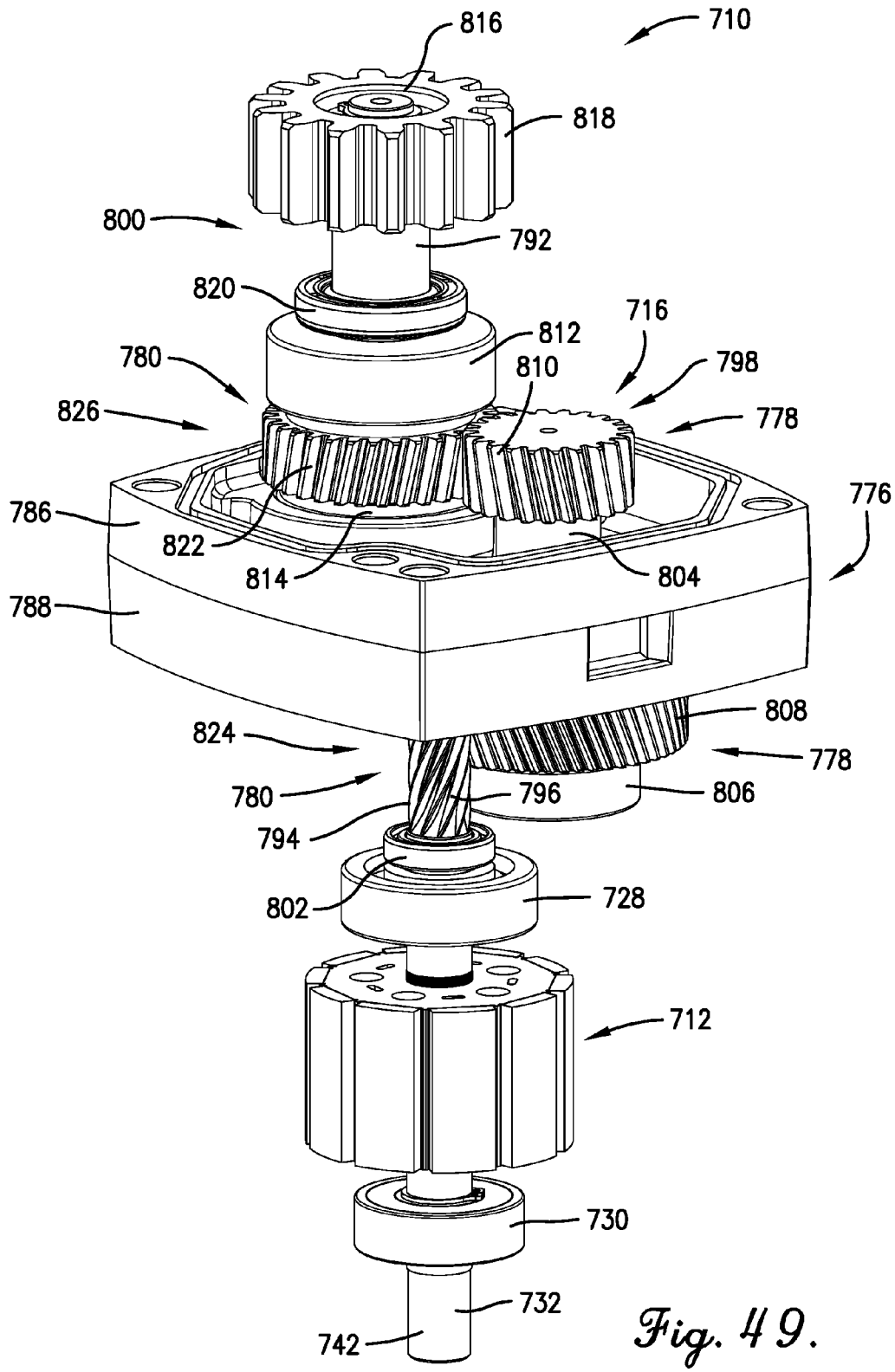
FIG. 49 is a top perspective view of a portion of the turntable motor of FIGS. 2, 45, and others, particularly illustrating the gearbox housing and the gear train.
Figure 50:
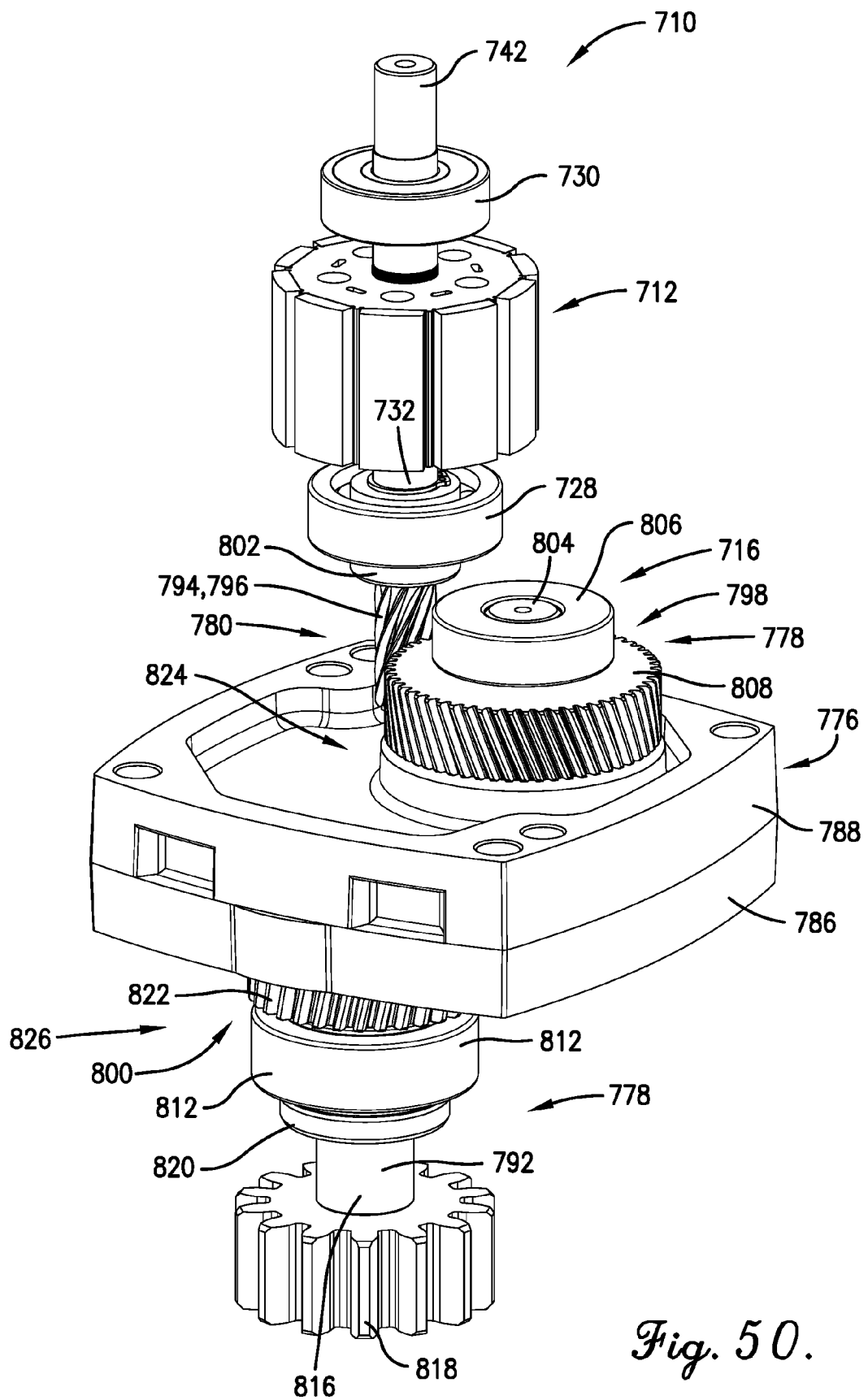
FIG. 50 is a top perspective view of a portion of the turntable motor of FIGS. 2, 45, and others, particularly illustrating the gearbox housing and the gear train.
Figure 51:
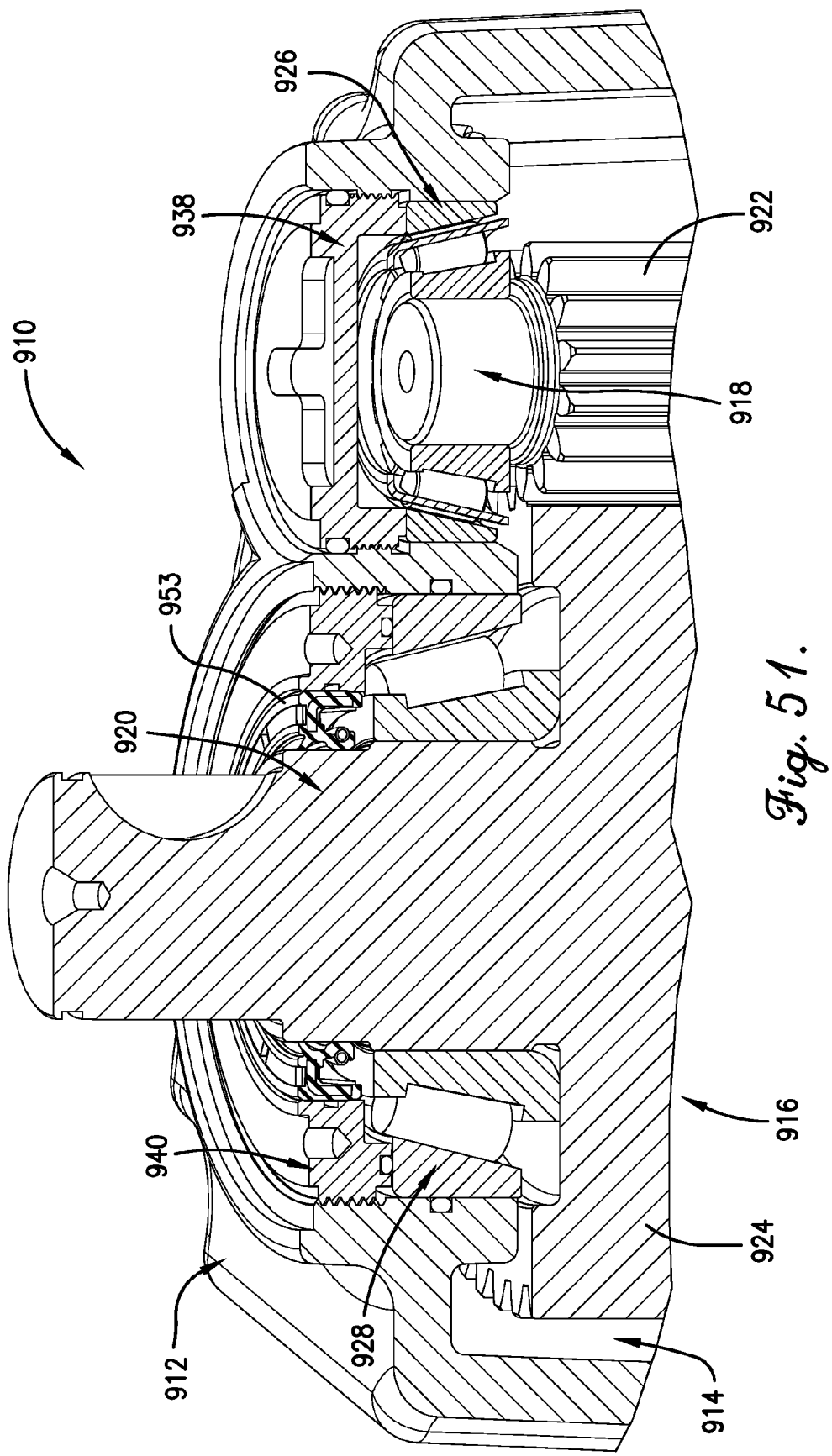
FIG. 51 is a cross-sectional top perspective view of a portion of a turntable motor in accordance with a second preferred embodiment, particularly illustrating the mechanical sealing of the gear chamber.
Figure 52:
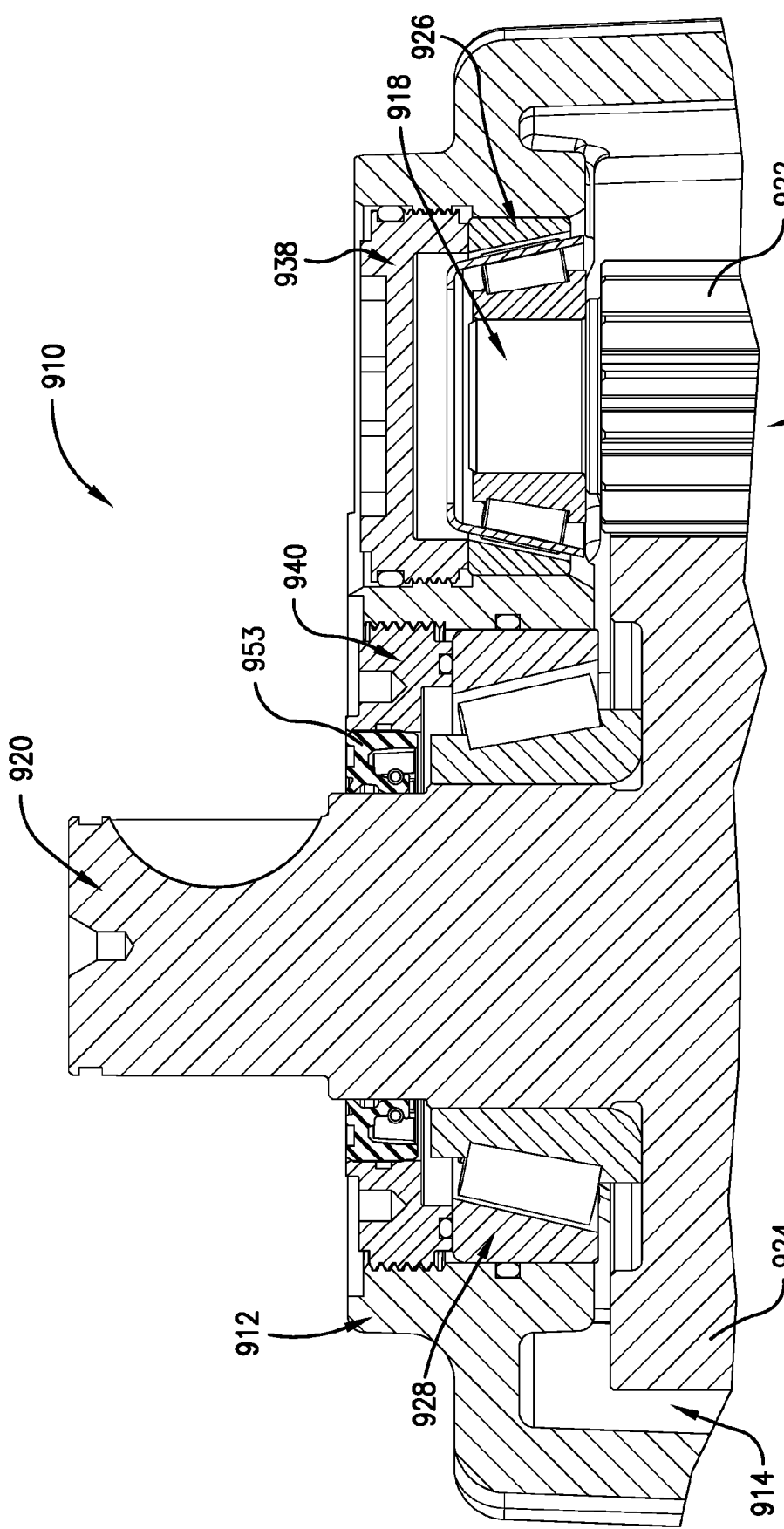
FIG. 52 is a cross-sectional side view of the portion of the turntable motor shown in FIG. 51.
Figure 52A:
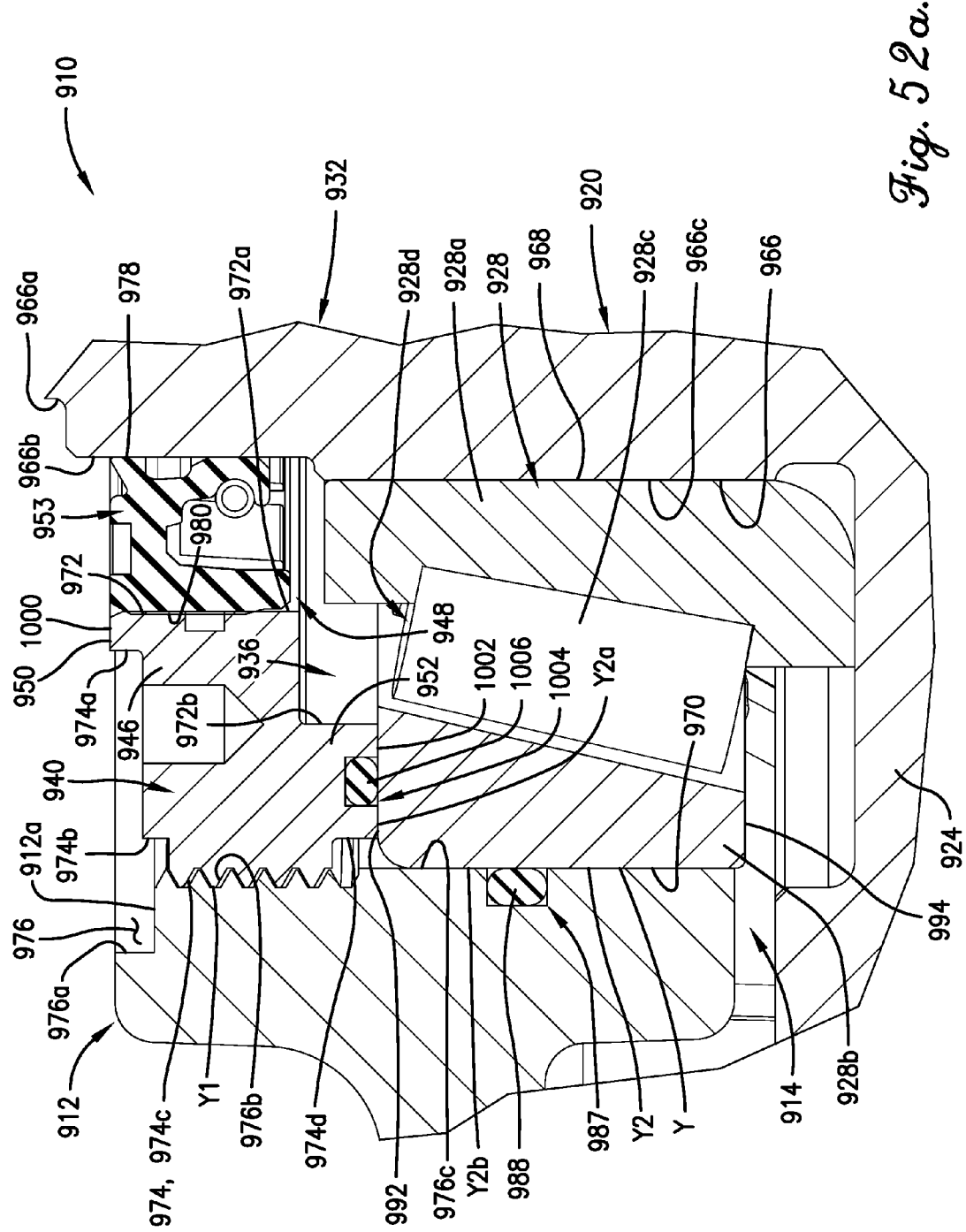
FIG. 52a is a greatly enlarged cross-sectional view of a portion of the turntable motor portion shown in FIG. 52, particularly illustrating the mechanical seals associated with the output shaft.
Figure 53:
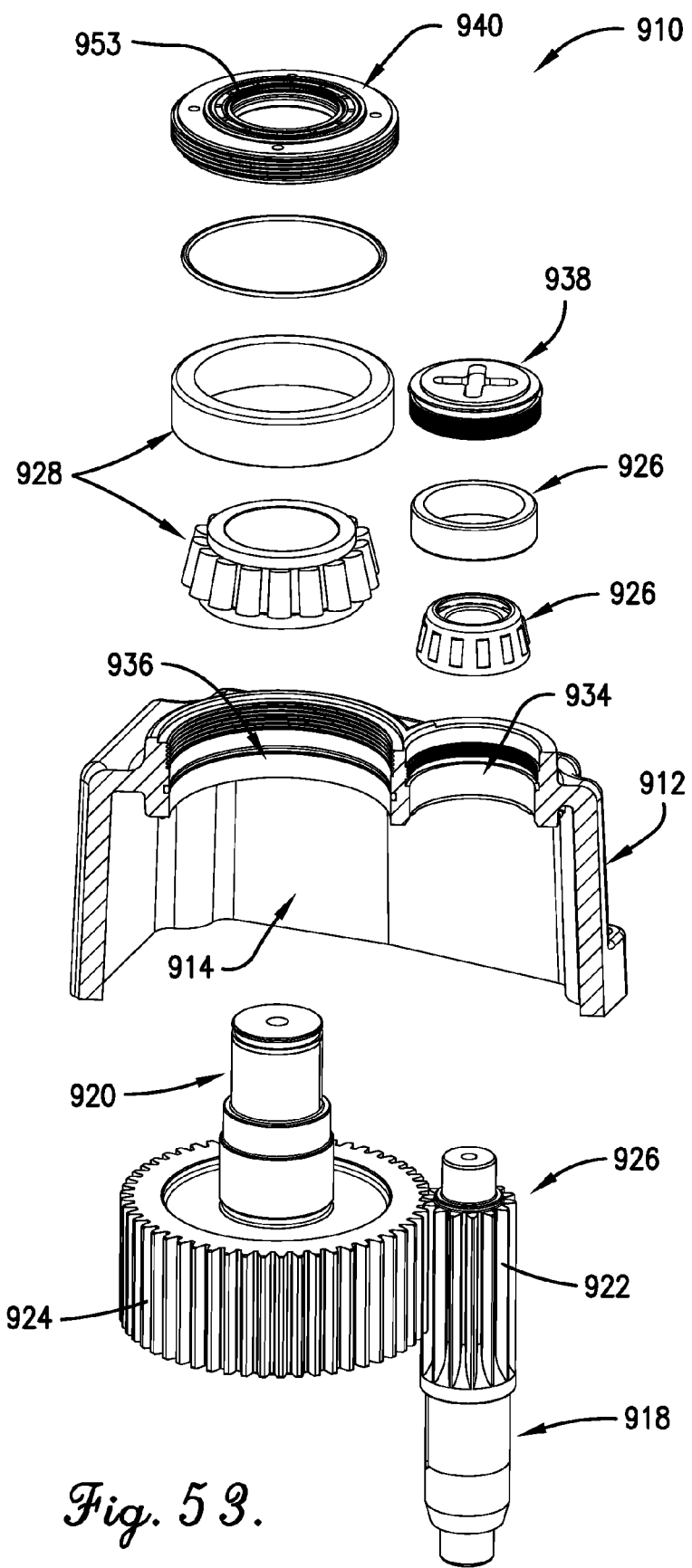
FIG. 53 is an exploded top perspective view of the portion of the turntable motor shown in FIGS. 51 and 52.
Figure 54:
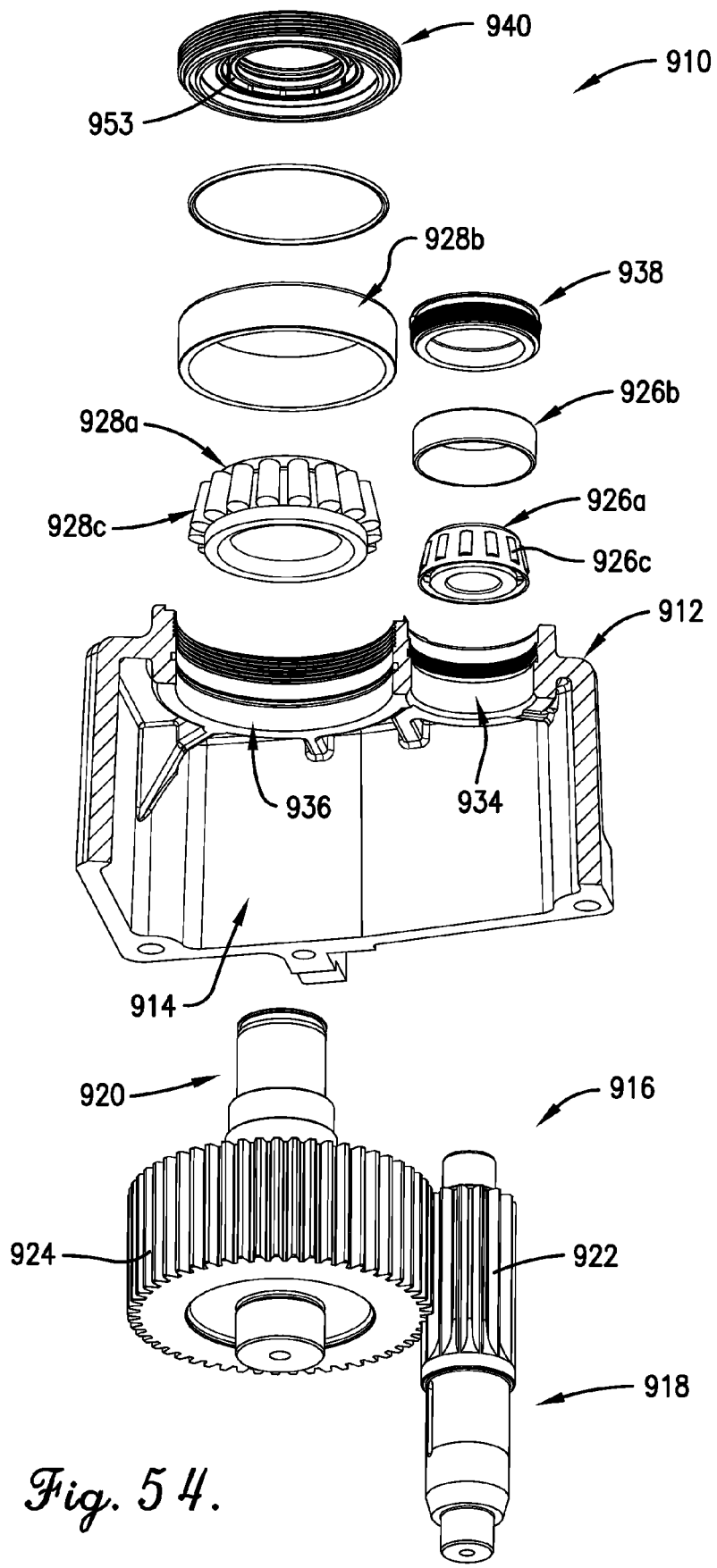
FIG. 54 is an exploded bottom perspective view of the portion of the turntable motor shown in FIGS. 51-53.

More particularly, in a preferred embodiment and as best shown in FIGS. 49 and 50, the motor shaft 732 includes the aforementioned encoder end 742 and a gear train end 794. The gear train end 794 comprises a pinion gear 796 that engages an intermediate gear assembly 798. In turn, the intermediate gear assembly 798 engages an output gear assembly 800.

As noted previously, the motor shaft 732 is rotatably supported on a pair of upper and lower motor shaft bearings 728 and 730. Furthermore, as shown in FIG. 49, a seal 802 is preferably provided above the upper motor shaft bearing 728 to prevent ingress of contaminants such as oil from the gear chamber 778 into the motor chamber 722.

The seal 802 is preferably formed directly about the motor shaft 732. However, it is permissible according to some aspects of the present invention for a sleeve similar to the sealing sleeve 620 of the locomotion motor 510 to be provided (particularly if a reduced overall axial length of the gearbox assembly is desired).

The intermediate gear assembly 798 comprises an intermediate shaft 804 rotatably supported on an upper intermediate bearing (not shown) and a lower intermediate bearing 806. The intermediate gear assembly 798 further includes a first intermediate gear 808 and a second intermediate gear 810. The pinion gear 796 engages the first intermediate gear 808 such that rotation of the motor shaft 732 drives rotation of the intermediate shaft 804 and intermediate gears 808 and 810. The first intermediate gear 808 is preferably larger in diameter and comprises more teeth than the second intermediate gear 810, although such relationships are not essential to some aspects of the present invention.

The output gear assembly 800 preferably comprises the previously mentioned output shaft 792, which is preferably rotatably supported on upper and lower output bearings 812 and 814. The output shaft includes a hub end 816. A toothed hub 818 for engaging the platform 14 is mounted to the hub end 816 so as to rotate therewith.

Preferably, a seal 820 is provided between the upper output bearing 812 and the toothed hub 818 to prevent ingress of contaminants into the gear chamber 778 and egress or leakage of lubricants (e.g., oil) out of the gear chamber 778.

The output gear assembly 800 further includes an output gear 822. The second intermediate gear 810 preferably engages the output gear 822 such that rotation of the motor shaft 732 and, in turn, of the intermediate shaft 804 and intermediate gears 808 and 810, drives rotation of the output shaft 792 and the output gear 822. Thus, rotation of the motor shaft 732 drives rotation of the platform 14.

As will be readily apparent from the description above, the gear train 780 is preferably a two-stage (2-stage) system. More particularly, the gear train 780 includes a first stage 824 comprising the pinion gear 796 and the first intermediate gear 808. The gear train 780 further includes a second stage 826 comprising the second intermediate gear 810 and the output gear 822. However, while the illustrated number of stages and associated gear ratios are preferred to appropriately modify rotational speed and torque (e.g., to decrease speed and increase torque), various individual-stage gear ratios and/or overall gear ratios are permissible without departing from the scope of the present invention, however.

Preferably, the motor shaft 732, the intermediate shaft 804, and the output shaft 792 are each arranged in parallel to each other, such that the gear train 780 is a parallel-shaft gear train. Non-parallel arrangements or partially parallel arrangements fall within the scope of some aspects of the present invention, however.

Furthermore, although preferred bearing types are illustrated, other bearing types (e.g., ball, roller, needle etc.) and/or arrangements (e.g., different positioning) are permissible without departing from the ambit of the present invention.

Mechanical Seal Having Threaded Bearing Retainer

Components Overview

A second preferred turntable motor is illustrated in FIGS. 51-54. It is initially noted that, with certain exceptions to be discussed in detail below, many of the elements of the turntable motor 910 of the second embodiment are the same as or very similar to those described in detail above in relation to the turntable motor 710 of the first embodiment. Therefore, for the sake of brevity and clarity, redundant descriptions and numbering will be generally avoided here. Unless otherwise specified, the detailed descriptions of the elements presented above with respect to the first embodiment should therefore be understood to apply at least generally to the second embodiment, as well.

Similarly to the turntable motor 710 of the first preferred embodiment, the turntable motor 910 of the second preferred embodiment preferably includes a housing 912 defining a gear chamber 914. The turntable motor 910 also preferably includes a gear train 916. The gear train 916 preferably includes an input or motor shaft (not shown) that rotatably engages an intermediate shaft 918. The intermediate shaft 918, in turn, preferably rotatably engages an output shaft 920. More particularly, interengaging gears are associated with each of the shafts. For instance, as illustrated, an intermediate gear 922 integrally formed with the intermediate shaft 918 preferably directly rotatably engages an output gear 924 integrally formed with the output shaft 920.

The intermediate shaft 918 is preferably circumscribed and rotatably supported by an intermediate shaft bearing 926. The output shaft 920 is preferably circumscribed and rotatably supported by an output shaft bearing 928. Each of the bearings 926 and 928 preferably includes a respective inner circumferential component 926a or 928a engaging the respective shaft 918 or 920; a respective outer circumferential component 926b or 928b at least substantially circumscribing the respective inner circumferential component 926a or 928a; and a respective plurality of rolling elements 926c and 928c disposed between respective pairs of the inner and outer components 926a,b and 928a,b.

Preferably, the bearings 926 and 928 are tapered roller bearings, with the inner components 926a and 928a thereby being cones, the outer components 926b and 928b being cups, and the rolling elements 926c and 928c being cylindrical rollers. Alternate bearing types are permissible according to some aspects of the present invention, however. For instances, ball bearings and/or bushings might be used. Most preferably, however, the selected supports are well suited to applications requiring axial loading thereof.

It is particularly noted that the bearings 926 and 928 as illustrated are unsealed. In a preferred embodiment, the gear chamber 914 contains a lubricant (e.g., grease) that facilitates smooth operation of the gear train 916. Such lubricant may, in some circumstances, traverse or at least enter into a respective interior 926d or 928d of either or both of the bearings 926 and 928. Means of controlling the movement of such grease and, more particularly, preventing its leakage from the gear chamber 914, are discussed in greater detail below.

Preferably, the intermediate shaft 918 includes an upper end 930. The intermediate shaft bearing 926 is preferably press-fit onto the upper end 920. Similarly, the output shaft 920 includes an upper end 932. The output shaft bearing 928 is preferably press-fit onto the upper end 932. Other fit types and/or assembly methods are permissible according to some aspects of the present invention, however.

The gearbox housing 912 preferably defines an intermediate well 934 and an output well 936. The intermediate bearing 926 is preferably received within the intermediate well 934 so as to be disposed between the housing 912 and the intermediate shaft 918. The output bearing 928 is preferably received within the output well 936 so as to be disposed between the housing 912 and the output shaft 920.

Preferably, the intermediate and output bearings 926 and 928 are fixed within the respective wells 934 and 936 by means of fit ranging from an interference fit to a slight slip fit within the tolerances. Thus, a friction- or contact-based seal therebetween may or may not be present. Other fit types and/or assembly methods are permissible according to some aspects of the present invention, however.

In a preferred embodiment, the motor 910 includes an intermediate retaining member 938 and an output retaining member 940. In the illustrated embodiment, the retaining members 938 and 940 each preferably act as bearing retainers to restrict axially upward shifting (i.e., shifting in the direction of the shaft ends 930 and 932) of corresponding ones of the intermediate and output bearings 926 and 928. It is noted, however, that in a broad sense, a bearing retainer may be used both to seat a bearing (i.e., to restrict its shifting) and to decrease or at least substantially eliminate endplay or tolerance stack-up associated with a gear train. Such functionality is described in U.S. Patent Application Publication No. 2016/0160997, published Jun. 9, 2016, and entitled SHIMLESS GEAR TRANSMISSION, the entire disclosure of which is hereby incorporated by reference herein. As will be discussed in greater detail below, features of present invention are particularly advantageous when associated with the torque loading procedures described in the '997 publication.

The intermediate retaining member 938 preferably is generally cup-like in form, presenting a disc-like top 942 and a rim 944 extending generally axially downwardly from the top 942. The top 942 preferably at least substantially encloses the intermediate well 934, such that the intermediate shaft end 930 is enclosed in the intermediate well 934.

In contrast, the output retaining member 940 is generally ring-like or annular in form. More particularly, the output retaining member 940 preferably includes a generally radially extending, disc-like top 946 defining a central opening 948 therethrough. A lip 950 preferably extends generally axially upwardly from the top 946 to further define the opening 948, and a rim 952 preferably extends generally axially downwardly from the top 946. The end 932 of the output shaft 920 preferably extends from the gear chamber 914, through the opening 948, and to an exterior of the motor housing 912.

The motor 910 further preferably includes an external seal 953 that circumscribes and sealingly engages the upper end 932 of the output shaft 920. The top 946 and the lip 950 of the output retaining member 940 in turn preferably circumscribe the external seal 953, with the external seal 953 thereby also forming a seal with the output retaining member 940. That is, the external seal 953 forms seals with both the output shaft 920 and the output retaining member 940.

Furthermore, although discrete formation is preferred, as illustrated, it is permissible according to some aspects of the present invention for the external seal and the output retaining member to be a pre-assembled unit.

Preferably, the external seal 953 comprises a compressible material suitable for sealing purposes. For instance, in a preferred embodiment, the external seal 953 comprises nitrile, although Viton® and other materials may be used without departing from the scope of the present invention.

The retaining members 938 and 940 preferably comprise steel or an alternative metal or other material having sufficient hardness to function as required.

Faces, Grooves, and Channels

In a preferred embodiment, the end 930 of the intermediate shaft 918 presents a circumferential, radially outermost intermediate shaft face 954.

The intermediate bearing 926 preferably presents circumferential, radially innermost and outermost intermediate bearing faces 956 and 958, respectively. The faces 956 and 958 are preferably generally smooth.

The intermediate retaining member 938 preferably presents circumferential, radially innermost and outermost intermediate retaining member faces 960 and 962, respectively. The outermost intermediate retaining member face 962 preferably includes an axially upper smooth portion 962a defined by the top 946, a threaded portion 962b defined by the rim 944 and disposed below the upper smooth portion 962a, and a lower smooth portion 962c disposed below the threaded portion 962b.

The upper smooth and threaded portions 962a,b are preferably at least substantially aligned (i.e., coplanar), while the lower smooth portion 962c is preferably disposed radially inwardly relative to the portions 962a,b.

The housing 912 preferably presents a circumferential, radially innermost intermediate well face 964. The intermediate well face 964 preferably includes an axially upper, inwardly tapered surface 964a; a generally smooth upper portion 964b below the tapered surface 964b; a threaded portion 964c below the smooth upper portion 964b; a generally smooth intermediate portion 964d below the threaded portion 964c; a generally smooth lower portion 964e below the smooth intermediate portion 964d; and a generally smooth, outwardly angled portion 964f below the smooth lower portion 964e.

The tapered portion 964a preferably extends obliquely outwardly from the smooth upper portion 964b. The smooth upper portion 964b and the smooth intermediate portion 964d are preferably at least substantially aligned (i.e., coplanar). The threaded portion 964c is preferably disposed radially inwardly relative to the portions 964b,c. The smooth lower portion 964e is preferably disposed yet further radially inwardly. The angled portion 964f preferably extends obliquely outwardly from the smooth lower portion 964e.

As will be readily apparent to those of ordinary skill in the art, the intermediate retaining member 938 is thus most preferably in the form of a threaded nut, with the threads of the threaded portion 962b engaging those of the threaded portion 964c of the intermediate well face 964 of the housing 912.

In a preferred embodiment, the end 932 of the output shaft 920 presents a circumferential, radially outermost output shaft face 966. The output shaft face 966 preferably includes a generally smooth upper portion 966a, a generally smooth intermediate portion 966b below the upper portion 966a, and a generally smooth lower portion 966c disposed below the intermediate portion 966b.

Preferably, the upper, intermediate, and lower portions 966a-c define respectively increasing outer diameters so as to be disposed progressively further radially outwardly.

The output bearing 934 preferably presents circumferential, radially innermost and outermost output bearing faces 968 and 970, respectively. The faces 968 and 970 are preferably at least substantially smooth.

The output retaining member 940 preferably presents circumferential, radially innermost and outermost output retaining member faces 972 and 974, respectively. The innermost output retaining member face 972 preferably includes an axially upper smooth portion 972a defined by the top 946 and the lip 50. The face 972 preferably also includes an axially lower smooth portion 972b defined by the rim 952 and disposed below the upper smooth portion 972a.

The lower smooth portion 972b is preferably disposed radially outwardly from the upper smooth portion 972a.

The outermost output retaining member face 974 preferably includes an axially upper smooth portion 974a defined by the lip, an axially intermediate smooth portion 974b defined by the top 946 and disposed below the upper smooth portion 974a, a threaded portion 974c defined by the top 946 and disposed below the intermediate smooth portion 974b, and an axially lower smooth portion 974d defined by the rim 952 and disposed below the threaded portion 974a.

The portions 974a,b,c are preferably disposed progressively more radially outward, while the portion 974d is preferably at least substantially aligned (i.e., coplanar) with the portion 974b.

The housing 912 preferably presents a circumferential, radially innermost output well face 976. The output well face 976 preferably includes a generally smooth upper portion 976a, a threaded portion 976b disposed below the smooth upper portion 976a, and a generally smooth lower portion 976c below the threaded portion 976b.

The upper smooth portion 976a is preferably disposed radially outwardly of the threaded portion 976b and the lower smooth portion 976c, the latter two of which are preferably generally aligned (i.e., coplanar), although the portion 976c is most preferably offset slightly radially inwardly.

As will be readily apparent to those of ordinary skill in the art, the output retaining member 940 is thus most preferably in the form of a threaded nut, with the threads of the threaded portion 974c thereof engaging those of the threaded portion 976b of the output well face 976 of the housing 912.

The external seal 953 preferably presents circumferential, radially innermost and outermost external seal faces 978 and 980, respectively.

In a preferred embodiment, each of the surfaces or faces 954, 956, 958, 960, 962, 964, 966, 968, 970, 972, 974, 976, 978, and 980 is generally axially extending and circumferential, unless otherwise noted above (e.g., the tapered portion 964a and the angled portion 964f). Furthermore, faces or portions thereof that are not indicated as coplanar or generally aligned (e.g., portions that are radially offset relative to an adjacent portion) are preferably interconnected via orthogonally disposed faces (i.e., faces extending generally transversely or radially).

Preferably, as illustrated, a groove 982 is defined in the intermediate smooth portion 962a of the outer intermediate retaining member surface 962, such that a channel 984 is defined between the intermediate retaining member 938 and the housing 112. An intermediate seal 985 is preferably disposed in the channel 984 to form a seal between the intermediate retaining member 938 and the housing 112.

The tapered portion 964a preferably facilitates positioning of the intermediate seal 985 along the upper smooth portion 964b of the inner intermediate well surface 964, which preferably occurs via threading of a preassembled combination of the intermediate seal 985 and the intermediate retaining member 938 into the intermediate well 934.

The intermediate smooth portion 964d of the inner intermediate well surface 964 preferably cooperatives with the threaded and lower smooth portions 962b,c of the outer intermediate bearing surface 962 to define a channel 986. The channel 986 is preferably devoid of a seal, although a seal may be provided without departing from the scope of some aspects of the present invention.

In a preferred embodiment, a groove 987 is defined in the lower smooth portion 976c of the radially innermost output well surface 976. A lower output seal 988 is preferably disposed in the groove 987 to form a seal between the output bearing 928 and the housing 912 via engagement with the outer bearing face 870.

In a preferred embodiment, the intermediate bearing outer component 926b presents axially spaced apart upper and lower faces 990 and 991. The output bearing outer component 928b presents axially spaced apart upper and lower faces 992 and 994.

The intermediate retaining member 938 preferably presents top and bottom faces 996 and 998. The output retaining member 940 preferably presents top and bottom faces 1000 and 1002.

Preferably, the bottom face 998 of the intermediate retaining member 938 engages the upper face 990 of the intermediate bearing 926. Similarly, the bottom face 1002 of the output retaining member 940 preferably engages the upper face 992 of the output bearing 928.

A groove 1004 is preferably defined in bottom face 1002 of the output retaining member 940. An upper output seal 1006 is preferably disposed in the groove 1004 to form a seal between the output bearing 928 and the output retaining member 940 via engagement with the upper bearing face 992.

Furthermore, as will be apparent based on the above description, the output shaft 920 preferably extends beyond the top face 1000 (i.e., beyond an upper axial margin) of the output retaining member 940.

Preferably, each of the seals 985, 988, and 1006 is in the form of a toroidal gasket. Yet further, each seal 985, 988, and 1006 comprises nitrile, although Viton® and other materials may be used without departing from the scope of the present invention.

Interfaces and Sealing Thereof

In a preferred embodiment, an extensive, fluidly continuous intermediate interface X is cooperatively defined by the housing 912, the intermediate bearing 926, and the intermediate retaining member 938. The interface X preferably extends between and interconnects the gear chamber 914 with an exterior of the motor 910, as demarcated by an axially outermost housing surface 912a. As will be elucidated below, the motor 910 is configured to restrict lubricant escaping the gear chamber 914 via the interface X. Thus, it is convenient to define an upstream direction as toward the gear chamber 914 and a downstream direction as toward to the exterior.

Preferably, the interface X includes a smooth downstream portion X1 cooperatively defined by the smooth portions 962a and 964b, an intermediate threaded portion X2 cooperatively defined by the threaded portions 962b and 964c, and an additional upstream portion X3 fluidly interconnected to the downstream and intermediate portions X1 and X2. The upstream portion X3 preferably includes a pair of orthogonally disposed, generally smooth branches X3a and X3b.

The branch X3a preferably extends generally radially (i.e., orthogonally to the generally aligned or coplanar downstream and intermediate portions X1 and X2) and is cooperatively defined by the bottom face 998 of the intermediate retaining member 938 and the upper face 990 of the intermediate bearing 926. The branch X3b, in contrast, preferably extends generally axially, generally in alignment and coplanarity with the downstream portion X1 and the intermediate portion X2, although most preferably offset slightly radially inwardly. The branch X3b is preferably cooperatively defined by the outermost intermediate bearing face 958 and the smooth lower portion 964e of the intermediate well face 964.

In a preferred embodiment, as illustrated, the intermediate output seal 985 is disposed along the downstream portion X1 to prevent leakage of lubricant therethrough. Thus, the seal 985 at least substantially prevents or restricts leakage of lubricant that has navigated past the threaded intermediate portion X2 from escaping past the downstream portion X1 to the environment. Such an arrangement is highly advantageous, eliminating or minimizing leakage to the environment via the threaded intermediate portion X2 that might otherwise occur.

It is noted that the branches X3a and X3b are preferably devoid of seals. However, it is permissible according to some aspects of the present invention for seals to be provided on either or both branches, such that flow of lubricant is restricted upstream of the threaded portion X2.

In a preferred embodiment, an extensive, fluidly continuous output interface Y is cooperatively defined by the housing 912, the output bearing 928, and the output retaining member 940. The interface Y preferably extends between and interconnects the gear chamber 914 with an exterior of the motor 910, as demarcated by the axially outermost housing surface 912a. As will be elucidated below, the motor 910 is also configured to restrict lubricant escaping the gear chamber 914 via the interface Y. An upstream direction is again defined as toward the gear chamber 914, and a downstream direction is again defined as toward to the exterior.

Preferably, the interface Y includes a threaded downstream portion Y1 cooperatively defined by the threaded portions 974c and 976b, each of which extends directly from the axially outermost housing surface 912a, and an additional upstream portion Y2 fluidly interconnected to the downstream portion Y1. The upstream portion Y2 preferably includes a pair of orthogonally disposed, generally smooth branches Y2a and Y2b.

The branch Y2a preferably extends generally radially (i.e., orthogonally to downstream portion Y1) and is cooperatively defined by the bottom face 1002 of the output retaining member 940 and the upper face 992 of the output bearing 928. The branch Y2b, in contrast, preferably extends generally axially, generally in alignment and coplanarity with the downstream portion Y1, although most preferably offset slightly radially inwardly. The branch Y2b is preferably cooperatively defined by the outermost output bearing face 970 and the smooth lower portion 976c of the output well face 976.

In a preferred embodiment, as illustrated, the lower output seal 988 is disposed along the branch Y2b to prevent leakage of lubricant therethrough. The upper output seal 1006 is disposed along the branch Y2a to prevent leakage of lubricant therethrough. Thus, the seals 988 and 1006 cooperatively at least substantially prevent or restrict leakage of lubricant to the downstream portion Y1. Such an arrangement is highly advantageous, eliminating or minimizing leakage through the threaded downstream portion Y1 that might otherwise occur. That is, the seals 998 and 1006 preferably prevent lubricant from reaching the threaded downstream portion Y1 and, in turn, potentially navigating therethrough to the environment.

It is particularly noted that, while the threaded portions X2 and Y1 inherently provide some degree of sealing or restriction against lubricant leakage due to their labyrinthine or tortuous nature, the provision of additional seals enables a more reliable mechanical seal to be formed.

Furthermore, additional restriction of lubricant leakage may be provided by use of a higher viscosity lubricant or grease within the bearings 926 and 928 than is used in the gear chamber 914 more generally. That is, the higher viscosity grease, upon tight packing into the bearings 926 and 928, effectively forms a seal against leakage of the lower viscosity grease through the bearing interiors 926d and 928d and toward the branches X3a and Y2a, respectively.

It is particularly noted that the placement of the seals 985, 988, and 1006 is such that torque feedback associated with tightening and/or loosening of the retaining members 938 and 940 is at least substantially unaffected. Such feature is highly advantageous, allowing reliable sealing without undue influence on preferred assembly methodology. For instance, the seals 985, 988, and 1006 do not affect the torque feedback critical to an axial set procedure. More particularly, in a similar manner to that discussed in detail in the previously mentioned '997 publication, the retaining members 938 and 940 preferably function to set the axial position of the cups or outer components 926b and 928b of the bearings 926 and 928 in relation to the cones or inner components 926a and 928a thereof. Preferably, such setting ultimately achieves a zero-endplay system. Torque feedback from the retaining members 938 and 940 as they are assembled onto the motor 910 is critical to the process. It is therefore a crucial feature of the invention that the seals 985, 988, and 1006 do not increase or otherwise influence the torque feedback as the outer components or cups 926b and 928b slide into position in the respective wells 934 and 936.

Furthermore, the simplicity of the system, which minimizes the number of components necessary to achieve a reliable seal, decreases detrimental tolerance stack-ups.

Still further, the sealing system described herein is well suited to accommodate growth differences resulting from the varied coefficients of thermal expansion associated with the dissimilar materials (e.g., various metals such as aluminum and steel) that constitute components of the motor 910. Such accommodation is particularly important in view of the varied ambient and operating temperatures associated with use of the motor 910.

CONCLUSION

Although the above description presents features of preferred embodiments of the present invention, other preferred embodiments may also be created in keeping with the principles of the invention. Furthermore, these other preferred embodiments may in some instances be realized through a combination of features compatible for use together despite having been presented independently as part of separate embodiments in the above description.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. A motor comprising:
   a shaft rotatable about an axis;
   an engaged component engaged by the shaft;
   a sleeve fixed to the shaft to rotate therewith; and
   a seal at least partly circumscribing the shaft,
   said shaft including an engagement region presenting a substantially variable outer shaft surface that at least in part engages the engaged component,
   said sleeve including a first section that at least partly circumscribes and engages the engagement region of the shaft,
   said first section of the sleeve presenting an outer seal-engaging surface,
   said seal at least partly circumscribing the engagement region of the shaft and the first section of the sleeve to sealingly engage the seal-engaging surface of the sleeve.

2. The motor of claim 1,
   said variable outer shaft surface comprising a plurality of teeth.

3. The motor of claim 2,
   said engaged component comprising a gear,
   said shaft rotatably engaging said gear.

4. The motor of claim 1,
   said shaft including a second region adjacent the engagement region,
   said sleeve including a second section that at least partly circumscribes the second region.

5. The motor of claim 4,
   said second region of the shaft and said engagement region of the shaft presenting at least substantially equal outer diameters,
   said first section of the sleeve and said second section of the sleeve presenting at least substantially equal inner and outer diameters.

6. The motor of claim 4,
   said second region of the shaft presenting a substantially smooth outer shaft surface.

7. The motor of claim 1,
   said engagement region of the shaft including—
     a primary portion configured for engagement with the engaged component, and
     a transition portion adjacent the primary portion,
     said primary portion and said transition portion cooperatively defining the variable outer shaft surface,
   said seal and said first section of the sleeve both at least partly circumscribing the primary portion such that the first section of the sleeve is disposed between and engages each of the primary portion and the seal.

8. The motor of claim 7,
   said first section of the sleeve additionally at least partly circumscribing and engaging the transition portion of the engagement region of the shaft.

9. The motor of claim 8,
   said shaft including a second region adjacent the engagement region,
   said transition portion extending between and interconnecting the second region of the shaft and the primary portion,
   said sleeve including a second section that at least partly circumscribes the second region of the shaft.

10. The motor of claim 1,
    said sleeve presenting an outer bearing-engaging surface,
    said motor further comprising a bearing rotatably supporting the shaft,
    said bearing at least partly circumscribing the sleeve and engaging the bearing-engaging surface of the sleeve.

11. The motor of claim 10,
    said first section of the sleeve at least in part presenting the bearing-engaging surface,
    said bearing at least partly circumscribing the engagement region of the shaft and the first section of the sleeve.

12. The motor of claim 11,
    said sleeve presenting axially spaced apart first and second end margins,
    said seal being disposed adjacent the first end margin,
    said bearing being disposed adjacent the second end margin.

13. The motor of claim 10,
    said motor including a housing defining a gear chamber and a motor chamber,
    said housing including an intermediate plate disposed between and in part defining each of the gear chamber and the motor chamber,
    said intermediate plate defining seal and bearing housings receiving and supporting the seal and the bearing, respectively.

14. The motor of claim 1,
    said motor including a gear chamber and a motor chamber,
    said seal configured to restrict passage of contaminants between the gear chamber and the motor chamber.

15. The motor of claim 1,
    said sleeve being discrete from said shaft.

16. The motor of claim 1,
    said sleeve comprising a harder material than said seal.

17. The motor of claim 16,
    said sleeve comprising steel.

18. A motor comprising:
    a shaft rotatable about an axis;
    an engaged component engaged by the shaft;
    a sleeve fixed to the shaft to rotate therewith; and
    a bearing rotatably supporting the shaft,
    said shaft including an engagement region presenting a substantially variable outer shaft surface that at least in part engages the engaged component,
    said sleeve including a first section that at least partly circumscribes and engages the engagement region of the shaft,
    said first section of the sleeve presenting an outer bearing-engaging surface,
    said bearing at least partly circumscribing the engagement region of the shaft and the first section of the sleeve to engage the bearing-engaging surface of the sleeve.

19. The motor of claim 18, said shaft including a second region adjacent the engagement region, said sleeve including a second section that at least partly circumscribes the second region of the shaft, said bearing additionally at least partly circumscribing the second region of the shaft and the second section of the sleeve.

20. The motor of claim 19, said second region presenting an at least substantially smooth outer shaft surface.

21. The motor of claim 19, said engagement region of the shaft including—
- a primary portion configured for engagement with the engaged component, and
- a transition portion adjacent the primary portion, said transition portion extending between and interconnecting the primary portion and the second region of the shaft, said primary portion and said transition portion cooperatively defining the variable outer shaft surface, said bearing at least partly circumscribing both the transition portion and the secondary region such that both the first and second sections of the sleeve are at least in part disposed between and engage each of the transition portion, the secondary region, and the bearing.

22. The motor of claim 18, said motor including a housing defining a gear chamber and a motor chamber, said housing including an intermediate plate disposed between and in part defining each of the gear chamber and the motor chamber, said intermediate plate defining a bearing housing receiving and supporting the bearing.

* * * * *